(12) United States Patent
Oishi

(10) Patent No.: US 9,303,300 B2
(45) Date of Patent: Apr. 5, 2016

(54) MELT-SOLIDIFIED SUBSTANCE, COPPER ALLOY FOR MELT-SOLIDIFICATION AND METHOD OF MANUFACTURING THE SAME

(75) Inventor: Keiichiro Oishi, Yao (JP)

(73) Assignee: MITSUBISHI SHINDOH CO., LTD., Tokyo (JP)

(*) Notice: Subject to any disclaimer, the term of this patent is extended or adjusted under 35 U.S.C. 154(b) by 1143 days.

(21) Appl. No.: 12/088,822

(22) PCT Filed: Sep. 30, 2005

(86) PCT No.: PCT/JP2005/018107
§ 371 (c)(1),
(2), (4) Date: Aug. 7, 2009

(87) PCT Pub. No.: WO2007/043101
PCT Pub. Date: Apr. 19, 2007

(65) Prior Publication Data
US 2010/0297464 A1    Nov. 25, 2010

(51) Int. Cl.
| | |
|---|---|
| C22C 9/04 | (2006.01) |
| C22C 9/00 | (2006.01) |
| B23K 35/30 | (2006.01) |
| C22C 1/06 | (2006.01) |
| C22C 9/01 | (2006.01) |
| C22C 9/02 | (2006.01) |
| C22C 9/10 | (2006.01) |

(52) U.S. Cl.
CPC ............. C22C 9/00 (2013.01); B23K 35/302 (2013.01); C22C 1/06 (2013.01); C22C 9/01 (2013.01); C22C 9/02 (2013.01); C22C 9/04 (2013.01); C22C 9/10 (2013.01); *Y10T 428/12292* (2015.01); *Y10T 428/12903* (2015.01)

(58) Field of Classification Search
None
See application file for complete search history.

(56) References Cited

U.S. PATENT DOCUMENTS

| | | | |
|---|---|---|---|
| 2,521,663 | A | 9/1950 | Zunick |
| 3,676,083 | A | 7/1972 | Cheney et al. |
| 3,912,552 | A | 10/1975 | Schultz et al. |
| 3,928,028 | A | 12/1975 | Yarwood |

(Continued)

FOREIGN PATENT DOCUMENTS

| | | |
|---|---|---|
| EP | 1 681 360 A1 | 7/2006 |
| JP | 38-20467 | 10/1938 |

(Continued)

OTHER PUBLICATIONS

English Machine Translation of Nakajima et al. (JP 11-001736) dated Mar. 5, 2012.*

(Continued)

*Primary Examiner* — Adam Krupicka
(74) *Attorney, Agent, or Firm* — Griffin and Szipl PC

(57) ABSTRACT

A melt-solidified substance includes melt-solidified portions formed by welding, build-up spray welding, metallizing or fusing. The melt-solidified portions have the alloy composition containing Zr: 0.0005 to 0.05 mass %, P: 0.01 to 0.34 mass %, Cu: the remainder and satisfying the relationship between the contents of P and Zr, [P]/[Zr]=0.3 to 20, and the mean grain size in the macrostructure after melt-solidification is 300 μm or less. If Fe and/or Ni are contained in the melt-solidified portion as inevitable impurities, the content of Fe or Ni is restricted to be 0.3 mass % or less when either Fe or Ni is contained, and the total content of Fe and Ni is restricted to be 0.4 mass % or less when both Fe and Ni are contained.

115 Claims, 3 Drawing Sheets

(56) References Cited

U.S. PATENT DOCUMENTS

| | | | |
|---|---|---|---|
| 4,047,978 A | | 9/1977 | Parikh et al. |
| 4,055,445 A | | 10/1977 | Pops |
| 4,110,132 A | | 8/1978 | Parikh et al. |
| 4,238,249 A | | 12/1980 | Ruchel |
| 4,353,415 A | * | 10/1982 | Klaschka et al. ......... 165/104.21 |
| 4,708,739 A | | 11/1987 | Kellie et al. |
| 4,710,349 A | | 12/1987 | Yamazaki et al. |
| 4,786,469 A | | 11/1988 | Weber et al. |
| 4,822,560 A | | 4/1989 | Oyama et al. |
| 4,826,736 A | | 5/1989 | Nakamura et al. |
| 5,370,840 A | * | 12/1994 | Caron et al. ................. 420/492 |
| 5,565,045 A | | 10/1996 | Caron et al. |
| 5,871,861 A | * | 2/1999 | Hirokou et al. .............. 429/149 |
| 6,401,323 B1 | * | 6/2002 | Roller et al. ................. 29/527.7 |
| 6,413,330 B1 | | 7/2002 | Oishi |
| 6,627,011 B2 | | 9/2003 | Sugawara et al. |
| 2002/0006351 A1 | | 1/2002 | Sugawara et al. |
| 2004/0234412 A1 | * | 11/2004 | Oishi et al. ..................... 420/477 |
| 2005/0039827 A1 | | 2/2005 | Yamagishi et al. |
| 2006/0222557 A1 | | 10/2006 | Pike, Jr. |
| 2008/0073005 A1 | | 3/2008 | Buck |
| 2010/0297464 A1 | | 11/2010 | Oishi |

FOREIGN PATENT DOCUMENTS

| | | | |
|---|---|---|---|
| JP | 49-40226 | | 4/1974 |
| JP | 50-078519 | | 6/1975 |
| JP | 52-107227 | | 9/1977 |
| JP | 54-92516 | | 7/1979 |
| JP | 55-070494 | | 5/1980 |
| JP | 58-39900 | | 9/1983 |
| JP | 61-000542 | | 1/1986 |
| JP | 61-48547 | A | 3/1986 |
| JP | 61-133357 | A | 6/1986 |
| JP | 62-274036 | | 11/1987 |
| JP | 62-297429 | | 12/1987 |
| JP | 1-162737 | | 6/1989 |
| JP | 02-170954 | A | 7/1990 |
| JP | 3-291344 | | 12/1991 |
| JP | 04-224645 | A | 8/1992 |
| JP | 6-058688 | | 3/1994 |
| JP | 6-184669 | | 7/1994 |
| JP | 06-184674 | A | 7/1994 |
| JP | 10-46270 | A | 2/1998 |
| JP | 10-152735 | A | 6/1998 |
| JP | 11-1736 | * | 1/1999 ................ C22C 9/04 |
| JP | 11-58034 | A | 3/1999 |
| JP | 2000-119775 | A | 4/2000 |
| JP | 2000-199023 | | 7/2000 |
| JP | 2001-247923 | | 9/2001 |
| JP | 2002-030364 | A | 1/2002 |
| JP | 2004-100041 | | 4/2004 |
| JP | 2004-100042 | | 4/2004 |
| JP | 2004-143541 | | 5/2004 |
| JP | 2004-183056 | | 7/2004 |
| JP | 2004-233952 | A | 8/2004 |
| WO | 94/10352 | | 5/1994 |
| WO | 2004/022805 | A1 | 3/2004 |
| WO | WO 2004022805 | A1 * | 3/2004 |

OTHER PUBLICATIONS

International Search Report issued in corresponding application No. PCT/JP2005/018107, completed Dec. 13, 2005 and mailed Dec. 20, 2005.
International Search Report issued in related application PCT/JP2005/014698, completed Sep. 2, 2005 and mailed Sep. 20, 2005.
Restriction/Election issued in co-pending related U.S. Appl. No. 11/573,632, mailed Sep. 30, 2009.
Page E 41 of Glossary for Metalurigical Terms, The Japan Institute of Metals, 1995, filed in related application as Exhibit C.
English translation of JP2000-119775.
Office Action issued in co-pending related U.S. Appl. No. 11/573,632 on Aug. 22, 2011.

International Search Report issued in related application PCT/JP2005/014697, completed Sep. 2, 2005 and mailed Sep. 20, 2005.
Office Action issued in co-pending related U.S. Appl. No. 11/573,640, mailed Feb. 25, 2010.
Office Action issued in co-pending related U.S. Appl. No. 11/573,638 (now abandoned), mailed Jul. 6, 2010.
(Metals Handbook Ninth Edition, vol. 9, Metallography and Microstructures, American Society for Metals, pp. 641-642), filed in co-pending related application as Exhibit A.
(Metals Handbook 8th Edition, vol. 7, Atlas of Microstructures of Industrial Alloys, American Society for Metals, pp. 290 & B-2), filed in co-pending related application as Exhibit B.
(Metal Handbook Ninth Edition, vol. 9, Metallography and Microstructures, American Society for Metals, pp. 629-631), filed in co-pending related application as Exhibit C.
(Binary Alloy Phase Diagrams, vol. 1, American Society for Metals, pp. 819-820, 971, 982 and 19), filed in co-pending related application as Exhibit D.
Page 286 of Metals Handbook 8th Edition, vol. 7, Atlas of Microstructures of Industrial Alloys, 1972.
Cast Nonferous: Heat Treating of Copper and Copper Alloys, downloaded Nov. 2, 2010, from http://www.keytometals.com/Article25.htm, two pages.
Visual Acuity of the Human Eye, 3 pages, downloaded from http://www.ndt.ed.org/EductationResources/CommunityCollege/PenetrantTest/Introduction/visualacuity.htm.
V. Ryan, Annealing Metals, downloaded Nov. 2, 2010 from http://www.technologystudent.com/equip1/heat3.htm, 2 pages.
Page 301 of Metals Handbook 8th Edition, vol. 8, Metallography, Structures and Phase Diagrams,1973.
The Annual Book of ASTM Standards 2000, vol. 02.01, Section 2, p. 876.
Page 171 of Metals Handbook 8th Edition, vol. 8, Metallography, Structures and Phase Diagrams,1973.
Pages 641, 642 and 411 of Metals Handbook® Ninth Edition, vol. 9, Metallography and Microstructures, 1985.
Restriction/Election issued in co-pending (now abandoned) related U.S. Appl. No. 11/573,638, on Apr. 13, 2011.
Pages 1, 3, 5, 15 and 16 of Terms and Definition of Metals Handbook 9th Edition, vol. 9, Metallography and Microstructures, American Society for Metals, submitted in a related application as Exhibit E.
Pages 257-259 os ASM Specialty Handbook, Copper and Copper Alloys, ASM International, submitted in a related application as Exhibit F.
Pages 9 and 15 of Terms and Definition of Metals Handbook 9th Edition, vol. 9, Metallography and Microstructures, American Society for Metals, filed in related application as Exhibit I.
Pages 277, 278, 365, 373, 374, 383, 384, 407 and 408 of Degarmo, E. Paul; Black, J T.; Kohser, Ronald A., Materials and Processes in Manufacturing 9th edition (2003), John Wiley & Sons, Inc., filed in related application as Exhibit J.
E. Paul Degarmo, Materials and Processes in Manufacturing 276-295 (John Wiley & Sons, Inc. 9th Ed. 2003), filed in a related application as Exhibit A1.
"Casting and Solidification Process," dated Jan. 9, 2010, at http://classes.engr.oregonstate.edu/mime/winter2010/ie337-001/Laboratories/5.Solidification%20Lab.pdf, downloaded Nov. 23, 2011, three pages, filed in a related application as Exhibit B1.
E. Paul Degarmo, Materials and Processes in Manufacturing 82-85 (John Wiley & Sons, Inc. 9th Ed. 2003), filed in a related application as Exhibit C1.
Patent Abstracts of Japan English Abstract corresponding to JP 2000/119775, filed in a related application as Exhibit D1.
Gubner, Rolf et al., Grain Boundary Corrosion of Copper Canister Weld Material, TR-06-01 (Svensk Kärnbränslehantering AB 2006).
ASM Specialty Handbook: Copper and Copper Alloys, pp. 1-9 (ASM International 2001).
Procedures: Copper Welding, at http://www.brazing.com/techguide/procedures/copper_welding.asp (downloaded Jun. 13, 2012, six pages.
Metals Handbook® Ninth Edition, vol. 9, Metallography and Microstructures 155 and 408 (American Society for Metals 1985).

(56) References Cited

OTHER PUBLICATIONS

Exhibit A2, Metals Handbook 8th Ed., vol. 7, Atlas of Microstructures of Industrial Alloys 280 (American Society for Metals 1972).
Exhibit B2, Metals Handbook 8th Ed., vol. 8, Metallography, Structures and Phase Diagrams 171 (American Society for Metals 1973).
Metals Handbook 290 (8th Edition 1972), filed herewith as Exhibit C3.
ASM Specialty Handbook® Copper and Copper Alloys 243-246 (2001), filed herewith as Exhibit E3.
N.J. Petch, The Cleavage Strength of Polycrystals, Journal of The Iron and Steel Institute, May 1953, pp. 25-28.
E.O. Hall, The Deformation and Ageing of Mild Steel, Mar. 1951, pp. 747-753.
Winfried Reif, Kornfeinung von Aluminium-, Blei-, Zinn-, Kupfer- und Nickellegierungen-ein Überblick, Giesserei 76, 1989, Nr.2, pp. 41-47.
F. Romankiewicz, Kornfeinung von Kupferlegierungen, Metall, 48. Jahrgang, Nr. 11/94, pp. 865-871.
Ferdynand Romankiewicz, Einfluβ einer Kornfeinung mitZirconium auf Erstarrungsmorphologie, Speisungsvermögen und Festigkeitseigenschaften von Messing CuZn30 und Siliciummessing CuZn15Si4, 39, Jahrgang 1987 Heft 1, pp. 25-33.
R. Mannheim, Untersuchung der Kornfienung von Kupfer-Zinn-Legierungen mit Zirconium und/oder Bor und Eisen sowie ihres Einflusses auf die mechanischen Eigenschaften, Giessereiforschung 40 1998 Nr. 1, pp. 1-16.
O. Bustos, Estudio de la combinanción de los procesos de afinamiento de grano de colada y filtrado en latones, Rev. Metal. Madrid, 35 (4), 1999, pp. 222-232.
A. Couture J.O. Edwards, Kornfeinung von Kupfer-Sandguβlegierungen und ihr Einfluβ auf die Güteeigenschaften, Giesserei-Praxis, Nr.21/1974, pp. 425-435.
M. Sadayappan, Fading of Grain Refinement in Leaded Yellow Brass (C85800) and SeBiLOY III (C89550, EnviroBrass III), AFS Transactions 01-116, 2001 American Foundry Society, pp. 705-713.
D. Cousineau, Grain Refinement of Permanent Mold Cast Copper-Base Alloys, AFS Transactions 02-108, 2002 American Foundry Society, pp. 505-514.
J.P. Thomson, Evaluation of Grain Rfinement of Leaded Yellow Brass (C85800) and EnviroBrass III (C89550) using Thermal Analysis, AFS Transactions 2003, pp. 417-434.
F.A. Fasoyinu, Effects of Grain Refinement on Hot Tear Resistance and Shrinkage Characteristics of Permanent Mold Cast Yellow Brass (C85800), pp. 327-337.
M. Sadayappan, Fading of Grain Refinement in Permanent Mold Cast Copper Alloys, AFS Transactions 2004 © American Foundry Society, Des Plaines IL USA, pp. 521-526.
Prof. Dr.-Ing. W. Reif, A New Grain Refiner for Copper—Zinc Alloys containing 25-42%Zinc, Metall 41. Jahrgang Heft Nov. 11, 1987, pp. 1131-1137.
M. Sadayappan, GrainRefinement of Copper Base Alloys, vol. 1—Plenary Lectures/Movement of Copper and Industry Outlook/ Copper Applications and Fabrication, 1999, pp. 279-291.
M. Sadayappan, Grain Refinement of Permanent Mold Cast Silicon Brass, Silicon Bronze and Red Brass, AFS Transactions, pp. 337-342.
A. Couture, Grain Refinement of Sand Cast Bronzes and its Influence on Their Properties, AFS Cast Metals Research Journal, Mar. 1974, pp. 1-5.
M. Sadayappan, Grain Refinement Studies on Leaded and Bi/Se Modified Yellow Brasses, pp. 45-58.
M. Sahoo, An Overview of ICA-Funded Research and Development at MTL/Canmet, pp. 1-12.
International Search Report issued in related application PCT/JP2005/008662, completed Jul. 21, 2005 and mailed Aug. 9, 2005.
Office Action issued in corresponding Brazilian patent application PI0509025-3 on Jul. 16, 2013 (no translation available).
Materials Mechanical Size Effects: A Review, 23 Materials Technology 193-209 (2008), filed herewith as Exhibit F3.
Final Office Action issued in co-pending related U.S. Appl. No. 10/596,849 on Jun. 26, 2014.
ASM Specialty Handbook, Copper and Copper Alloys, 2001, pp. 213-215, "Forging and Extrusion."
ASM Specialty Handbook, Copper and Copper Alloys, 2001, pp. 242-247, "Heat Treating."
Metals Handbook, 8th Edition, 1973, p. 169, "Solidification Structures of Copper Alloy Ingots."
Metals Handbook, vol. 9, Metallography and Microstructures, 1985, pp. 2, 5, 8, 9 and 15.
Restriction/Election issued in co-pending related U.S. Appl. No. 11/573,632 on Mar. 21, 2014.
Office Action issued in co-pending related U.S. Appl. No. 11/573,632 on Feb. 4, 2015.
Non-Final Office Action issued in co-pending related U.S. Appl. No. 11/573,632 on Jul. 29, 2014.
Flood, S. C. et al., "Columnar to Equiaxed Transition," published in Metal Handbook, vol. 15th, 9th Edition, pp. i,ii 130-133.
Handbook of Workability and Process Design, G.E. Dieter, H.A. Kuhn, and S.L. Semiatin, etditors, p. 35-44, DOI:101361/ hwpd2003po35, Chapter 3, Evolution of Microstructure during Hot Working, ASM International, 2003.
Final Office Action issued in co-pending related U.S. Appl. No. 10/596,849 on Jul. 2, 2015.

* cited by examiner

MELT-SOLIDIFIED SUBSTANCE, COPPER ALLOY FOR MELT-SOLIDIFICATION AND METHOD OF MANUFACTURING THE SAME

This is a National Phase Application in the United States of International Patent Application No. PCT/JP2005/018107 filed Sep. 30, 2005, which published as WO 2007/043101 A1 on Apr. 19, 2007. The entire disclosures of the above patent application and corresponding publication are hereby incorporated by reference.

TECHNICAL FIELD

The present invention relates to a melt-solidified substance including melt-solidified parts including welded part, built-up part, thermal sprayed layer, fused end part of copper alloy formed by melt-solidification including welding, build-up welding, thermal spraying, fusing, a copper alloy for melt-solidification used to form the above melt-solidified parts including material to be welded, material to be fused, filler metal (welding rod), thermal spraying material, and a method of manufacturing the same.

BACKGROUND ART

As an example of melt-solidified substance, a welded pipe made of phosphorus-deoxidized copper is well known as a welded substance. It has a problem of weak strength caused by the coarsening of grains in the welded areas. As a result, it has been proposed that a copper alloy produced by adding Fe or Co to phosphorus deoxidized copper is used to make a welded pipe in order to prevent the grains in the welded areas from coarsening as much as possible. For example, Patent Document 1 discloses a seamless copper alloy pipe for heat exchanger composed of 0.005 to 0.8 mass % of Fe, 0.01 to 0.026 mass % of P, 0.005 to 0.3 mass % of Zr, 3 to 30 ppm of $O_2$ and the remainder Cu, and Patent Document 2 discloses a seam welded copper alloy pipe for heat exchanger having a composition, in which 0.02 to 0.2% of Co, 0.01 to 0.05% of P, 1 to 20 ppm of C (if necessary), the remainder Cu and inevitable impurities are contained, and the content of oxygen, as an inevitable impurity, is restricted to 50 ppm or less.

Patent Document 1: JP-B-58-039900
Patent Document 2: JP-A-2000-199023

DISCLOSURE OF THE INVENTION

In a welded substance such as copper alloy welded pipe or the like, it is common that the metallic structure transforms from fine recrystallized structure to cast structure by melting, therefore the mechanical properties in the welded areas deteriorate. Since the copper alloys disclosed in Patent Documents 1 and 2 rarely have the effect to suppress the grain coarsening in the welded areas, the above problem cannot be avoidable. Meanwhile, the strength such as tensile strength, proof stress, fatigue strength or the like considerably depends on the grain size (Hall-Petch Effect), and the coarsening of the metallic structure impairs the ductility. Likewise, the corrosion resistance also deteriorates. What is worse is, since the fine recrystallized structure exists nearby, for example, if stress is applied to the copper alloy, the stress is centralized on the weaker areas, and then the copper alloy becomes more vulnerable. As a result, the copper alloy can be fractured or deformed even by small stress. Generally, a higher safety factor is used in the design of a welded area. Similarly, with respect to the corrosion resistance, since the fine recrystallized structure exists nearby, it becomes more likely that the welded areas corrode selectively. In order to avoid the above problems, it is common to use a weld material having higher strength, or to cold-work or anneal the welded material. However, the former cannot solve the problem in terms of the strength or corrosion resistance since such a high strength material is not always available. Meanwhile, the latter has problems in terms of the manufacturing cost and facilities. Another huge problem in the welded substance is the soundness of the welded area. Generally, blowhole, pinhole, shrinkage cavity, porosity or the like occur in the welded substance like a usual casting product. These defects are mainly caused by the growth of dendrite, same as a casting product. If grains in the solid phase are granulated when the welded area is melt-solidified, the above problem can be solved considerably.

An advantage of the present invention is to provide a melt-solidified substance such as highly practical welded substance or the like by making the strength, corrosion resistance or the like of the melt-solidified parts such as welded areas or the like excellent while the above problems are not caused. Another advantage is to provide a copper alloy for melt-solidification including materials to be welded, material to be fused, filler metal (welding rod), thermal spraying material, from which the above melt-solidified substance can be obtained easily, and a method of manufacturing the copper alloy for melt-solidification.

In order to achieve the above advantages, the invention proposes the following melt-solidified substance (welded pipe, welded structure, thermal sprayed structure, built-up structure, fused substance or the like), copper alloy for melt-solidification (materials to be welded, material to be fused, welding rod, welding line, thermal spraying material or the like), which is used to manufacture the melt-solidified substance, method of manufacturing the copper alloy (particularly, casting method).

That is, the invention is a melt-solidified substance including melt-solidified parts formed by welding, build-up welding, thermal spraying or fusing and proposes the following first to eighteenth melt-solidified substances. Meanwhile, the build-up welding and thermal spraying include a lining process.

In the first melt-solidified substance, the melt-solidified part has an alloy composition containing Zr: 0.0005 to 0.05 mass % (preferably 0.002 to 0.039 mass %, more preferably 0.003 to 0.029 mass %, further more preferably 0.004 to 0.024 mass %, and optimally 0.006 to 0.019 mass %); P: 0.01 to 0.35 mass % (preferably 0.02 to 0.19 mass %, more preferably 0.03 to 0.16 mass %, and optimally 0.035 to 0.12 mass %); and Cu: the remainder, and satisfies the following conditions (1) and (6). It is preferable that the melt-solidified part of the first melt-solidified substance satisfy the following conditions (7), (10), and (11) in addition to the above conditions.

In the second melt-solidified substance, the melt-solidified part has an alloy composition containing Zr: 0.0005 to 0.05 mass % (preferably 0.002 to 0.039 mass %, more preferably 0.003 to 0.029 mass %, further more preferably 0.004 to 0.024 mass %, and optimally 0.006 to 0.019 mass %); P: 0.01 to 0.35 mass % (preferably 0.02 to 0.19 mass %, more preferably 0.03 to 0.16 mass %, and optimally 0.035 to 0.12 mass %); Zn: 0.01 to 38 mass % (preferably 5 to 37 mass %, more preferably 12 to 36 mass %, and optimally 17 to 34 mass %); and Cu: the remainder, and satisfies the following conditions (1) and (6). It is preferable that the melt-solidified part of the second melt-solidified substance satisfy the following conditions (2) to (5), and (7) to (12) in addition to the above conditions.

In the third melt-solidified substance, the melt-solidified part has an alloy composition containing Zr: 0.0005 to 0.05 mass % (preferably 0.002 to 0.039 mass %, more preferably 0.003 to 0.029 mass %, further more preferably 0.004 to 0.024 mass %, and optimally 0.006 to 0.019 mass %); P: 0.01 to 0.35 mass % (preferably 0.02 to 0.19 mass %, more preferably 0.03 to 0.16 mass %, and optimally 0.035 to 0.12 mass %); one or more elements selected from Sn: 0.01 to 15 mass % (preferably 0.1 to 12 mass %, more preferably 0.5 to 8 mass %, and optimally 0.6 to 2 mass %), Si: 0.01 to 5 mass % (preferably 0.05 to 4.8 mass %, more preferably 0.1 to 4.5 mass %, and optimally 2.6 to 3.7 mass %), and Al: 0.01 to 9 mass % (preferably 0.1 to 8.5 mass %, and more preferably 0.2 to 3 mass %); and Cu: the remainder, and satisfies the following conditions (1) and (6). It is preferable that the melt-solidified part of the third melt-solidified substance satisfy the following conditions (2) to (5), and (7) to (12) in addition to the above conditions.

In the fourth melt-solidified substance, the melt-solidified part has an alloy composition containing Zr: 0.0005 to 0.05 mass % (preferably 0.002 to 0.039 mass %, more preferably 0.003 to 0.029 mass %, further more preferably 0.004 to 0.024 mass %, and optimally 0.006 to 0.019 mass %); P: 0.01 to 0.35 mass % (preferably 0.02 to 0.19 mass %, more preferably 0.03 to 0.16 mass %, and optimally 0.035 to 0.12 mass %); Zn: 0.01 to 38 mass % (preferably 5 to 37 mass %, more preferably 12 to 36 mass %, and optimally 17 to 34 mass %); one or more elements selected from Sn: 0.01 to 15 mass % (preferably 0.1 to 12 mass %, more preferably 0.5 to 8 mass %, and optimally 0.6 to 2 mass %), Si: 0.01 to 5 mass % (preferably 0.05 to 4.8 mass %, more preferably 0.1 to 4.5 mass %, and optimally 2.6 to 3.7 mass %), and Al: 0.01 to 9 mass % (preferably 0.1 to 8.5 mass %, and more preferably 0.2 to 3 mass %); and Cu: the remainder, and satisfies the following conditions (1) and (6). It is preferable that the melt-solidified part of the fourth melt-solidified substance satisfy the following conditions (2) to (5), and (7) to (12) in addition to the above conditions.

In the fifth melt-solidified substance, the melt-solidified part has an alloy composition containing Zr: 0.0005 to 0.05 mass % (preferably 0.002 to 0.039 mass %, more preferably 0.003 to 0.029 mass %, further more preferably 0.004 to 0.024 mass %, and optimally 0.006 to 0.019 mass %); P: 0.01 to 0.35 mass % (preferably 0.02 to 0.19 mass %, more preferably 0.03 to 0.16 mass %, and optimally 0.035 to 0.12 mass %); Zn: 0.01 to 38 mass % (preferably 5 to 37 mass %, more preferably 12 to 36 mass %, and optimally 17 to 34 mass %); one or more elements selected from Sb: 0.02 to 0.15 mass % (preferably 0.03 to 0.12 mass %), As: 0.02 to 0.15 mass % (preferably 0.03 to 0.12 mass %), Mg: 0.001 to 0.2 mass % (preferably 0.002 to 0.1 mass %), and Mn: 0.01 to 4 mass % (preferably 0.05 to 4 mass %, and more preferably 0.5 to 3 mass %); and Cu: the remainder, and satisfies the following conditions (1) and (6). It is preferable that the melt-solidified part of the fifth melt-solidified substance satisfy the following conditions (2) to (5), and (7) to (12) in addition to the above conditions.

In the sixth melt-solidified substance, the melt-solidified part has an alloy composition containing Zr: 0.0005 to 0.05 mass % (preferably 0.002 to 0.039 mass %, more preferably 0.003 to 0.029 mass %, further more preferably 0.004 to 0.024 mass %, and optimally 0.006 to 0.019 mass %); P: 0.01 to 0.35 mass % (preferably 0.02 to 0.19 mass %, more preferably 0.03 to 0.16 mass %, and optimally 0.035 to 0.12 mass %); one or more elements selected from Sn: 0.01 to 15 mass % (preferably 0.1 to 12 mass %, more preferably 0.5 to 8 mass %, and optimally 0.6 to 2 mass %), Si: 0.01 to 5 mass % (preferably 0.05 to 4.8 mass %, more preferably 0.1 to 4.5 mass %, and optimally 2.6 to 3.7 mass %), and Al: 0.01 to 9 mass % (preferably 0.1 to 8.5 mass %, and more preferably 0.2 to 3 mass %); one or more elements selected from Sb: 0.02 to 0.15 mass % (preferably 0.03 to 0.12 mass %), As: 0.02 to 0.15 mass % (preferably 0.03 to 0.12 mass %), Mg: 0.001 to 0.2 mass % (preferably 0.002 to 0.1 mass %), and Mn: 0.01 to 4 mass % (preferably 0.05 to 4 mass %, and more preferably 0.5 to 3 mass %); and Cu: the remainder, and satisfies the following conditions (1) and (6). It is preferable that the melt-solidified part of the sixth melt-solidified substance satisfy the following conditions (2) to (5), and (7) to (12) in addition to the above conditions.

In the seventh melt-solidified substance, the melt-solidified part has an alloy composition containing Zr: 0.0005 to 0.05 mass % (preferably 0.002 to 0.039 mass %, more preferably 0.003 to 0.029 mass %, further more preferably 0.004 to 0.024 mass %, and optimally 0.006 to 0.019 mass %); P: 0.01 to 0.35 mass % (preferably 0.02 to 0.19 mass %, more preferably 0.03 to 0.16 mass %, and optimally 0.035 to 0.12 mass %); Zn: 0.01 to 38 mass % (preferably 5 to 37 mass %, more preferably 12 to 36 mass %, and optimally 17 to 34 mass %); one or more elements selected from Sn: 0.01 to 15 mass % (preferably 0.1 to 12 mass %, more preferably 0.5 to 8 mass %, and optimally 0.6 to 2 mass %), Si: 0.01 to 5 mass % (preferably 0.05 to 4.8 mass %, more preferably 0.1 to 4.5 mass %, and optimally 2.6 to 3.7 mass %), and Al: 0.01 to 9 mass % (preferably 0.1 to 8.5 mass %, and more preferably 0.2 to 3 mass %); one or more elements selected from Sb: 0.02 to 0.15 mass % (preferably 0.03 to 0.12 mass %), As: 0.02 to 0.15 mass % (preferably 0.03 to 0.12 mass %), Mg: 0.001 to 0.2 mass % (preferably 0.002 to 0.1 mass %), and Mn: 0.01 to 4 mass % (preferably 0.05 to 4 mass %, and more preferably 0.5 to 3 mass %); and Cu: the remainder, and satisfies the following conditions (1) and (6). It is preferable that the melt-solidified part of the seventh melt-solidified substance satisfy the following conditions (2) to (5), and (7) to (12) in addition to the above conditions.

In the eighth melt-solidified substance, the melt-solidified part has an alloy composition containing Zr: 0.0005 to 0.05 mass % (preferably 0.002 to 0.039 mass %, more preferably 0.003 to 0.029 mass %, further more preferably 0.004 to 0.024 mass %, and optimally 0.006 to 0.019 mass %); P: 0.01 to 0.35 mass % (preferably 0.02 to 0.19 mass %, more preferably 0.03 to 0.16 mass %, and optimally 0.035 to 0.12 mass %); Zn: 0.01 to 38 mass % (preferably 5 to 37 mass %, more preferably 12 to 36 mass %, and optimally 17 to 34 mass %); one or more elements selected from Pb: 0.005 to 15 mass % (preferably 0.005 to 4 mass %, more preferably 0.005 to 1 mass %, and optimally 0.01 to 0.2 mass %), Bi: 0.005 to 15 mass % (preferably 0.005 to 3 mass %, more preferably 0.005 to 1 mass %, and optimally 0.01 to 0.2 mass %), Se: 0.01 to 2 mass % (preferably 0.03 to 0.5 mass %, and more preferably 0.05 to 0.3 mass %), and Te: 0.03 to 1.5 mass % (preferably 0.05 to 0.5 mass %, and more preferably 0.05 to 0.3 mass %); and Cu: the remainder, and satisfies the following conditions (1) and (6). It is preferable that the melt-solidified part of the eighth melt-solidified substance satisfy the following conditions (2) to (5), and (7) to (12) in addition to the above conditions.

In the ninth melt-solidified substance, the melt-solidified part has an alloy composition containing Zr: 0.0005 to 0.05 mass % (preferably 0.002 to 0.039 mass %, more preferably 0.003 to 0.029 mass %, further more preferably 0.004 to 0.024 mass %, and optimally 0.006 to 0.019 mass %); P: 0.01 to 0.35 mass % (preferably 0.02 to 0.19 mass %, more preferably 0.03 to 0.16 mass %, and optimally 0.035 to 0.12 mass %); one or more elements selected from Sn: 0.01 to 15 mass % (preferably 0.1 to 12 mass %, more preferably 0.5 to 8 mass %, and optimally 0.6 to 2 mass %), Si: 0.01 to 5 mass % (preferably 0.05 to 4.8 mass %, more preferably 0.1 to 4.5 mass %, and optimally 2.6 to 3.7 mass %), and Al: 0.01 to 9 mass % (preferably 0.1 to 8.5 mass %, and more preferably 0.2 to 3 mass %); one or more elements selected from Pb: 0.005 to 15 mass % (preferably 0.005 to 4 mass %, more preferably 0.005 to 1 mass %, and optimally 0.01 to 0.2 mass %), Bi: 0.005 to 15 mass % (preferably 0.005 to 3 mass %, more preferably 0.005 to 1 mass %, and optimally 0.01 to 0.2 mass %), Se: 0.01 to 2 mass % (preferably 0.03 to 0.5 mass %, and more preferably 0.05 to 0.3 mass %), and Te: 0.03 to 1.5 mass % (preferably 0.05 to 0.5 mass %, and more preferably 0.05 to 0.3 mass %); and Cu: the remainder, and satisfies the following conditions (1) and (6). It is preferable that the melt-solidified part of the ninth melt-solidified substance satisfy the following conditions (2) to (5), and (7) to (12) in addition to the above conditions.

In the tenth melt-solidified substance, the melt-solidified part has an alloy composition containing Zr: 0.0005 to 0.05 mass % (preferably 0.002 to 0.039 mass %, more preferably 0.003 to 0.029 mass %, further more preferably 0.004 to 0.024 mass %, and optimally 0.006 to 0.019 mass %); P: 0.01 to 0.35 mass % (preferably 0.02 to 0.19 mass %, more preferably 0.03 to 0.16 mass %, and optimally 0.035 to 0.12 mass %); Zn: 0.01 to 38 mass % (preferably 5 to 37 mass %, more preferably 12 to 36 mass %, and optimally 17 to 34 mass %); one or more elements selected from Sn: 0.01 to 15 mass % (preferably 0.1 to 12 mass %, more preferably 0.5 to 8 mass %, and optimally 0.6 to 2 mass %), Si: 0.01 to 5 mass % (preferably 0.05 to 4.8 mass %, more preferably 0.1 to 4.5 mass %, and optimally 2.6 to 3.7 mass %), and Al: 0.01 to 9 mass % (preferably 0.1 to 8.5 mass %, and more preferably 0.2 to 3 mass %); one or more elements selected from Pb: 0.005 to 15 mass % (preferably 0.005 to 4 mass %, more preferably 0.005 to 1 mass %, and optimally 0.01 to 0.2 mass %), Bi: 0.005 to 15 mass % (preferably 0.005 to 3 mass %, more preferably 0.005 to 1 mass %, and optimally 0.01 to 0.2 mass %), Se: 0.01 to 2 mass % (preferably 0.03 to 0.5 mass %, and more preferably 0.05 to 0.3 mass %), and Te: 0.03 to 1.5 mass % (preferably 0.05 to 0.5 mass %, and more preferably 0.05 to 0.3 mass %); and Cu: the remainder, and satisfies the following conditions (1) and (6). It is preferable that the melt-solidified part of the tenth melt-solidified substance satisfy the following conditions (2) to (5), and (7) to (12) in addition to the above conditions.

In the eleventh melt-solidified substance, the melt-solidified part has an alloy composition containing Zr: 0.0005 to 0.05 mass % (preferably 0.002 to 0.039 mass %, more preferably 0.003 to 0.029 mass %, further more preferably 0.004 to 0.024 mass %, and optimally 0.006 to 0.019 mass %); P: 0.01 to 0.35 mass % (preferably 0.02 to 0.19 mass %, more preferably 0.03 to 0.16 mass %, and optimally 0.035 to 0.12 mass %); Zn: 0.01 to 38 mass % (preferably 5 to 37 mass %, more preferably 12 to 36 mass %, and optimally 17 to 34 mass %); one or more elements selected from Sb: 0.02 to 0.15 mass % (preferably 0.03 to 0.12 mass %), As: 0.02 to 0.15 mass % (preferably 0.03 to 0.12 mass %), Mg: 0.001 to 0.2 mass % (preferably 0.002 to 0.1 mass %), and Mn: 0.01 to 4 mass % (preferably 0.05 to 4 mass %, and more preferably 0.5 to 3 mass %); one or more elements selected from Pb: 0.005 to 15 mass % (preferably 0.005 to 4 mass %, more preferably 0.005 to 1 mass %, and optimally 0.01 to 0.2 mass %), Bi: 0.005 to 15 mass % (preferably 0.005 to 3 mass %, more preferably 0.005 to 1 mass %, and optimally 0.01 to 0.2 mass %), Se: 0.01 to 2 mass % (preferably 0.03 to 0.5 mass %, and more preferably 0.05 to 0.3 mass %), and Te: 0.03 to 1.5 mass % (preferably 0.05 to 0.5 mass %, and more preferably 0.05 to 0.3 mass %); and Cu: the remainder, and satisfies the following conditions (1) and (6). It is preferable that the melt-solidified part of the eleventh melt-solidified substance satisfy the following conditions (2) to (5), and (7) to (12) in addition to the above conditions.

In the twelfth melt-solidified substance, the melt-solidified part has an alloy composition containing Zr: 0.0005 to 0.05 mass % (preferably 0.002 to 0.039 mass %, more preferably 0.003 to 0.029 mass %, further more preferably 0.004 to 0.024 mass %, and optimally 0.006 to 0.019 mass %); P: 0.01 to 0.35 mass % (preferably 0.02 to 0.19 mass %, more preferably 0.03 to 0.16 mass %, and optimally 0.035 to 0.12 mass %); one or more elements selected from Sn: 0.01 to 15 mass % (preferably 0.1 to 12 mass %, more preferably 0.5 to 8 mass %, and optimally 0.6 to 2 mass %), Si: 0.01 to 5 mass % (preferably 0.05 to 4.8 mass %, more preferably 0.1 to 4.5 mass %, and optimally 2.6 to 3.7 mass %), and Al: 0.01 to 9 mass % (preferably 0.1 to 8.5 mass %, and more preferably 0.2 to 3 mass %); one or more elements selected from Sb: 0.02 to 0.15 mass % (preferably 0.03 to 0.12 mass %), As: 0.02 to 0.15 mass % (preferably 0.03 to 0.12 mass %), Mg: 0.001 to 0.2 mass % (preferably 0.002 to 0.1 mass %), and Mn: 0.01 to 4 mass % (preferably 0.05 to 4 mass %, and more preferably 0.5 to 3 mass %); one or more elements selected from Pb: 0.005 to 15 mass % (preferably 0.005 to 4 mass %, more preferably 0.005 to 1 mass %, and optimally 0.01 to 0.2 mass %), Bi: 0.005 to 15 mass % (preferably 0.005 to 3 mass %, more preferably 0.005 to 1 mass %, and optimally 0.01 to 0.2 mass %), Se: 0.01 to 2 mass % (preferably 0.03 to 0.5 mass %, and more preferably 0.05 to 0.3 mass %), and Te: 0.03 to 1.5 mass % (preferably 0.05 to 0.5 mass %, and more preferably 0.05 to 0.3 mass %); and Cu: the remainder, and satisfies the following conditions (1) and (6). It is preferable that the melt-solidified part of the twelfth melt-solidified substance satisfy the following conditions (2) to (5), and (7) to (12) in addition to the above conditions.

In the thirteenth melt-solidified substance, the melt-solidified part has an alloy composition containing Zr: 0.0005 to 0.05 mass % (preferably 0.002 to 0.039 mass %, more preferably 0.003 to 0.029 mass %, further more preferably 0.004 to 0.024 mass %, and optimally 0.006 to 0.019 mass %); P: 0.01 to 0.35 mass % (preferably 0.02 to 0.19 mass %, more preferably 0.03 to 0.16 mass %, and optimally 0.035 to 0.12 mass %); Zn: 0.01 to 38 mass % (preferably 5 to 37 mass %, more preferably 12 to 36 mass %, and optimally 17 to 34 mass %); one or more elements selected from Sn: 0.01 to 15 mass % (preferably 0.1 to 12 mass %, more preferably 0.5 to 8 mass %, and optimally 0.6 to 2 mass %), Si: 0.01 to 5 mass % (preferably 0.05 to 4.8 mass %, more preferably 0.1 to 4.5 mass %, and optimally 2.6 to 3.7 mass %), and Al: 0.01 to 9 mass % (preferably 0.1 to 8.5 mass %, and more preferably 0.2 to 3 mass %); one or more elements selected from Sb: 0.02 to 0.15 mass % (preferably 0.03 to 0.12 mass %), As: 0.02 to 0.15 mass % (preferably 0.03 to 0.12 mass %), Mg: 0.001 to 0.2 mass % (preferably 0.002 to 0.1 mass %), and Mn: 0.01 to 4 mass % (preferably 0.05 to 4 mass %, and more preferably 0.5 to 3 mass %); one or more elements selected from Pb: 0.005 to 15 mass % (preferably 0.005 to 4 mass %, more preferably 0.005 to 1 mass %, and optimally 0.01 to 0.2 mass %), Bi: 0.005 to 15 mass % (preferably 0.005 to 3 mass %, more preferably 0.005 to 1 mass %, and optimally 0.01 to 0.2 mass %), Se: 0.01 to 2 mass % (preferably 0.03 to 0.5 mass %, and more preferably 0.05 to 0.3 mass %), and Te: 0.03 to 1.5 mass % (preferably 0.05 to 0.5 mass %, and more preferably 0.05 to 0.3 mass %); and Cu: the remainder, and satisfies the following conditions (1) and (6). It is preferable that the melt-solidified part of the thirteenth melt-solidified substance satisfy the following conditions (2) to (5), and (7) to (12) in addition to the above conditions.

In the fourteenth melt-solidified substance, the melt-solidified part has an alloy composition containing Zr: 0.0005 to 0.05 mass % (preferably 0.002 to 0.039 mass %, more preferably 0.003 to 0.029 mass %, further more preferably 0.004 to 0.024 mass %, and optimally 0.006 to 0.019 mass %); P: 0.01 to 0.35 mass % (preferably 0.02 to 0.19 mass %, more preferably 0.03 to 0.16 mass %, and optimally 0.035 to 0.12 mass %); one or more elements selected from Sn: 0.01 to 15 mass % (preferably 0.1 to 12 mass %, more preferably 0.5 to 8 mass %, and optimally 0.6 to 2 mass %), Si: 0.01 to 5 mass % (preferably 0.05 to 4.8 mass %, more preferably 0.1 to 4.5 mass %, and optimally 2.6 to 3.7 mass %), and Al: 0.01 to 9 mass % (preferably 0.1 to 8.5 mass %, and more preferably 0.2 to 3 mass %); one or more elements selected from Co: 0.005 to 0.3 mass % (preferably 0.01 to 0.05 mass %), Cr: 0.005 to 0.3 mass % (preferably 0.01 to 0.05 mass %), C: 0.00005 to 0.02 mass % (preferably 0.0001 to 0.01 mass %), Ti: 0.005 to 0.3 mass % (preferably 0.0005 to 0.01 mass %), B: 0.0002 to 0.05 mass % (preferably 0.0005 to 0.01 mass %), and rare earth element: 0.01 to 0.5 mass % (preferably 0.05 to 0.2 mass %); and Cu: the remainder, and satisfies the following conditions (1) and (6). It is preferable that the melt-solidified part of the fourteenth melt-solidified substance satisfy the following conditions (2) to (5), and (7) to (12) in addition to the above conditions.

In the fifteenth melt-solidified substance, the melt-solidified part has an alloy composition containing Zr: 0.0005 to 0.05 mass % (preferably 0.002 to 0.039 mass %, more preferably 0.003 to 0.029 mass %, further more preferably 0.004 to 0.024 mass %, and optimally 0.006 to 0.019 mass %); P: 0.01 to 0.35 mass % (preferably 0.02 to 0.19 mass %, more preferably 0.03 to 0.16 mass %, and optimally 0.035 to 0.12 mass %); Zn: 0.01 to 38 mass % (preferably 5 to 37 mass %, more preferably 12 to 36 mass %, and optimally 17 to 34 mass %); one or more elements selected from Sn: 0.01 to 15 mass % (preferably 0.1 to 12 mass %, more preferably 0.5 to 8 mass %, and optimally 0.6 to 2 mass %), Si: 0.01 to 5 mass % (preferably 0.05 to 4.8 mass %, more preferably 0.1 to 4.5 mass %, and optimally 2.6 to 3.7 mass %), and Al: 0.01 to 9 mass % (preferably 0.1 to 8.5 mass %, and more preferably 0.2 to 3 mass %); one or more elements selected from Co: 0.005 to 0.3 mass % (preferably 0.01 to 0.05 mass %), Cr: 0.005 to 0.3 mass % (preferably 0.01 to 0.05 mass %), C: 0.00005 to 0.02 mass % (preferably 0.0001 to 0.01 mass %), Ti: 0.005 to 0.3 mass % (preferably 0.0005 to 0.01 mass %), B: 0.0002 to 0.05 mass % (preferably 0.0005 to 0.01 mass %), and rare earth element: 0.01 to 0.5 mass % (preferably 0.05 to 0.2 mass %); and Cu: the remainder, and satisfies the following conditions (1) and (6). It is preferable that the melt-solidified part of the fifteenth melt-solidified substance satisfy the following conditions (2) to (5), and (7) to (12) in addition to the above conditions.

In the sixteenth melt-solidified substance, the melt-solidified part has an alloy composition containing Zr: 0.0005 to 0.05 mass % (preferably 0.002 to 0.039 mass %, more preferably 0.003 to 0.029 mass %, further more preferably 0.004 to 0.024 mass %, and optimally 0.006 to 0.019 mass %); P: 0.01 to 0.35 mass % (preferably 0.02 to 0.19 mass %, more preferably 0.03 to 0.16 mass %, and optimally 0.035 to 0.12 mass %); Zn: 0.01 to 38 mass % (preferably 5 to 37 mass %, more preferably 12 to 36 mass %, and optimally 17 to 34 mass %); one or more elements selected from Sb: 0.02 to 0.15 mass % (preferably 0.03 to 0.12 mass %), As: 0.02 to 0.15 mass % (preferably 0.03 to 0.12 mass %), Mg: 0.001 to 0.2 mass % (preferably 0.002 to 0.1 mass %), and Mn: 0.01 to 4 mass % (preferably 0.05 to 4 mass %, and more preferably 0.5 to 3 mass %); one or more elements selected from Co: 0.005 to 0.3 mass % (preferably 0.01 to 0.05 mass %), Cr: 0.005 to 0.3 mass % (preferably 0.01 to 0.05 mass %), C: 0.00005 to 0.02 mass % (preferably 0.0001 to 0.01 mass %), Ti: 0.005 to 0.3 mass % (preferably 0.0005 to 0.01 mass %), B: 0.0002 to 0.05 mass % (preferably 0.0005 to 0.01 mass %), and rare earth element: 0.01 to 0.5 mass % (preferably 0.05 to 0.2 mass %); and Cu: the remainder, and satisfies the following conditions (1) and (6). It is preferable that the melt-solidified part of the sixteenth melt-solidified substance satisfy the following conditions (2) to (5), and (7) to (12) in addition to the above conditions.

In the seventeenth melt-solidified substance, the melt-solidified part has an alloy composition containing Zr: 0.0005 to 0.05 mass % (preferably 0.002 to 0.039 mass %, more preferably 0.003 to 0.029 mass %, further more preferably 0.004 to 0.024 mass %, and optimally 0.006 to 0.019 mass %); P: 0.01 to 0.35 mass % (preferably 0.02 to 0.19 mass %, more preferably 0.03 to 0.16 mass %, and optimally 0.035 to 0.12 mass %); one or more elements selected from Sn: 0.01 to 15 mass % (preferably 0.1 to 12 mass %, more preferably 0.5 to 8 mass %, and optimally 0.6 to 2 mass %), Si: 0.01 to 5 mass % (preferably 0.05 to 4.8 mass %, more preferably 0.1 to 4.5 mass %, and optimally 2.6 to 3.7 mass %), and Al: 0.01 to 9 mass % (preferably 0.1 to 8.5 mass %, and more preferably 0.2 to 3 mass %); one or more elements selected from Sb: 0.02 to 0.15 mass % (preferably 0.03 to 0.12 mass %), As: 0.02 to 0.15 mass % (preferably 0.03 to 0.12 mass %), Mg: 0.001 to 0.2 mass % (preferably 0.002 to 0.1 mass %), and Mn: 0.01 to 4 mass % (preferably 0.05 to 4 mass %, and more preferably 0.5 to 3 mass %); one or more elements selected from Co: 0.005 to 0.3 mass % (preferably 0.01 to 0.05 mass %), Cr: 0.005 to 0.3 mass % (preferably 0.01 to 0.05 mass %), C: 0.00005 to 0.02 mass % (preferably 0.0001 to 0.01 mass %), Ti: 0.005 to 0.3 mass % (preferably 0.0005 to 0.01 mass %), B: 0.0002 to 0.05 mass % (preferably 0.0005 to 0.01 mass %), and rare earth element: 0.01 to 0.5 mass % (preferably 0.05 to 0.2 mass %); and Cu: the remainder, and satisfies the following conditions (1) and (6). It is preferable that the melt-solidified part of the seventeenth melt-solidified substance satisfy the following conditions (2) to (5), and (7) to (12) in addition to the above conditions.

In the eighteenth melt-solidified substance, the melt-solidified part has an alloy composition containing Zr: 0.0005 to 0.05 mass % (preferably 0.002 to 0.039 mass %, more preferably 0.003 to 0.029 mass %, further more preferably 0.004 to 0.024 mass %, and optimally 0.006 to 0.019 mass %); P: 0.01 to 0.35 mass % (preferably 0.02 to 0.19 mass %, more preferably 0.03 to 0.16 mass %, and optimally 0.035 to 0.12 mass %); Zn: 0.01 to 38 mass % (preferably 5 to 37 mass %, more preferably 12 to 36 mass %, and optimally 17 to 34 mass %); one or more elements selected from Sn: 0.01 to 15 mass % (preferably 0.1 to 12 mass %, more preferably 0.5 to 8 mass %, and optimally 0.6 to 2 mass %), Si: 0.01 to 5 mass % (preferably 0.05 to 4.8 mass %, more preferably 0.1 to 4.5 mass %, and optimally 2.6 to 3.7 mass %), and Al: 0.01 to 9 mass % (preferably 0.1 to 8.5 mass %, and more preferably 0.2 to 3 mass %); one or more elements selected from Sb: 0.02 to 0.15 mass % (preferably 0.03 to 0.12 mass %), As: 0.02 to 0.15 mass % (preferably 0.03 to 0.12 mass %), Mg: 0.001 to 0.2 mass % (preferably 0.002 to 0.1 mass %), and Mn: 0.01 to 4 mass % (preferably 0.05 to 4 mass %, and more preferably 0.5 to 3 mass %); one or more elements selected from Co: 0.005 to 0.3 mass % (preferably 0.01 to 0.05 mass %), Cr:

0.005 to 0.3 mass % (preferably 0.01 to 0.05 mass %), C: 0.00005 to 0.02 mass % (preferably 0.0001 to 0.01 mass %), Ti: 0.005 to 0.3 mass % (preferably 0.01 to 0.05 mass %), B: 0.0002 to 0.05 mass % (preferably 0.0005 to 0.01 mass %), and rare earth element: 0.01 to 0.5 mass % (preferably 0.05 to 0.2 mass %); and Cu: the remainder, and satisfies the following conditions (1) and (6). It is preferable that the melt-solidified part of the eighteenth melt-solidified substance satisfy the following conditions (2) to (5), and (7) to (12) in addition to the above conditions.

In the following description, [a] represents the content of an element 'a', and the unit of the content is mass %. For example, the content of Cu is expressed as [Cu] mass %. In addition, the content of each phase is the area ratio (%). Since the area ratio of each phase is measured by image analysis, more specifically, by expressing the structure of the copper alloy, 200 times magnified by an optical microscope, in the binary system with an image processing software 'WinROOF' (manufactured by Tech-Jam Co., Ltd.), the area ratio is the average value of the area ratio measured in three different areas.

(1) Having an alloy composition that satisfies F1=[P]/[Zr] =0.3 to 200 (preferably F1=0.6 to 80, more preferably F1=1 to 40, further more preferably F1=1.4 to 25, and optimally F1=2 to 18)

(2) The melt-solidified part has an alloy composition that satisfies F2=[Cu]−3[P]−3.5[Si]−0.5[Sn]−1.8[Al]−0.5([Sb]+ [As]+[Mg])+[Mn]+0.5([Pb]+[Bi]+[Se]+[Te])=60 to 97 (preferably F2=61 to 90, more preferably F2=62 to 76, further more preferably F2=63 to 69, and optimally F2=64 to 67.5). Meanwhile, in F2, if an element 'a' is not contained, [a]=0.

(3) The melt-solidified part has an alloy composition that satisfies F3=[Zn]+3[Sn]+5[Si]+3[Al]=10 to 45 (preferably F3=16 to 42, more preferably F3=22 to 40, and optimally F3=28 to 38). Meanwhile, in F3, if an element 'a' is not contained, [a]=0.

(4) The melt-solidified part has an alloy composition that satisfies F4=([Zn]+3[Sn]+5[Si]+3[Al])/[Zr]=300 to 35000 (preferably F4=600 to 14000, and more preferably F4=1000 to 9000). Meanwhile, in F4, if an element 'a' is not contained, [a]=0.

(5) The melt-solidified part has an alloy composition that satisfies F5=([Zn]+3[Sn]+5[Si]+3[Al])/[P]=60 to 3000 (preferably F5=120 to 1600, and more preferably F5=200 to 1100). Meanwhile, in F5, if an element 'a' is not contained, [a]=0.

(6) The melt-solidified part has a crystal structure, in which the mean grain size is 300 μm or less (preferably 100 μm or less, more preferably 50 μm or less, further more preferably 30 μm or less, and optimally 20 μm or less) in the macro-structure after the melt-solidification. For example, when a material to be welded is one of the following materials; hot rolling material, hot extruding material, hot forging material, and any of the preceding materials that are cold-worked or cold-worked and annealed alternately, the grain size is generally in the range of 10 to 100 μm. However, if the material is welded, the grains are coarsened in the welded heat affected zones, which are adjacent to the welded areas (the border areas between the welded areas and the non-welded areas or the vicinity thereof). That is, in the welded heat affected zones, heat arising from the welding is likely to coarsen the grains as large as about 300 μm, thereby impairing the strength, corrosion resistance or the like of the welded substance (melt-solidified substance). The above problem also occurs at the melt-solidification other than welding (for example, fusing or the like). Therefore, in order to solve the above problem in a melt-solidified substance including copper alloy melt-solidified parts including welded part, built-up area, thermal sprayed layer, fused end part formed by melt-solidification including welding, build-up welding, thermal spraying, fusing, the grain size at the melt-solidified areas needs to be at least 300 μm or less. In addition, considering that the melt-solidification accompanies the same melt-solidification phenomenon as casting, and thus the melt-solidified parts form a structure identical or similar to a cast structure, needless to say, it is preferable that the grain size (mean grain size) in the melt-solidified parts be 100 μm or less, and, if various properties such as corrosion resistance or the like are taken into account, the grain size is preferably 50 μm or less, more preferably 30 μm or less, and optimally 20 μm or less.

(7) In the melt-solidified parts, the primary crystal that appears during the melt-solidification is α-phase.

(8) At the room-temperature after the melt-solidification, the melt-solidified parts have a metallic structure including α-phase, the matrix, and at least one of β, κ, γ, and δ-phases.

(9) In the metallic structure of (8), the content (area ratio) of β-phase is 10% or less (preferably 5% or less, more preferably 2% or less, further more preferably 1% or less, and optimally 0.5% or less).

(10) The melt-solidified parts have a crystal structure, in which the dendrite network is divided and the two-dimensional shape of the grains or α-phase grains is circular, substantially circular, oval, cross-like, acicular, or polygonal.

(11) In the melt-solidified parts, the content of Zr, not in the form of oxide and/or sulfide, is in the range of 0.0005 to 0.039 mass % (preferably 0.002 to 0.029 mass %, more preferably 0.003 to 0.019 mass %, and optimally 0.004 to 0.015 mass %) under the condition of [P]/[Zr]=0.5 to 150 (preferably 1 to 50, more preferably 1.8 to 30, and optimally 3 to 18).

(12) In the melt-solidified parts, peritectic reaction occurs during the melt-solidification.

The first to eighteenth melt-solidified substances are provided in the form of, for example, welded pipe, welded structure, thermal sprayed structure, built-up welded structure or fused substance.

That is, the welded pipe has a melt-solidified area which is melt-solidified and jointed by welding, and such welded pipe is manufactured by bending the first copper alloy for melt-solidification in the form of a plate so that the both ends of the plate are jointed to form a cylinder, and then by welding the jointed area. When the both ends (joint area) are jointed for the welded pipe, welding is conducted with or without using a copper alloy filler metal (welding rod, solid wire or the like).

In addition, the welded structure is composed of at least two welded copper materials jointed together by welding. For the welded structure, welding (butt welding and the like) is conducted with or without using a filler metal.

Furthermore, the thermal sprayed structure is manufactured by thermal spraying a copper alloy on the surface of a base material, and the melt-solidified parts are composed of sprayed copper alloy layers (including lining layers). As a base material, various metals (including copper material and copper alloy material) such as iron plate, steel pipe or the like can be used. As a spraying material, a granular, rod-like or linear material can be used according to the device to be used.

The build-up welded structure is manufactured by build-up welding a copper alloy filler metal (welding rod, solid wire or the like) on the surface of a base material, and the melt-solidified parts are composed of copper alloy built-up layers (including lining layers), which are build-up layers. As a base material, various metals (including copper material and copper alloy material) such as iron plate, steel pipe or the like can be used.

The fused substance is manufactured by fusing (gas cutting or the like) a copper alloy material to be fused, and the melt-solidified parts are composed of fused areas.

In addition, the invention proposes copper alloy materials for melt-solidification used when the first to eighteenth melt-solidified substances are manufactured. That is, the first to eighteenth melt-solidified substances can be easily obtained by using the following first to eighteenth copper alloys for melt-solidification as a material to be welded, material to be fused, welding rod or material to be metallized. Meanwhile, if the first to eighteenth melt-solidified substances are manufactured by using more than one copper alloy material at the same time (for example, the material to be welded and the welding rod), the first to eighteenth melt-solidified substrates can be obtained by using at least one of the first to eighteenth copper alloys for melt-solidification as a weld material.

The first copper alloy for melt-solidification has an alloy composition containing Zr: 0.0005 to 0.05 mass % (preferably 0.003 to 0.039 mass %, more preferably 0.004 to 0.034 mass %, further more preferably 0.005 to 0.029 mass %, and optimally 0.007 to 0.024 mass %); P: 0.01 to 0.35 mass % (preferably 0.02 to 0.19 mass %, more preferably 0.03 to 0.16 mass %, and optimally 0.035 to 0.12 mass %); and Cu: the remainder, and satisfies the following conditions (21) and (26). It is preferable that the first copper alloy for melt-solidification satisfy the following conditions (27), (30), and (31) in addition to the above conditions.

The second copper alloy for melt-solidification has an alloy composition containing Zr: 0.0005 to 0.05 mass % (preferably 0.003 to 0.039 mass %, more preferably 0.004 to 0.034 mass %, further more preferably 0.005 to 0.029 mass %, and optimally 0.007 to 0.024 mass %); P: 0.01 to 0.35 mass % (preferably 0.02 to 0.19 mass %, more preferably 0.03 to 0.16 mass %, and optimally 0.035 to 0.12 mass %); Zn: 0.01 to 38 mass % (preferably 5 to 37 mass %, more preferably 12 to 36 mass %, and optimally 17 to 34 mass %); and Cu: the remainder, and satisfies the following conditions (21) and (26). It is preferable that the second copper alloy for melt-solidification satisfy the following conditions (22) to (25), and (27) to (31) in addition to the above conditions.

The third copper alloy for melt-solidification has an alloy composition containing Zr: 0.0005 to 0.05 mass % (preferably 0.003 to 0.039 mass %, more preferably 0.004 to 0.034 mass %, further more preferably 0.005 to 0.029 mass %, and optimally 0.007 to 0.024 mass %); P: 0.01 to 0.35 mass % (preferably 0.02 to 0.19 mass %, more preferably 0.03 to 0.16 mass %, and optimally 0.035 to 0.12 mass %); one or more elements selected from Sn: 0.01 to 15 mass % (preferably 0.1 to 12 mass %, more preferably 0.5 to 8 mass %, and optimally 0.6 to 2 mass %), Si: 0.01 to 5 mass % (preferably 0.05 to 4.8 mass %, more preferably 0.1 to 4.5 mass %, and optimally 2.6 to 3.7 mass %), and Al: 0.01 to 9 mass % (preferably 0.1 to 8.5 mass %, and more preferably 0.2 to 3 mass %); and Cu: the remainder, and satisfies the following conditions (21) and (26). It is preferable that the third copper alloy for melt-solidification satisfy the following conditions (22) to (25), and (27) to (31) in addition to the above conditions.

The fourth copper alloy for melt-solidification has an alloy composition containing Zr: 0.0005 to 0.05 mass % (preferably 0.003 to 0.039 mass %, more preferably 0.004 to 0.034 mass %, further more preferably 0.005 to 0.029 mass %, and optimally 0.007 to 0.024 mass %); P: 0.01 to 0.35 mass % (preferably 0.02 to 0.19 mass %, more preferably 0.03 to 0.16 mass %, and optimally 0.035 to 0.12 mass %); Zn: 0.01 to 38 mass % (preferably 5 to 37 mass %, more preferably 12 to 36 mass %, and optimally 17 to 34 mass %); one or more elements selected from Sn: 0.01 to 15 mass % (preferably 0.1 to 12 mass %, more preferably 0.5 to 8 mass %, and optimally 0.6 to 2 mass %), Si: 0.01 to 5 mass % (preferably 0.05 to 4.8 mass %, more preferably 0.1 to 4.5 mass %, and optimally 2.6 to 3.7 mass %), and Al: 0.01 to 9 mass % (preferably 0.1 to 8.5 mass %, and more preferably 0.2 to 3 mass %); and Cu: the remainder, and satisfies the following conditions (21) and (26). It is preferable that the fourth copper alloy for melt-solidification satisfy the following conditions (22) to (25), and (27) to (31) in addition to the above conditions.

The fifth copper alloy for melt-solidification has an alloy composition containing Zr: 0.0005 to 0.05 mass % (preferably 0.003 to 0.039 mass %, more preferably 0.004 to 0.034 mass %, further more preferably 0.005 to 0.029 mass %, and optimally 0.007 to 0.024 mass %); P: 0.01 to 0.35 mass % (preferably 0.02 to 0.19 mass %, more preferably 0.03 to 0.16 mass %, and optimally 0.035 to 0.12 mass %); Zn: 0.01 to 38 mass % (preferably 5 to 37 mass %, more preferably 12 to 36 mass %, and optimally 17 to 34 mass %); one or more elements selected from Sb: 0.02 to 0.15 mass % (preferably 0.03 to 0.12 mass %), As: 0.02 to 0.15 mass % (preferably 0.03 to 0.12 mass %), Mg: 0.001 to 0.2 mass % (preferably 0.002 to 0.1 mass %), and Mn: 0.01 to 4 mass % (preferably 0.05 to 4 mass %, and more preferably 0.5 to 3 mass %); and Cu: the remainder, and satisfies the following conditions (21) and (26). It is preferable that the fifth copper alloy for melt-solidification satisfy the following conditions (22) to (25), and (27) to (31) in addition to the above conditions.

The sixth copper alloy for melt-solidification has an alloy composition containing Zr: 0.0005 to 0.05 mass % (preferably 0.003 to 0.039 mass %, more preferably 0.004 to 0.034 mass %, further more preferably 0.005 to 0.029 mass %, and optimally 0.007 to 0.024 mass %); P: 0.01 to 0.35 mass % (preferably 0.02 to 0.19 mass %, more preferably 0.03 to 0.16 mass %, and optimally 0.035 to 0.12 mass %); one or more elements selected from Sn: 0.01 to 15 mass % (preferably 0.1 to 12 mass %, more preferably 0.5 to 8 mass %, and optimally 0.6 to 2 mass %), Si: 0.01 to 5 mass % (preferably 0.05 to 4.8 mass %, more preferably 0.1 to 4.5 mass %, and optimally 2.6 to 3.7 mass %), and Al: 0.01 to 9 mass % (preferably 0.1 to 8.5 mass %, and more preferably 0.2 to 3 mass %); one or more elements selected from Sb: 0.02 to 0.15 mass % (preferably 0.03 to 0.12 mass %), As: 0.02 to 0.15 mass % (preferably 0.03 to 0.12 mass %), Mg: 0.001 to 0.2 mass % (preferably 0.002 to 0.1 mass %), and Mn: 0.01 to 4 mass % (preferably 0.05 to 4 mass %, and more preferably 0.5 to 3 mass %); and Cu: the remainder, and satisfies the following conditions (21) and (26). It is preferable that the sixth copper alloy for melt-solidification satisfy the following conditions (22) to (25), and (27) to (31) in addition to the above conditions.

The seventh copper alloy for melt-solidification has an alloy composition containing Zr: 0.0005 to 0.05 mass % (preferably 0.003 to 0.039 mass %, more preferably 0.004 to 0.034 mass %, further more preferably 0.005 to 0.029 mass %, and optimally 0.007 to 0.024 mass %); P: 0.01 to 0.35 mass % (preferably 0.02 to 0.19 mass %, more preferably 0.03 to 0.16 mass %, and optimally 0.035 to 0.12 mass %); Zn: 0.01 to 38 mass % (preferably 5 to 37 mass %, more preferably 12 to 36 mass %, and optimally 17 to 34 mass %); one or more elements selected from Sn: 0.01 to 15 mass % (preferably 0.1 to 12 mass %, more preferably 0.5 to 8 mass %, and optimally 0.6 to 2 mass %), Si: 0.01 to 5 mass % (preferably 0.05 to 4.8 mass %, more preferably 0.1 to 4.5 mass %, and optimally 2.6 to 3.7 mass %), and Al: 0.01 to 9 mass % (preferably 0.1 to 8.5 mass %, and more preferably 0.2 to 3 mass %); one or more elements selected from Sb: 0.02 to 0.15 mass % (preferably 0.03 to 0.12 mass %), As: 0.02 to 0.15 mass % (preferably 0.03 to 0.12 mass %), Mg: 0.001 to 0.2 mass % (preferably 0.002 to 0.1 mass %), and Mn: 0.01 to 4 mass % (preferably 0.05 to 4 mass %, and more preferably 0.5 to 3 mass %); and Cu: the remainder, and satisfies the following conditions (21) and (26). It is preferable that the seventh copper alloy for melt-solidification satisfy the following conditions (22) to (25), and (27) to (31) in addition to the above conditions.

The eighth copper alloy for melt-solidification has an alloy composition containing Zr: 0.0005 to 0.05 mass % (preferably 0.003 to 0.039 mass %, more preferably 0.004 to 0.034 mass %, further more preferably 0.005 to 0.029 mass %, and optimally 0.007 to 0.024 mass %); P: 0.01 to 0.35 mass % (preferably 0.02 to 0.19 mass %, more preferably 0.03 to 0.16 mass %, and optimally 0.035 to 0.12 mass %); Zn: 0.01 to 38 mass % (preferably 5 to 37 mass %, more preferably 12 to 36 mass %, and optimally 17 to 34 mass %); one or more elements selected from Pb: 0.005 to 15 mass % (preferably 0.005 to 4 mass %, more preferably 0.005 to 1 mass %, and optimally 0.01 to 0.2 mass %), Bi: 0.005 to 15 mass % (preferably 0.005 to 3 mass %, more preferably 0.005 to 1 mass %, and optimally 0.01 to 0.2 mass %), Se: 0.01 to 2 mass % (preferably 0.03 to 0.5 mass %, and more preferably 0.05 to 0.3 mass %), and Te: 0.03 to 1.5 mass % (preferably 0.05 to 0.5 mass %, and more preferably 0.05 to 0.3 mass %); and Cu: the remainder, and satisfies the following conditions (21) and (26). It is preferable that the eighth copper alloy for melt-solidification satisfy the following conditions (22) to (25), and (27) to (31) in addition to the above conditions.

The ninth copper alloy for melt-solidification has an alloy composition containing Zr: 0.0005 to 0.05 mass % (preferably 0.003 to 0.039 mass %, more preferably 0.004 to 0.034 mass %, further more preferably 0.005 to 0.029 mass %, and optimally 0.007 to 0.024 mass %); P: 0.01 to 0.35 mass % (preferably 0.02 to 0.19 mass %, more preferably 0.03 to 0.16 mass %, and optimally 0.035 to 0.12 mass %); one or more elements selected from Sn: 0.01 to 15 mass % (preferably 0.1 to 12 mass %, more preferably 0.5 to 8 mass %, and optimally 0.6 to 2 mass %), Si: 0.01 to 5 mass % (preferably 0.05 to 4.8 mass %, more preferably 0.1 to 4.5 mass %, and optimally 2.6 to 3.7 mass %), and Al: 0.01 to 9 mass % (preferably 0.1 to 8.5 mass %, and more preferably 0.2 to 3 mass %); one or more elements selected from Pb: 0.005 to 15 mass % (preferably 0.005 to 4 mass %, more preferably 0.005 to 1 mass %, and optimally 0.01 to 0.2 mass %), Bi: 0.005 to 15 mass % (preferably 0.005 to 3 mass %, more preferably 0.005 to 1 mass %, and optimally 0.01 to 0.2 mass %), Se: 0.01 to 2 mass % (preferably 0.03 to 0.5 mass %, and more preferably 0.05 to 0.3 mass %), and Te: 0.03 to 1.5 mass % (preferably 0.05 to 0.5 mass %, and more preferably 0.05 to 0.3 mass %); and Cu: the remainder, and satisfies the following conditions (21) and (26). It is preferable that the ninth copper alloy for melt-solidification satisfy the following conditions (22) to (25), and (27) to (31) in addition to the above conditions.

The tenth copper alloy for melt-solidification has an alloy composition containing Zr: 0.0005 to 0.05 mass % (preferably 0.003 to 0.039 mass %, more preferably 0.004 to 0.034 mass %, further more preferably 0.005 to 0.029 mass %, and optimally 0.007 to 0.024 mass %); P: 0.01 to 0.35 mass % (preferably 0.02 to 0.19 mass %, more preferably 0.03 to 0.16 mass %, and optimally 0.035 to 0.12 mass %); Zn: 0.01 to 38 mass % (preferably 5 to 37 mass %, more preferably 12 to 36 mass %, and optimally 17 to 34 mass %); one or more elements selected from Sn: 0.01 to 15 mass % (preferably 0.1 to 12 mass %, more preferably 0.5 to 8 mass %, and optimally 0.6 to 2 mass %), Si: 0.01 to 5 mass % (preferably 0.05 to 4.8 mass %, more preferably 0.1 to 4.5 mass %, and optimally 2.6 to 3.7 mass %), and Al: 0.01 to 9 mass % (preferably 0.1 to 8.5 mass %, and more preferably 0.2 to 3 mass %); one or more elements selected from Pb: 0.005 to 15 mass % (preferably 0.005 to 4 mass %, more preferably 0.005 to 1 mass %, and optimally 0.01 to 0.2 mass %), Bi: 0.005 to 15 mass % (preferably 0.005 to 3 mass %, more preferably 0.005 to 1 mass %, and optimally 0.01 to 0.2 mass %), Se: 0.01 to 2 mass % (preferably 0.03 to 0.5 mass %, and more preferably 0.05 to 0.3 mass %), and Te: 0.03 to 1.5 mass % (preferably 0.05 to 0.5 mass %, and more preferably 0.05 to 0.3 mass %); and Cu: the remainder, and satisfies the following conditions (21) and (26). It is preferable that the tenth copper alloy for melt-solidification satisfy the following conditions (22) to (25), and (27) to (31) in addition to the above conditions.

The eleventh copper alloy for melt-solidification has an alloy composition containing Zr: 0.0005 to 0.05 mass % (preferably 0.003 to 0.039 mass %, more preferably 0.004 to 0.034 mass %, further more preferably 0.005 to 0.029 mass %, and optimally 0.007 to 0.024 mass %); P: 0.01 to 0.35 mass % (preferably 0.02 to 0.19 mass %, more preferably 0.03 to 0.16 mass %, and optimally 0.035 to 0.12 mass %); Zn: 0.01 to 38 mass % (preferably 5 to 37 mass %, more preferably 12 to 36 mass %, and optimally 17 to 34 mass %); one or more elements selected from Sb: 0.02 to 0.15 mass % (preferably 0.03 to 0.12 mass %), As: 0.02 to 0.15 mass % (preferably 0.03 to 0.12 mass %), Mg: 0.001 to 0.2 mass % (preferably 0.002 to 0.1 mass %), and Mn: 0.01 to 4 mass % (preferably 0.05 to 4 mass %, and more preferably 0.5 to 3 mass %); one or more elements selected from Pb: 0.005 to 15 mass % (preferably 0.005 to 4 mass %, more preferably 0.005 to 1 mass %, and optimally 0.01 to 0.2 mass %), Bi: 0.005 to 15 mass % (preferably 0.005 to 3 mass %, more preferably 0.005 to 1 mass %, and optimally 0.01 to 0.2 mass %), Se: 0.01 to 2 mass % (preferably 0.03 to 0.5 mass %, and more preferably 0.05 to 0.3 mass %), and Te: 0.03 to 1.5 mass % (preferably 0.05 to 0.5 mass %, and more preferably 0.05 to 0.3 mass %); and Cu: the remainder, and satisfies the following conditions (21) and (26). It is preferable that the eleventh copper alloy for melt-solidification satisfy the following conditions (22) to (25), and (27) to (31) in addition to the above conditions.

The twelfth copper alloy for melt-solidification has an alloy composition containing Zr: 0.0005 to 0.05 mass % (preferably 0.003 to 0.039 mass %, more preferably 0.004 to 0.034 mass %, further more preferably 0.005 to 0.029 mass %, and optimally 0.007 to 0.024 mass %); P: 0.01 to 0.35 mass % (preferably 0.02 to 0.19 mass %, more preferably 0.03 to 0.16 mass %, and optimally 0.035 to 0.12 mass %); one or more elements selected from Sn: 0.01 to 15 mass % (preferably 0.1 to 12 mass %, more preferably 0.5 to 8 mass %, and optimally 0.6 to 2 mass %), Si: 0.01 to 5 mass % (preferably 0.05 to 4.8 mass %, more preferably 0.1 to 4.5 mass %, and optimally 2.6 to 3.7 mass %), and Al: 0.01 to 9 mass % (preferably 0.1 to 8.5 mass %, and more preferably 0.2 to 3 mass %); one or more elements selected from Sb: 0.02 to 0.15 mass % (preferably 0.03 to 0.12 mass %), As: 0.02 to 0.15 mass % (preferably 0.03 to 0.12 mass %), Mg: 0.001 to 0.2 mass % (preferably 0.002 to 0.1 mass %), and Mn: 0.01 to 4 mass % (preferably 0.05 to 4 mass %, and more preferably 0.5 to 3 mass %); one or more elements selected from Pb: 0.005 to 15 mass % (preferably 0.005 to 4 mass %, more preferably 0.005 to 1 mass %, and optimally 0.01 to 0.2 mass %), Bi: 0.005 to 15 mass % (preferably 0.005 to 3 mass %, more preferably 0.005 to 1 mass %, and optimally 0.01 to 0.2 mass %), Se: 0.01 to 2 mass % (preferably 0.03 to 0.5 mass %, and more preferably 0.05 to 0.3 mass %), and Te: 0.03 to 1.5 mass % (preferably 0.05 to 0.5 mass %, and more preferably 0.05 to 0.3 mass %); and Cu: the remainder, and satisfies the following conditions (21) and (26). It is preferable that the twelfth copper alloy for melt-solidification satisfy the following conditions (22) to (25), and (27) to (31) in addition to the above conditions.

The thirteenth copper alloy for melt-solidification has an alloy composition containing Zr: 0.0005 to 0.05 mass % (preferably 0.003 to 0.039 mass %, more preferably 0.004 to 0.034 mass %, further more preferably 0.005 to 0.029 mass %, and optimally 0.007 to 0.024 mass %); P: 0.01 to 0.35 mass % (preferably 0.02 to 0.19 mass %, more preferably 0.03 to 0.16 mass %, and optimally 0.035 to 0.12 mass %); Zn: 0.01 to 38 mass % (preferably 5 to 37 mass %, more preferably 12 to 36 mass %, and optimally 17 to 34 mass %); one or more elements selected from Sn: 0.01 to 15 mass % (preferably 0.1 to 12 mass %, more preferably 0.5 to 8 mass %, and optimally 0.6 to 2 mass %), Si: 0.01 to 5 mass % (preferably 0.05 to 4.8 mass %, more preferably 0.1 to 4.5 mass %, and optimally 2.6 to 3.7 mass %), and Al: 0.01 to 9 mass % (preferably 0.1 to 8.5 mass %, and more preferably 0.2 to 3 mass %); one or more elements selected from Sb: 0.02 to 0.15 mass % (preferably 0.03 to 0.12 mass %), As: 0.02 to 0.15 mass % (preferably 0.03 to 0.12 mass %), Mg: 0.001 to 0.2 mass % (preferably 0.002 to 0.1 mass %), and Mn: 0.01 to 4 mass % (preferably 0.05 to 4 mass %, and more preferably 0.5 to 3 mass %); one or more elements selected from Pb: 0.005 to 15 mass % (preferably 0.005 to 4 mass %, more preferably 0.005 to 1 mass %, and optimally 0.01 to 0.2 mass %), Bi: 0.005 to 15 mass % (preferably 0.005 to 3 mass %, more preferably 0.005 to 1 mass %, and optimally 0.01 to 0.2 mass %), Se: 0.01 to 2 mass % (preferably 0.03 to 0.5 mass %, and more preferably 0.05 to 0.3 mass %), and Te: 0.03 to 1.5 mass % (preferably 0.05 to 0.5 mass %, and more preferably 0.05 to 0.3 mass %); and Cu: the remainder, and satisfies the following conditions (21) and (26). It is preferable that the thirteenth copper alloy for melt-solidification satisfy the following conditions (22) to (25), and (27) to (31) in addition to the above conditions.

The fourteenth copper alloy for melt-solidification has an alloy composition containing Zr: 0.0005 to 0.05 mass % (preferably 0.003 to 0.039 mass %, more preferably 0.004 to 0.034 mass %, further more preferably 0.005 to 0.029 mass %, and optimally 0.007 to 0.024 mass %); P: 0.01 to 0.35 mass % (preferably 0.02 to 0.19 mass %, more preferably 0.03 to 0.16 mass %, and optimally 0.035 to 0.12 mass %); one or more elements selected from Sn: 0.01 to 15 mass % (preferably 0.1 to 12 mass %, more preferably 0.5 to 8 mass %, and optimally 0.6 to 2 mass %), Si: 0.01 to 5 mass % (preferably 0.05 to 4.8 mass %, more preferably 0.1 to 4.5 mass %, and optimally 2.6 to 3.7 mass %), and Al: 0.01 to 9 mass % (preferably 0.1 to 8.5 mass %, and more preferably 0.2 to 3 mass %); one or more elements selected from Co: 0.005 to 0.3 mass % (preferably 0.01 to 0.05 mass %), Cr: 0.005 to 0.3 mass % (preferably 0.01 to 0.05 mass %), C: 0.00005 to 0.02 mass % (preferably 0.0001 to 0.01 mass %), Ti: 0.005 to 0.3 mass % (preferably 0.0005 to 0.01 mass %), B: 0.0002 to 0.05 mass % (preferably 0.0005 to 0.01 mass %), and rare earth element: 0.01 to 0.5 mass % (preferably 0.05 to 0.2 mass %); and Cu: the remainder, and satisfies the following conditions (21) and (26). It is preferable that the fourteenth copper alloy for melt-solidification satisfy the following conditions (22) to (25), and (27) to (31) in addition to the above conditions.

The fifteenth copper alloy for melt-solidification has an alloy composition containing Zr: 0.0005 to 0.05 mass % (preferably 0.003 to 0.039 mass %, more preferably 0.004 to 0.034 mass %, further more preferably 0.005 to 0.029 mass %, and optimally 0.007 to 0.024 mass %); P: 0.01 to 0.35 mass % (preferably 0.02 to 0.19 mass %, more preferably 0.03 to 0.16 mass %, and optimally 0.035 to 0.12 mass %); Zn: 0.01 to 38 mass % (preferably 5 to 37 mass %, more preferably 12 to 36 mass %, and optimally 17 to 34 mass %); one or more elements selected from Sn: 0.01 to 15 mass % (preferably 0.1 to 12 mass %, more preferably 0.5 to 8 mass %, and optimally 0.6 to 2 mass %), Si: 0.01 to 5 mass % (preferably 0.05 to 4.8 mass %, more preferably 0.1 to 4.5 mass %, and optimally 2.6 to 3.7 mass %), and Al: 0.01 to 9 mass % (preferably 0.1 to 8.5 mass %, and more preferably 0.2 to 3 mass %); one or more elements selected from Co: 0.005 to 0.3 mass % (preferably 0.01 to 0.05 mass %), Cr: 0.005 to 0.3 mass % (preferably 0.01 to 0.05 mass %), C: 0.00005 to 0.02 mass % (preferably 0.0001 to 0.01 mass %), Ti: 0.005 to 0.3 mass % (preferably 0.0005 to 0.01 mass %), B: 0.0002 to 0.05 mass % (preferably 0.0005 to 0.01 mass %), and rare earth element: 0.01 to 0.5 mass % (preferably 0.05 to 0.2 mass %); and Cu: the remainder, and satisfies the following conditions (21) and (26). It is preferable that the fifteenth copper alloy for melt-solidification satisfy the following conditions (22) to (25), and (27) to (31) in addition to the above conditions.

The sixteenth copper alloy for melt-solidification has an alloy composition containing Zr: 0.0005 to 0.05 mass % (preferably 0.003 to 0.039 mass %, more preferably 0.004 to 0.034 mass %, further more preferably 0.005 to 0.029 mass %, and optimally 0.007 to 0.024 mass %); P: 0.01 to 0.35 mass % (preferably 0.02 to 0.19 mass %, more preferably 0.03 to 0.16 mass %, and optimally 0.035 to 0.12 mass %); Zn: 0.01 to 38 mass % (preferably 5 to 37 mass %, more preferably 12 to 36 mass %, and optimally 17 to 34 mass %); one or more elements selected from Sb: 0.02 to 0.15 mass % (preferably 0.03 to 0.12 mass %), As: 0.02 to 0.15 mass % (preferably 0.03 to 0.12 mass %), Mg: 0.001 to 0.2 mass % (preferably 0.002 to 0.1 mass %), and Mn: 0.01 to 4 mass % (preferably 0.05 to 4 mass %, and more preferably 0.5 to 3 mass %); one or more elements selected from Co: 0.005 to 0.3 mass % (preferably 0.01 to 0.05 mass %), Cr: 0.005 to 0.3 mass % (preferably 0.01 to 0.05 mass %), C: 0.00005 to 0.02 mass % (preferably 0.0001 to 0.01 mass %), Ti: 0.005 to 0.3 mass % (preferably 0.0005 to 0.01 mass %), B: 0.0002 to 0.05 mass % (preferably 0.0005 to 0.01 mass %), and rare earth element: 0.01 to 0.5 mass % (preferably 0.05 to 0.2 mass %); and Cu: the remainder, and satisfies the following conditions (21) and (26). It is preferable that the sixteenth copper alloy for melt-solidification satisfy the following conditions (22) to (25), and (27) to (31) in addition to the above conditions.

The seventeenth copper alloy for melt-solidification has an alloy composition containing Zr: 0.0005 to 0.05 mass % (preferably 0.003 to 0.039 mass %, more preferably 0.004 to 0.034 mass %, further more preferably 0.005 to 0.029 mass %, and optimally 0.007 to 0.024 mass %); P: 0.01 to 0.35 mass % (preferably 0.02 to 0.19 mass %, more preferably 0.03 to 0.16 mass %, and optimally 0.035 to 0.12 mass %); one or more elements selected from Sn: 0.01 to 15 mass % (preferably 0.1 to 12 mass %, more preferably 0.5 to 8 mass %, and optimally 0.6 to 2 mass %), Si: 0.01 to 5 mass % (preferably 0.05 to 4.8 mass %, more preferably 0.1 to 4.5 mass %, and optimally 2.6 to 3.7 mass %), and Al: 0.01 to 9 mass % (preferably 0.1 to 8.5 mass %, and more preferably 0.2 to 3 mass %); one or more elements selected from Sb: 0.02 to 0.15 mass % (preferably 0.03 to 0.12 mass %), As: 0.02 to 0.15 mass % (preferably 0.03 to 0.12 mass %), Mg: 0.001 to 0.2 mass % (preferably 0.002 to 0.1 mass %), and Mn: 0.01 to 4 mass % (preferably 0.05 to 4 mass %, and more preferably 0.5 to 3 mass %); one or more elements selected from Co: 0.005 to 0.3 mass % (preferably 0.01 to 0.05 mass %), Cr: 0.005 to 0.3 mass % (preferably 0.01 to 0.05 mass %), C: 0.00005 to 0.02 mass % (preferably 0.0001 to 0.01 mass %), Ti: 0.005 to 0.3 mass % (preferably 0.0005 to 0.01 mass %), B: 0.0002 to 0.05 mass % (preferably 0.0005 to 0.01 mass %), and rare earth element: 0.01 to 0.5 mass % (preferably 0.05 to 0.2 mass %); and Cu: the remainder, and satisfies the following conditions (21) and (26). It is preferable that the seventeenth copper alloy for melt-solidification satisfy the following conditions (22) to (25), and (27) to (31) in addition to the above conditions.

The eighteenth copper alloy for melt-solidification has an alloy composition containing Zr: 0.0005 to 0.05 mass % (preferably 0.003 to 0.039 mass %, more preferably 0.004 to 0.034 mass %, further more preferably 0.005 to 0.029 mass %, and optimally 0.007 to 0.024 mass %); P: 0.01 to 0.35 mass % (preferably 0.02 to 0.19 mass %, more preferably 0.03 to 0.16 mass %, and optimally 0.035 to 0.12 mass %); Zn: 0.01 to 38 mass % (preferably 5 to 37 mass %, more preferably 12 to 36 mass %, and optimally 17 to 34 mass %); one or more elements selected from Sn: 0.01 to 15 mass % (preferably 0.1 to 12 mass %, more preferably 0.5 to 8 mass %, and optimally 0.6 to 2 mass %), Si: 0.01 to 5 mass % (preferably 0.05 to 4.8 mass %, more preferably 0.1 to 4.5 mass %, and optimally 2.6 to 3.7 mass %), and Al: 0.01 to 9 mass % (preferably 0.1 to 8.5 mass %, and more preferably 0.2 to 3 mass %); one or more elements selected from Sb: 0.02 to 0.15 mass % (preferably 0.03 to 0.12 mass %), As: 0.02 to 0.15 mass % (preferably 0.03 to 0.12 mass %), Mg: 0.001 to 0.2 mass % (preferably 0.002 to 0.1 mass %), Mn: 0.01 to 4 mass % (preferably 0.05 to 4 mass %, and more preferably 0.5 to 3 mass %); one or more elements selected from Co: 0.005 to 0.3 mass % (preferably 0.01 to 0.05 mass %), Cr: 0.005 to 0.3 mass % (preferably 0.01 to 0.05 mass %), C: 0.00005 to 0.02 mass % (preferably 0.0001 to 0.01 mass %), Ti: 0.005 to 0.3 mass % (preferably 0.0005 to 0.01 mass %), B: 0.0002 to 0.05 mass % (preferably 0.0005 to 0.01 mass %), and rare earth element: 0.01 to 0.5 mass % (preferably 0.05 to 0.2 mass %); and Cu: the remainder, and satisfies the following conditions (21) and (26). It is preferable that the eighteenth copper alloy for melt-solidification satisfy the following conditions (22) to (25), and (27) to (31) in addition to the above conditions.

(21) Having an alloy composition that satisfies f1=[P]/[Zr]=0.3 to 200 (preferably f1=0.5 to 65, more preferably f1=0.8 to 35, further more preferably f1=1.2 to 20, and optimally F1=1.6 to 14)

(22) The copper alloy for melt-solidification has an alloy composition that satisfies f2=[Cu]−3[P]−3.5[Si]−0.5[Sn]−1.8[Al]−0.5([Sb]+[As]+[Mg])+[Mn]+0.5([Pb]+[Bi]+[Se]+[Te])=60 to 97 (preferably f2=61 to 90, more preferably f2=62 to 76, further more preferably f2=63 to 69, and optimally f2=64 to 67.5). Meanwhile, in f2, if an element 'a' is not contained, [a]=0.

(23) The copper alloy for melt-solidification has an alloy composition that satisfies f3=[Zn]+3[Sn]+5[Si]+3[Al]=10 to 45 (preferably f3=16 to 42, more preferably f3=22 to 40, and optimally f3=28 to 38). Meanwhile, in f3, if an element 'a' is not contained, [a]=0.

(24) The copper alloy for melt-solidification has an alloy composition that satisfies f4=([Zn]+3[Sn]+5[Si]+3[Al])/[Zr]=300 to 35000 (preferably f4=600 to 14000, and more preferably f4=1000 to 9000). Meanwhile, in f4, if an element 'a' is not contained, [a]=0.

(25) The copper alloy for melt-solidification has an alloy composition that satisfies f5=([Zn]+3[Sn]+5[Si]+3[Al])/[P]=60 to 3000 (preferably f5=120 to 1600, and more preferably f5=200 to 1100). Meanwhile, in F5, if an element 'a' is not contained, [a]=0.

(26) The copper alloy for melt-solidification has a crystal structure, in which the mean grain size is 30 μm or less (preferably 100 μm or less, more preferably 50 μm or less, further more preferably 30 μm or less, and optimally 20 μm or less) at the macro-structure after the melt-solidification. Meanwhile, 'the mean grain size at the macro-structure after the melt-solidification' in conditions (26) and (6) means an average value of the grain sizes at the macro-structure of the copper alloy, on which no plastic working (extruding, rolling or the like) or heat treatment (annealing or the like) is performed after casting (including casting by various casting methods that are well known in the related art, for example, permanent mold casting, sand casting, horizontal continuous casting, upward (upcast), semi-solid metal casting, semi-solid metal forging or the like) or melt-solidification including welding, build-up spray welding, metallizing, fusing.

(27) The primary crystal that appears during the melt-solidification is α-phase.

(28) At the room-temperature after the melt-solidification, the copper alloy for melt-solidification have a metallic structure including α-phase, the matrix, and at least one of β, κ, γ, and δ-phases.

(29) In the metallic structure of (28), the content (area ratio) of β-phase is 10% or less (preferably 5% or less, more preferably 2% or less, further more preferably 1% or less, and optimally 0% (no β-phase is contained)).

(30) The copper alloy for melt-solidification has a crystal structure, in which the dendrite network is divided and the two-dimensional shape of the grains or α-phase grains is circular, substantially circular, oval, cross-like, acicular, or polygonal.

(31) In the copper alloys for melt-solidification, the content of Zr, not in the form of oxide and/or sulfide, is in the range of 0.0005 to 0.039 mass % (preferably 0.002 to 0.029 mass %, more preferably 0.003 to 0.019 mass %, and optimally 0.004 to 0.015 mass %) under the condition of [P]/[Zr]=0.5 to 150 (preferably 1 to 50, more preferably 1.8 to 30, and optimally 3 to 18).

In the melt-solidified parts of the first to eighteenth melt-solidified substances or the first to eighteenth copper alloys for melt-solidification, Cu is a main element in the alloy composition of the melt-solidified parts or the alloys. When the content of Cu is large, α-phase can be obtained easily and the corrosion resistance (dezincification corrosion resistance, stress corrosion cracking resistance) and mechanical properties can be improved. However, if Cu is contained too much, the grain refinement is hindered. As a result, the content of Cu is defined as the remainder in consideration of the relationship with the contents of other elements. Particularly, in order to seek the grain refinement, it is preferable to value the relationship between the Cu content and the other contained elements and to satisfy condition (2) or (22). That is, it is preferable that the contents of Cu and the other elements satisfy F2=f2=[Cu]−3[P]−3.5[Si]−0.5[Sn]−1.8[Al]−0.5([Sb]+[As]+[Mg])+[Mn]+0.5([Pb]+[Bi]+[Se]+[Te])=60 to 97. The minimum values of F2 and f2 are related with whether the primary crystal is α-phase, and the maximum values of F2 and f2 are related with peritectic reaction. In view of these points, the values of F2 and f2 are in the range of, preferably 61 to 90, more preferably 62 to 76, further more preferably 63 to 69, and optimally 64 to 67.5.

In the melt-solidified parts of the first to eighteenth melt-solidified substances or the first to eighteenth copper alloys for melt-solidification, Zr and P are added together for the grain refinement of the copper alloys, particularly, during melt-solidification. That is, even though the single addition of Zr itself or P itself can slightly contribute to the grain refinement like the other elements, if added together, Zr and P can refine the grains effectively.

Such grain refining effect is realized when the content of Zr is 0.0005 mass % or more at the melt-solidified part, remarkably when the content of Zr is 0.002 mass % or more, more remarkably when the content of Zr is 0.003 mass % or more, further more remarkably when the content of Zr is 0.004 mass % or more, and extremely when the content of Zr is 0.006 mass % or more. Meanwhile, for the copper alloys for melt-solidification, similar to the melt-solidified parts, the content of Zr needs to be 0.0005 mass % or more. However, if the loss of Zr during melt-solidification (the oxidation loss due to the contact with air) is taken into account, the content of Zr is preferably 0.003 mass % or more, more preferably 0.004 mass % or more, further more 0.005 mass % or more, and optimally 0.007 mass % or more. With respect to P, in order to refine the grains in any of the melt-solidified parts and the copper alloys for melt-solidification, the content of P needs to be 0.01 mass % or more, preferably 0.02 mass % or more, more preferably 0.03 mass % or more, and optimally 0.035 mass % or more.

Meanwhile, if the content of Zr reaches 0.05 mass % and the content of P reaches 0.35 mass %, regardless of the other elements and the contents thereof, the grain refining effect of the co-addition of Zr and P saturates completely, and, conversely, the grain refining function is likely to deteriorate. Therefore, in order to refine the grains effectively, the content of Zr needs to be 0.05 mass % or less, and the content of P needs to be 0.35 mass % or less. If the contents of Zr and P are in the above ranges, the characteristics of the alloy, which are generated by the other elements, are not impaired. Even when a large amount of, for example, Sn, which is an element easy to segregate, is contained, thanks to the grain refinement, high Sn (to be segregated)-concentration parts can be distributed uniformly in the matrix instead of being concentrated at some certain areas. In addition, non-solid solution, machinability-improving elements such as Pb, Bi or the like are made to be in a state, in which the non-solid solution, machinability-improving elements can be used most effectively (that is, the particles of Pb, Bi and the like are fine and uniform, and are distributed and dispersed uniformly in the matrix), and further, the second phase ($\kappa$, $\gamma$, $\delta$, or $\beta$-phases) precipitates in $\alpha$-phase, the matrix, can be fine and dispersed and distributed uniformly. As a result, casting cracks can be prevented, and robust melt-solidified substances and casting products made of the copper alloys for melt-solidification having little amount of porosity, shrinkage cavity, blowhole, micro-porosity can be obtained. In addition, in the copper alloys for melt-solidification, the workability of cold drawing performed after casting can be improved, and the characteristics (particularly, corrosion resistance, machinability, impact resistance, toughness or the like) of the alloys can be further improved. Meanwhile, since Zr has an extremely strong affinity to oxygen, it is highly likely that Zr forms oxide or sulfide when melt-solidification such as welding or the like is performed in the air or a scrap material is used as raw material in manufacturing the copper alloys for melt-solidification (casting process). Furthermore, if Zr is contained excessively, since the viscosity of the molten alloy increases, it is likely that casting defects such as blowhole or micro porosity are easily generated due to the inclusion of oxide or sulfide during melt-solidification or casting.

Considering the above facts, the content of Zr in the melt-solidified parts of the first to eighteenth melt-solidified substances needs to be in the range of 0.0005 to 0.05 mass %, preferably 0.002 to 0.039 mass %, more preferably 0.003 to 0.029 mass %, further more preferably 0.004 to 0.024 mass %, and optimally 0.006 to 0.019 mass %. Meanwhile, in the first to eighteenth copper alloys for melt-solidification, the content of Zr needs to be in the range of 0.0005 to 0.05 mass %, preferably 0.003 to 0.039 mass %, more preferably 0.004 to 0.034 mass %, further more preferably 0.005 to 0.029 mass %, and optimally 0.007 to 0.024 mass %. Particularly, if Zr is not in the form of oxide or sulfide, it is preferable to satisfy conditions (11) and (31). That is, in the melt-solidified parts of the first to eighteenth melt-solidified substances, it is preferable that the content of Zr, not in the form of oxide or sulfide, be in the range of 0.0005 to 0.039 mass % (preferably 0.002 to 0.029 mass %, more preferably 0.003 to 0.019 mass %, and optimally 0.004 to 0.015 mass %) under the condition that [P]/[Zr]=0.5 to 150 (preferably 1 to 50, more preferably 1.8 to 30, and optimally 3 to 18). In addition, in the first to eighteenth copper alloys for melt-solidification, it is preferable that the content of Zr, not in the form of oxide or sulfide, be in the range of 0.0005 to 0.039 mass % (preferably 0.003 to 0.029 mass %, more preferably 0.004 to 0.024 mass %, and optimally 0.005 to 0.019 mass %) under the condition that [P]/[Zr]=0.5 to 150 (preferably 1 to 50, more preferably 1.8 to 30, and optimally 3 to 18).

In addition, even though added together with Zr to refine the grains, P also influences the corrosion resistance, castability or the like. Therefore, in addition to the grain refining effect of P caused by the co-addition of Zr, considering the influence of the minimum value of the content range of P on the corrosion resistance, castability or the like and the influence of the maximum value of the content range of P on the ductility or the like in any of the melt-solidified parts and the copper alloys for melt-solidification, the content of P needs to be in the range of 0.01 to 0.35 mass %, preferably 0.02 to 0.19 mass %, more preferably 0.03 to 0.16 mass %, and optimally 0.035 to 0.12 mass %.

Furthermore, in order that the grains are refined by the co-addition of Zr and P, not only are the contents of Zr and P in the above ranges individually, but the contents of Zr and P also satisfy conditions (1) and (21). Even though the grains are refined when the nucleation rate of $\alpha$-phase primary crystal precipitated from a molten liquid is much faster than the growth rate of dendrite crystal, in order to make the nucleation rate faster than the growth rate, not only should the contents of Zr and P be determined, but also the ratio of the contents of Zr and P (F1=f1=[P]/[Zr]) need to be considered. If the contents of Zr and P are determined in proper ranges to form a proper ratio, the nucleation of the $\alpha$-phase primary crystal can be facilitated remarkably by the co-addition and interaction of Zr and P, therefore, the nucleation rate of $\alpha$-phase primary crystal becomes much faster than the growth rate of dendrite crystal. If the contents of Zr and P are in the proper ranges and the ratio of the contents ([P]/[Zr]) is stoichiometric, some several tens ppm of Zr generates an intermetallic compound of Zr and P (for example, ZrP, $ZrP_{1-x}$) in the $\alpha$-phase crystals, and the nucleation rate of the $\alpha$-phase is increased when the values of [P]/[Zr], that is, F1 and f1 are in the range of 0.3 to 200. In the melt-solidified parts, the nucleation rate is increased further when F1=0.6 to 80, remarkably when F1=1 to 40, more remarkably when F1=1 to 40, and extremely when F1=1.4 to 25. In the copper alloys for melt-solidification, the nucleation rate is increased further when f1=0.5 to 65, remarkably when f1=0.8 to 35, more remarkably when f1=1.2 to 20, and extremely when f1=1.6 to 14. As described above, the content ratio of [P]/[Zr], that is, F1 and f1 is an important factor for the grain refinement, and, if F1 and f1 are in the above range, the nucleation rate becomes much larger than the crystal growth rate during melt-solidification. In addition, in order to refine the grains, the content ratio of Zn, Sn, Si, Al to Zr or P, that is, F3 to F5 and f3 to f5 are also important, therefore, it is preferable that the content ratios of the melt-solidified parts of the second to eighteenth melt-solidified substances and the second to eighteenth copper alloys for melt-solidification satisfy conditions (3) to (5) and (23) to (25).

Furthermore, if melt-solidification proceeds and the ratio of solid phase increases, grains grow remarkably, and some grains are combined. As a result, the α-phase grains become larger. If peritectic reaction occurs at this stage while a molten alloy is in the process of solidification, since a molten liquid, which is not solidified, reacts with the solid α-phase, β-phase is generated while the α-phase diminishes. As a result, the α-phase is surrounded by the β-phase, therefore, the size of the α-phase grains decreases and the shape of the α-phase grains becomes an oval with the edges removed. If the solid phase is fine and oval, gas can be escaped easily, and the welded parts and substances become resistant to crack accompanied by solidification shrinkage during solidification. In addition, shrinkage occurs smoothly, and various properties at room temperature such as strength, corrosion resistance or the like can be improved. Furthermore, if the solid phase is fine and oval, the weld material has good flowability, and melt-solidification such as welding or the like is performed satisfactorily, therefore, good melt-solidified parts can be obtained. In addition, for the copper alloys for melt-solidification, particularly, a material to be welded, if the solid phase is fine and oval, it has good flowability and thus, the copper alloys can be manufactured satisfactorily by the semi-solid metal solidification method. If the fine and oval solid phase and the molten liquid remain at the final stage of the solidification, the solid phase and the molten liquid can be supplied sufficiently to every corner of a mold even when the mold has a complicated shape and/or a narrow gap, and thus excellently-shaped casting products can be obtained.

Meanwhile, for the actual casting, peritectic reaction generally occurs in a wider composition than the composition at equilibrium. In this case, F2, F3, f2 and f3 play an important role, that is, the maximum values of F2 and f2 (the minimum values of F3 and f3) are related with criteria on the grain size after melt-solidification and whether peritectic reaction occurs. The minimum values of F2 and f2 (the maximum values of F3 and f3) are related with the crystal size after melt-solidification and a threshold value determining whether the primary crystal is α-phase. As F2, F3, f2 and f3 are shifted from the preferable range to optical range of the conditions (2), (3), (22) and (23), the amount of the α-phase primary crystal increases, and peritectic reaction generated at the non-equilibrium state occurs more actively. Therefore, the grains obtained at the room-temperature becomes smaller. Meanwhile, in such mechanism, it is needless to say that F4, F5, f4 and f5 are also important factors since F4, F5, f4 and f5 express the relationship between F3, f3 and Zr, P. In addition, even in any of the melt-solidified parts of the first to eighteenth melt-solidified substances and the first to eighteenth copper alloys for melt-solidification, in order to expedite the grain refinement, it is desirable that the stacking fault energy be low and peritectic reaction occur, and it is preferable that conditions (6) to (10) and (26) to (30) (conditions (6), (7), (10), (26), (27), (30) for the melt-solidified part of the first melt-solidified substance and the first copper alloy for melt-solidification) be satisfied.

Furthermore, when the first to eighteenth copper alloys for melt-solidification are manufactured, the series of melt-solidification phenomena as described above depends on the cooling rate during the casting process. That is, in the rapid cooling performed at the cooling rate of $10^{5\circ}$ C./second or higher, the grains are not refined since there is no time for nucleation. Conversely, in the slow cooling performed at the cooling rate of $10^{-3\circ}$ C./second or lower, the grains are not refined since the grain growth is facilitated, or the grains become combined easily. Furthermore, as the state approaches the equilibrium, the composition range, in which peritectic reaction occurs, narrows. It is preferable that the cooling rate during the melt-solidification process be in the range of $10^{-2\circ}$ to $10^{4\circ}$ C./second and most preferably in the range of $10^{-1\circ}$ to $10^{3\circ}$ C./second. Even in the preferable cooling rate range, as the cooling rate approaches the maximum, the composition range, in which the grains are refined, is widened. Thus, the grains are further refined. Furthermore, in melt-solidification such as welding or the like, the cooling rate of the melt-solidified parts is rapid, and, similar to the above casting process, the grains are refined more effectively.

For the melt-solidified parts of the third, fourth, sixth, seventh, ninth, tenth, twelfth to fifteenth, seventeenth and eighteenth melt-solidified substances or the third, fourth, sixth, seventh, ninth, tenth, twelfth to fifteenth, seventeenth and eighteenth copper alloys for melt-solidification, Sn, Si and Al facilitate the grain refinement, therefore, if Sn, Si and Al are contained, the grains can be refined extremely (for example, 10 μm or less) at the room-temperature after melt-solidification (during melt-solidification, the grains in the solid phase are further refined).

Even though Sn alone slightly contributes to the grain refinement, if contained in the presence of Zr and P, Sn refines the grains remarkably. Sn improves the mechanical properties (strength or the like), corrosion resistance, erosion•corrosion resistance and wear resistance, and also divides dendrite arms. In addition, Sn widens the composition range of Cu or Zn, which generates peritectic reaction, so as to expedite peritectic reaction effectively and decreases the stacking fault energy of the alloy. As a result, the grains are granulated and refined more effectively. The above functions of Sn are realized remarkably in the presence of Zr and P. Furthermore, δ phase and γ phase generated by Sn contained in the alloy suppress the grain growth after melt-solidification and thus contribute to the grain refinement. The δ phase and γ phase are the phases transformed from high Sn-concentration parts. Since the high Sn-concentration parts are uniformly and finely dispersed at the melt-solidification stage, the δ phase and γ phase obtained by such transformation are also finely dispersed, and suppress the growth of α-phase grains at the high temperature range after solidification. Furthermore, since the δ phase and γ phase are finely dispersed, the corrosion resistance and wear resistance are good. The above effects saturate when the content of Sn is 15 mass %, and if more than 15 mass % of Sn is contained, conversely, the ductility, castability or the like deteriorates, thereby causing defects such as crack, shrinkage cavity and porosity in the melt-solidified parts or copper alloy casting material. For example, if more than 15 mass % of Sn is contained, depending on the mixing ratio of Sn to Cu and Zn, the δ phase and γ phase, which are high Sn-concentrated hard phases, are generated excessively (more than 20% by the area ratio), that is, more than the mother phase (α-phase). Therefore, the phases are selectively corroded, and the corrosion resistance is likely to deteriorate. In addition, depending on the mixing ratio of Sn to Cu (Cu and Zn), if the concentration of Sn is too high, the segregation of Sn occurs considerably, and the solidification temperature range is widened as the content of Sn increases. Furthermore, Sn is contained to widen the composition range, in which peritectic reaction (an effective means for grain refinement during melt-solidification) occurs, and, as the content of Sn increases, peritectic reaction during the actual casting can occur within the wide concentration range of Cu. If the above facts are taken into account, the content of Sn needs to be in the range of 0.01 to 15 mass %, preferably 0.1 to 12 mass %, more preferably 0.5 to 8 mass %, and optimally 0.6 to 2 mass %.

If contained together with Zr, P, Cu (and Zn), Si decreases the stacking fault energy of an alloy and widens the composition range, in which peritectic reaction occurs, thereby refining the grains remarkably. However, if more than 5% of Si is contained, the grain refining effect caused by the co-addition of Si with Cu and Zn saturates or deteriorates, and further, the ductility also deteriorates. In addition, if the content of Si exceeds 5%, the thermal conductivity deteriorates, and the solidification temperature range is widened, thereby impairing the melt-solidification ability and castability. In addition, Si improves the flowability of the molten alloy, suppresses the oxidation of the molten alloy, and decreases the melting point of the alloy. Furthermore, depending on the relationship with Cu and Zn, the precipitation of κ phase and γ phases contributes to the improvement of the machinability and mechanical properties such as tensile strength, proof stress, impact strength, fatigue strength or the like. The above effects generate the synergy effect for the grain refinement in the melt-solidified parts or casting products. If the above facts are taken into account, the content of Si needs to be in the range of 0.01 to 5 mass %, preferably 0.05 to 4.8 mass %, more preferably 0.1 to 4.5 mass %, and optimally 2.6 to 3.7 mass %.

Not as much as Sn or Si, Al also facilitates the grain refinement. In addition, Al forms a strong corrosion resistant coating (a coating containing Al as a main component) on the surface of the melt-solidified part or casting products so as to improve the erosion-corrosion resistance, and then increases the strength, corrosion resistance, high-temperature oxidation resistance, and wear resistance by solid solution. If the above facts are taken into account, the content of Al needs to be in the range of 0.01 to 9 mass %, preferably 0.1 to 8.5 mass %, and more preferably 0.2 to 3 mass %.

In the melt-solidified parts of the second, fourth, fifth, seventh, eighth, tenth, eleventh, thirteenth, fifteenth, sixteenth and eighteenth melt-solidified substances or the second, fourth, fifth, seventh, eighth, tenth, eleventh, thirteenth, fifteenth, sixteenth and eighteenth copper alloys for melt-solidification, similar to Sn, Zn generates peritectic reaction, an effective means to refine the grains during the melt-solidification of an alloy, and decreases the stacking fault energy of the alloy. As a result, the flowability of the molten alloy is accelerated; the decrease in the melting point is facilitated; and the corrosion resistance and mechanical strength (tensile strength, proof stress, impact strength, wear resistance, fatigue resistance or the like) are improved. In addition, Zn facilitates the grain refinement during melt-solidification and prevents the oxidation loss of Zr. However, if a great amount of Zn is contained, the primary crystal becomes β-phase during melt-solidification; conditions (7) and (27) are not satisfied; conditions (6) and (26) become difficult to satisfy; the corrosion resistance deteriorates further; and Zn is evaporated considerably during welding. In consideration of the above facts, the content of Zn needs to be in the range of 0.01 to 38 mass %, preferably 5 to 37 mass %, more preferably 12 to 36 mass %, and optimally 17 to 34 mass %.

Since Sn, Si, Al and Zn facilitate the grain refinement in the presence of Zr and P as described above, the contents of Zr and P need to be determined in consideration of the relationship with the contents of Sn, Si, Al and Zn. That is, in order for Zr and P to refine the grains effectively, it is preferable to satisfy conditions (3) to (5), (23) to (25) in addition to conditions (1) and (21).

In the melt-solidified parts of the fifth, sixth, seventh, eleventh to thirteenth, sixteenth, seventeenth and eighteenth melt-solidified substances or the fifth, sixth, seventh, eleventh to thirteenth, sixteenth, seventeenth and eighteenth copper alloys for melt-solidification, Sb, As, Mg and Mn are contained mainly to improve the corrosion resistance. The corrosion resistance can be improved when the contents of Sb and As are 0.02 mass % or more; the content of Mg is 0.001 mass % or more; and the content of Mn is 0.01 mass % or more. However, in order to improve the corrosion resistance remarkably, it is preferable that the contents of Sb and As be 0.03 mass % or more; the content of Mg be 0.002 mass % or more; and the content of Mn be 0.05 mass % or more. Meanwhile, even when the content of Sb or As exceeds 0.15 mass %, the corrosion resistance does not improve correspondingly, and conversely, the ductility deteriorates. Moreover, Sb and As are toxic to human bodies. Considering the above facts, the content of Sb or As needs to be 0.15 mass % or less and preferably 0.12 mass % or less. Meanwhile, a scrap material (scrapped heat pipe of the like) is generally used as a part of raw materials to produce a copper alloy. It is common that such scrap material contains S-component (sulfur component). Therefore, when a copper alloy for melt-solidification is manufactured by using the scrap material as a raw material or melt-solidification is performed by using a material made of the scrap material as a copper alloy for melt-solidification, the S-component contained in the molten alloy combines with Zr, a grain refining element, to form a sulfide, thereby impairing the effective grain refining function of Zr. In addition, since the flowability of the molten alloy deteriorates, it is highly likely that defects such as blowhole, crack or the like occur in the melt-solidified parts or casting products of the copper alloy for melt-solidification. In addition to improving the corrosion resistance, Mg also improves the flowability of the molten alloy during casting even when the scrap material containing S-component is used as a raw material. In addition, Mg can remove the S-component in the form of harmless MgS, and MgS has no adverse effect to the corrosion resistance even when remaining in the alloy. Therefore, Mg can effectively prevent the deterioration of the corrosion resistance caused by the S-component contained in the raw material. Furthermore, if the S-component is contained in the raw material, it is highly likely that S exists along the grain boundary and corrodes the boundary. However, Mg can effectively prevent such intergranular corrosion. Still furthermore, even though it is likely that S consumes Zr as the concentration of S increases in the molten alloy, if 0.001 mass % or more of Mg is contained in the molten alloy before the charging of Zr, the S-component in the molten alloy is removed or fixed in the form of MgS, therefore the above problem never happens. However, if Mg is contained excessively, that is, if the content of Mg exceeds 0.2 mass %, similar to Zr, it is likely that Mg is oxidized; the viscosity of the molten alloy increase; and the inclusion of oxide or the like generates defects. Like Mg, Mn also shows the above effects, and, if Si is selected as an alloying element, Mn combines with Si so as to form an intermetallic compound Mn—Si, thereby improving the wear resistance. If the above facts are taken into account, the contents of Sb and As need to be in the range of 0.02 to 0.15 mass % and preferably 0.03 to 0.12 mass %. In addition, the content of Mg needs to be in the range of 0.001 to 0.2 mass % and preferably 0.002 to 0.1 mass %. Furthermore, the content of Mn needs to be in the range of 0.01 to 4 mass %, preferably 0.05 to 4 mass %, and more preferably 0.5 to 3 mass %.

In the melt-solidified parts of the eighth to thirteenth melt-solidified substances or the eighth to thirteenth copper alloys for melt-solidification, Pb, Bi, Se and Te are contained mainly to improve the machinability. If the Pb particles or the like are dispersed in the matrix with finer and more uniform size due to the grain refinement, the machinability can be improved more effectively. Generally, Pb, Bi, Se and Te are contained alone or in the form of the following combinations; Pb and Te, Bi and Se or Bi and Te. If the contents of Pb and Bi exceed 15 mass %, the cutting surface is badly influenced; the ductility is considerably impaired; and further, the impact property or mechanical strength is also impaired. Meanwhile, Pb and Bi are not subject to solid solution at the room-temperature, but exist as a particle in the state of molten metal. The particles of Pb and Bi are distributed in granular shape and exist alongside the boundary of each solid phase at the melt-solidification stage. As the number of the Pb and Bi particles increases, it becomes highly likely that cracks occur at the melt-solidification stage (due to the tensile stress accompanied by solidification shrinkage). In addition, since Pb and Bi exist, mainly, at the grain boundaries in a molten state after the matrix is solidified, as the number of the grains increases, high-temperature cracks are likely to occur. To solve such a problem, it is extremely effective that the grains are refined so as to relieve the stress (or to increase the area of the grain boundaries) and the particles of Pb and Bi are made smaller and distributed uniformly. Furthermore, Pb and Bi have adverse effects on the properties of a copper alloy except the machinability as described above, and the ductility at room temperature is also impaired since the stress is centralized on the Pb and Bi particles (it is needless to say that the ductility is impaired synergistically when the grain size is large). It is worth to notice that the above problem can be solved by the grain refinement. Considering the above facts and also the aspect of better hygiene (the leachate of Pb or the like) when a metal fitting for water contact is made of a melt-solidified substance, the content of Pb needs to be in the range of 0.005 to 15 mass %, preferably 0.005 to 4 mass %, more preferably 0.005 to 1 mass % and optically 0.01 to 0.2 mass %. In addition, the content of Bi needs to be in the range of 0.005 to 15 mass %, preferably 0.005 to 3 mass %, more preferably 0.005 to 1 mass %, and optically 0.01 to 0.2 mass %. Furthermore, the content of Se needs to be in the range of 0.01 to 2 mass %, preferably 0.03 to 0.5 mass %, and more preferably 0.05 to 0.3 mass %. Still furthermore, the content of Te needs to be in the range of 0.03 to 1.5 mass %, preferably 0.05 to 0.5 mass %, and more preferably 0.05 to 0.3 mass %.

In the melt-solidified parts of the fifteenth to eighteenth melt-solidified substances or the fifteenth to eighteenth copper alloys for melt-solidification, Co, Cr, C, Ti, B and rare earth element (REM) are contained mainly to prevent the grains from coarsening at the border areas (welded heat affected zone) between the melt-solidified parts and the mother material, on which the melt-solidified parts are formed, during melt-solidification. For example, in welding, since the welded heat affected zones between the welded areas (melt-solidified parts) and the mother material to be welded are also exposed to high temperature even for a short time. Therefore, the grains in the welded heat affected zones tend to coarsen. Even when the grains in the welded areas or the mother material to be welded are fine, if the grains in the welded heat affected zones are coarsened, it is impossible to obtain a good welded substance. Co and the like are contained to prevent the grain coarsening in the welded heat affected zones as much as possible so as to obtain a good welded substance. For example, Co and the like generate the precipitation of $Co_2Si$, $CrSi$, $C$, $Co_2P$, $MnSi$, $BN$ or the like so as to suppress the grain growth (pin the grain growth). In order to make Co and the like suppress the grain growth, the content of Co needs to be in the range of 0.005 to 0.3 mass % and preferably 0.01 to 0.05 mass %. In addition, the content of Cr needs to be in the range of 0.005 to 0.3 mass % and preferably 0.01 to 0.05 mass %. Furthermore, the content of C needs to be in the range of 0.00005 to 0.02 mass % and preferably 0.0001 to 0.01 mass %. Still furthermore, the content of Ti needs to be in the range of 0.005 to 0.3 mass % and preferably 0.01 to 0.05 mass %. Still furthermore, the content of B needs to be in the range of 0.0002 to 0.05 mass % and preferably 0.0005 to 0.01 mass %. Still furthermore, the content of REM needs to be in the range of 0.01 to 0.5 mass % and preferably 0.05 to 0.2 mass %. Meanwhile, REM refers to IIIa group elements of the periodic table such as La, Ce, Sc, y or the like including lanthanoid and also includes misch metals, in which several elements are mixed.

In addition, the invention proposes a method to add Zr (an element to be contained so that the grains are further and stably refined) in the form of a copper alloy containing Zr during a casting process when the first to eighteenth copper alloys for melt-solidification are manufactured, thereby preventing Zr from being contained in the form of oxide and/or sulfide as much as possible. Such copper alloy containing Zr preferably includes; Cu—Zr alloy, Cu—Zn—Zr alloy or an alloy containing one or more elements selected from P, Mg, Al, Sn, Mn and B based on the Cu—Zr alloy or Cu—Zn—Zr alloy (base material) is preferable.

That is, in the process of manufacturing the first to eighteenth copper alloys for melt-solidification or the materials thereof, Zr is added in the form of a granular, thin plate-like, rod-like or linear intermediate alloy (copper alloy) right before pouring or at the final stage of raw material melting, therefore, the loss of Zr when added is decreased as much as possible in adding Zr and it is prevented that Zr forms an oxide and/or sulfide when added, therefore, the amount of Zr required and sufficient to refine the grains cannot be secured. In addition, when Zr is added right before pouring or at the final stage of raw material melting, since the melting point of Zr is higher than that of the copper alloy by 800 to 1000° C., it is preferable to use a low melting point alloy having the melting point close to the melting point of the copper alloy and containing a lot of necessary components (for example, Cu—Zn alloy or Cu—Zn—Zr alloy containing 0.5 to 65 mass % of Zr, or an alloy containing one or more element selected from P, Mg, Al, Sn, Mn and B (the content of each element: 0.1 to 5 mass %) added to a base material of Cu—Zn or Cu—Zn—Zr, in the form of granular (grain diameter: about 2 to 50 mm), thin-plate (thickness: about 1 to 10 mm), rod (diameter: about 2 to 50 mm) or linear intermediate alloy. Particularly, in order to lower the melting point so as to facilitate melting and to prevent the loss of Zr, it is preferable to use the intermediate alloy of a Cu—Zn—Zr alloy, containing 0.5 to 35 mass % of Zr and 15 to 50 mass % of Zn (preferably a Cu—Zn—Zr alloy containing 1 to 15 mass % of Zr and 25 to 45 mass % of Zn) as the base alloy. Zr impairs the electrical•thermal conductivity, one of the inherent properties of a copper alloy (depending on the mixing ratio of Zr to P, which are added together. However, if the content amount of Zr, not in the form of oxide and sulfide, is 0.039 mass % or less (particularly 0.024 mass % or less), Zr rarely impairs the electrical•thermal conductivity, and, even if impairs, the electrical•thermal conductivity is lowered slightly compared to an alloy not containing Zr.

Furthermore, in order to obtain the first to eighteenth copper alloys for melt-solidification satisfying condition (26), it is desirable to define the casting conditions properly, particularly, pouring temperature and cooling rate. That is, with respect to the pouring temperature, it is preferable to determine the temperature higher than the liquidus line temperature of the copper alloy by 20 to 250° C. (more preferably 25 to 150° C.). That is, it is preferable that (liquidus line temperature+20° C.)≤pouring temperature≤(liquidus line temperature+250° C.), and it is more preferable that (liquidus line temperature+25° C.)≤pouring temperature≤(liquidus line temperature+150° C.). Even though varying depending on the composition of an alloy, the pouring temperature is generally 1250° C. or less, preferably 1200° C. or less, and more preferably 1150° C. or less. Even though there is no limitation for the lower limit of the pouring temperature as long as the molten alloy can reach every corner of a mold, as the pouring temperature lowers, the grains are more refined. Meanwhile, it should be understood that the temperature conditions vary depending on the mixing amount of the alloying elements.

Meanwhile, in the first to eighteenth copper alloys for melt-solidification, it is described above that the scrap material is used as raw material. However, if such scrap material is used, it is inevitable that impurities are contained, which is acceptable from a practical standpoint. In addition, in the first to eighteenth melt-solidified substances, when the first to eighteenth copper alloys for melt-solidification made from scrap material or general copper alloys other than aforesaid are used for welding, it is inevitable that impurities are contained in the melt-solidified parts, which is also acceptable. However, if Fe and/or Ni are contained as the inevitable impurities since the scrap material is nickel plating material or the like, it is required to restrict the contents of Fe and Ni. That is, if the contents of Fe and/or Ni are large, Zr and P, which are effective for the grain refinement, are consumed by Fe and/or Ni, thereby deterring the grain refinement. Therefore, when Fe and/or Ni are contained as impurities in the first to eighteenth copper alloys for melt-solidification or the melt-solidified parts of the first to eighteenth melt-solidified substances, it is preferable to restrict the contents of Fe and Ni within a range, in which the grain refinement is not deterred. Specifically, when either Fe or Ni is contained, it is preferable that the content of Fe or Ni be 0.3 mass % or less (more preferably 0.1 mass % or less and optimally 0.07 mass % or less), and when both Fe and Ni are contained, it is preferable that the total content of Fe and Ni be restricted to be 0.4 mass % or less (more preferably 0.1 mass % or less).

In the melt-solidified parts such as welded part, build-up welded part, thermal sprayed part, and fused part of the melt-solidified substances according to the invention, since the grains are refined at the melt-solidification stage, the melt-solidified substances can endure shrinkage during solidification, and the generation of defects such as crack or the like can be prevented as much as possible. In addition, in terms of holes or porosity generated during solidification, since gas can be easily removed to the outside, a robust melt-solidified substance such as welded substance having no defect or the like at the melt-solidified parts such as beaded part or the like (since no defect such as porosity or the like is included and dendrite network is not formed, the surface is smooth and shrinkage cavity becomes as shallow as possible) can be obtained.

In addition, since the melt-solidification such as welding or the like generates a melt-solidifying phenomenon, it is likely that the crystals in the melt-solidified parts also become dendritic in casting products. However, in the melt-solidified substance of the invention, since the crystals precipitated during solidification form the structure having the divided dendrite arms and the two-dimensional shape of the crystals is circular, oval, polygonal or cross-like, the flowability of the molten welding material improves, therefore, a good melt-solidified part can be obtained even when the melt-solidified part is complicatedly shaped.

Furthermore, in the melt-solidified substance according to the invention, since the properties of the copper alloy such as strength, corrosion resistance or the like at the melt-solidified parts are improved by the grain refinement, the melt-solidified substance becomes very practical and can have a wide range of applications.

Still furthermore, according to the copper alloys for melt-solidification of the invention, the above-described melt-solidified substance can be easily obtained, and a high-quality and easily manufacturable material to be welded, filler metal (welding rod or the like), metallized material, material to be fused can be provided.

Still furthermore, according to a method of manufacturing the copper alloys for melt-solidification of the invention, the disadvantages caused by Zr contained in the form of oxide and/or sulfide do not occur, and the grain refinement is realized by the co-addition of Zr and P, therefore, the above-described copper alloys for melt-solidification can be manufactured efficiently and satisfactorily.

BEST MODE FOR CARRYING OUT THE INVENTION

Figure 1:
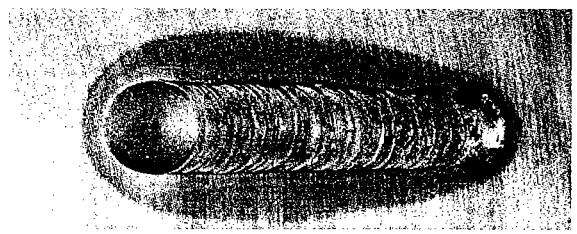
FIG. 1 is a plane view showing a melt-solidified substance No. 9 of the embodiment.

As an embodiment, melt-solidified substances according to the present invention Nos. 1 to 67 illustrated in Tables 1 to 4 are manufactured.

Each of the melt-solidified substances Nos. 1 to 43 is obtained by forming a bead A, a melt-solidified part, on the surface of a copper alloy plate A1 with a TIG welder. That is, the bead A (melt-solidified part) is formed on the copper alloy plate A1 to have a welding pool (welded area) of about 3 mm in depth with the bead of about 8 mm in width by moving an electrode for about 40 mm in the across-the-width direction of the plate at the welding current: 150 A (varying from 140 to 180 A depending on a material) and the moving speed: 100 mm/min, while the electrode is kept 1 to 2 mm apart from the copper alloy plate A1. Meanwhile, in determining the welding current, top priority is given to obtain the welding pool as large as described above. The copper alloy plates A1 are the copper alloys for melt-solidification according to the invention having the compositions illustrated in Tables 1 to 3, and are the rectangular cast plates (thickness: 7 mm, width: 70 mm, length: 300 mm) manufactured by melting industrial pure copper or the like in an electric furnace; pouring the molten alloy into an iron casting mold (depth: 35 mm, width:

70 mm, length: 300 mm); and then cutting the obtained ingots into 7 mm-thick plates. In casting the above ingots, Zr is added to the molten alloy in the form of granular Cu—Zn—Zr alloy (cuboid having sides as large as several mm) right before pouring in order to prevent Zr from being added in the form of oxide and/or sulfide, and the pouring temperature is 100° C. higher than the liquidus line temperature of the ingots. Each melt-solidified part A (bead A) of the melt-solidified substances Nos. 1 to 43 has the composition illustrated in Tables 1 to 3. Meanwhile, for certain embodiment, more than one plate A1 is manufactured to be used as melt-solidified substances other than the above ones.

Each of the melt-solidified substances Nos. 44 to 49 is obtained by forming the bead B, a melt-solidified part, on the surface of a copper alloy plate B1 with the welder. That is, the bead B (melt-solidified part) is formed on the copper alloy plate B1 to have a welding pool (welded part) of about 3 mm in depth with the bead of about 8 mm in width by moving an electrode for about 40 mm in the across-the-width direction of the plate at the welding current: 150 A (varying from 140 to 180 A depending on a material) and the moving speed: 100 mm/min while the electrode is kept 1 to 2 mm apart from the copper alloy plate B1. Meanwhile, in determining the welding current, the top priority is given to obtain the welding pool as large as described above. The copper alloy plates B1 are the copper alloys for melt-solidification according to the invention having the compositions illustrated in Table 3, which are rectangular rolled plates (thickness: 7 mm, width: 70 mm, length: 300 mm) manufactured by melting industrial pure copper or the like in an electric furnace; pouring the molten alloy into an iron casting mold (depth: 35 mm, width: 70 mm, length: 300 mm); and then hot rolling the obtained ingots at 750° C., and the surface of each rolled plate B1 is acid-pickled and then polished. In casting the above ingots, Zr is added to the molten alloy in the form of granular Cu—Zn—Zr alloy (cuboid having sides as large as several mm) right before pouring in order to prevent Zr from being added in the form of oxide and/or sulfide, and the pouring temperature is 100° C. higher than the liquidus line temperature of the ingots. Meanwhile, for certain embodiment, more than one rolled plate B1 is manufactured to be used as melt-solidified substances other than the above ones.

Each of the melt-solidified substances Nos. 50 to 56 is a melt-solidified part C formed by melting the tip of a copper alloy rod C1 (3.5 mm-diameter round rod) with the TIG welder. The copper alloy rods C1 are the copper alloys for melt-solidification according to the invention having the compositions illustrated in Tables 3 and 4, and are manufactured by cutting a 7 mm-diameter round rod from the cast plate A1 or rolled plate B1 and then performing drawing work and heat treatment repeatedly on the round rod (the round rod is drawn so as to have the diameter of 5.5 mm at the first work, 4 mm at the second work, and 3.5 mm at the third work). Each copper alloy rod C1 is obtained as follows: copper alloy rod C1 No. 50 from the rolled plate B1 No. 44, copper alloy rod C1 No. 51 from the cast plate A1 No. 4, copper alloy rod C1 No. 52 from the rolled plate B1 No. 45, copper alloy rod C1 No. 53 from the rolled plate B1 No. 46, copper alloy rod C1 No. 54 from the cast plate A1 No. 12, copper alloy rod C1 No. 55 from the rolled plate B1 No. 47, copper alloy rod C1 No. 56 from the rolled plate B1 No. 49. Meanwhile, for certain embodiment, more than one rod is manufactured to be used as melt-solidified substances other than the above ones.

Each of the melt-solidified substance Nos. 57 to 61 is obtained by butt-welding two sheets of copper alloy plates D1 of the same alloy composition. That is, the melt-solidified part (butted welded part) D is obtained by forming a V groove (groove depth: 5 mm, groove angle: 60°, route opening: 2 mm) on the edge of each copper alloy plate D1; butting the edges; and then welding the butted area with a TIG welder by using a filler metal (welding rod) D2 to fill in the grooves. The copper alloy plates D1, except the copper alloy plate D1 No. 61, are the copper alloys for melt-solidification according to the invention having the compositions illustrated in Table 4, and the aforesaid cast plates A1 or rolled plates B1 are used to manufacture the copper alloy plates D1. That is, the cast plate A1 No. 2 is used to manufacture the copper alloy plate D1 No. 57; the rolled plate B1 No. 44 is used to manufacture the copper alloy plate D1 No. 58; the rolled plate B1 No. 47 is used to manufacture the copper alloy plate D1 No. 59; and the rolled plate B1 No. 49 is used to manufacture the copper alloy plate D1 No. 60. In addition, the rolled plate B1 No. 114 of comparative example is used to manufacture the copper alloy plate D1 No. 61. The filler metals D2 are the copper alloy for melt-solidification according to the invention having the compositions illustrated in Table 4, and are 3.5-mm diameter welding rods, and the aforesaid copper alloy rods C are used as the filler metals D2. That is, the welding rod D2 No. 57 is the copper alloy rod C1 No. 50; the welding rod D2 No. 58 is the copper alloy rod C1 No. 51; the welding rod D2 No. 59 is the copper alloy rod C1 No. 55; the welding rod D2 No. 60 is the copper alloy rod C1 No. 56; the welding rod D2 No. 61 is the copper alloy rod C1 No. 54.

Each of the melt-solidified substances Nos. 62 and 63 is obtained by butt-welding two sheets of copper alloy plates E1 of the same alloy composition. That is, the melt-solidified part (overlapped welded part) E is obtained by butting the edges of the two copper alloy plates E1; and then TIG-welding the edges without using a filler metal. The copper alloy plates E1 are the copper alloys for melt-solidification according to the invention having the compositions illustrated in Table 4, and the aforesaid rolled plates B1 are used to manufacture the copper alloy plates E1. That is, the rolled plate B1 No. 46 is used to manufacture the copper alloy plate E1 No. 62; and the rolled plate B1 No. 48 is used to manufacture the copper alloy plate E1 No. 63.

The melt-solidified substances Nos. 64 and 65 are obtained by cutting (fusing) the copper alloy plates F1 with a gas cutter, thus the fused ends form the melt-solidified part F. The copper alloy plates F1 Nos. 64 and 65 are the copper alloys for melt-solidification according to the invention having the compositions illustrated in Table 4, and are the cast plates manufactured by the same process as that for the cast plates A1.

Each of the melt-solidified substances Nos. 66 and 67 is obtained by building up more than one copper alloy layer by welding on the surface of an iron plate. That is, the melt-solidified part G, copper alloy layer(s) in this case, is formed by build-up welding on the surface of the iron plate, using a copper alloy filler metal (welding rod) G1. The filler metals G1 are the copper alloys for melt-solidification according to the invention having the composition illustrated in Table 4, and are the welding rods obtained by cutting out of the cast plates manufactured by the same process as that for the cast plates A1.

As comparative examples, the melt-solidified substances Nos. 101 to 128 illustrated in Tables 5 and 6 are obtained.

Each of the melt-solidified substances Nos. 101 to 110 is obtained by forming a bead A on the surface of a copper alloy plate A1 with a welder. That is, the bead A (melt-solidified part) is formed on the copper alloy plate A1 to have a welding pool (welded area) of about 3 mm in depth with the bead of about 8 mm in width by moving an electrode for about 40 mm in the across-the-width direction of the plate at the welding current: 150 A (varying from 140 to 180 A depending on a material) and the moving speed: 100 mm/min while the electrode is kept 1 to 2 mm apart from the copper alloy plate A1. Meanwhile, in determining the welding current, top priority is given to obtain the welding pool can be as large as described above. The copper alloy plates A1 are the copper alloys for melt-solidification according to the invention having the compositions illustrated in Table 5, and are the rectangular cast plates (thickness: 7 mm, width: 70 mm, length: 300 mm) manufactured by melting industrial pure copper or the like in an electric furnace; pouring the molten alloy into an iron casting mold (depth: 35 mm, width: 70 mm, length: 300 mm); and then cutting the obtained ingots into 7 mm-thick plates. Meanwhile, for certain comparative example, more than one plate A1 is manufactured to be used as melt-solidified substances other than the above ones.

Each of the melt-solidified substances Nos. 111 to 117 is obtained by forming a bead B on the surface of a copper alloy plate B1 with a welder. That is, the bead B (melt-solidified part) is formed on the copper alloy plate B1 to have a welding pool (welded part) of about 3 mm in depth with the bead of about 8 mm in width by moving an electrode for about 40 mm in the across-the-width direction of the plate at the welding current: 150 A (varying from 140 to 180 A depending on a material) and the moving speed: 100 mm/min while the electrode is kept 1 to 2 mm apart from the copper alloy plate B1. Meanwhile, in determining the welding current, top priority is given to obtain the welding pool as large as described above. The copper alloy plates B1 are the copper alloys for melt-solidification according to the invention having the compositions illustrated in Tables 5 and 6, and are the rectangular rolled plates (thickness: 7 mm, width: 70 mm, length: 300 mm) manufactured by melting industrial pure copper or the like in an electric furnace; pouring the molten alloy into an iron casting mold (depth: 35 mm, width: 70 mm, length: 300 mm); and then hot rolling the obtained ingots at 750° C., and the surface of each rolled plate B1 is acid-pickled and then polished. Meanwhile, for certain comparative example, more than one plate B1 is manufactured to be used as melt-solidified substances other than the above ones.

The melt-solidified substances Nos. 118 to 122 are melt-solidified part C formed by melting the tip of copper alloy rods C1 (3.5 mm-diameter round rods) with the TIG welder. The copper alloy rods C1 are the copper alloys for melt-solidification according to the invention having the compositions illustrated in Table 6, and are manufactured by cutting 7 mm-diameter round rod from the cast plate A1 or the rolled plate B1 and then performing drawing work and heat treatment repeatedly on the round rod (the round rods are drawn so as to have the diameter of 5.5 mm at the first work, 4 mm at the second work, and 3.5 mm at the third work). Copper alloy rod C1 No. 118 is obtained from the rolled plate B1 No. 111; copper alloy rod C1 No. 119 from the rolled plate B1 No. 112, copper alloy rod C1 No. 120 from the rolled plate B1 No. 114, copper alloy rod C1 No. 121 from the rolled plate B1 No. 116, copper alloy rod C1 No. 122 from the rolled plate B1 No. 117 individually. Meanwhile, for certain comparative example, more than one rod C1 is manufactured to be used as melt-solidified substances other than the above ones.

Each of the melt-solidified substances Nos. 123 to 126 is manufactured by butt-welding two sheets of copper alloy plate D1 of the same alloy composition. That is, the melt-solidified part (butted welded part) D is obtained by forming a V-groove (groove depth: 5 mm, groove angle: 60°, route opening: 2 mm) on the edge of each copper alloy plate D1; butting the edges; and then TIG-welding the butted area with a filler metal (welding rod) D2 to fill in the groove. The copper alloy plates D1 have the compositions illustrated in Table 6, and the above cast plates A1 or the rolled plates B1 are used as the copper alloy plates D1. That is, the rolled plate B1 No. 112 is used to manufacture the copper alloy plate D1 No. 123; the rolled plate B1 No. 114 is used to manufacture the copper alloy plate D1 No. 124; the rolled plate B1 No. 116 is used to manufacture the copper alloy plate D1 No. 125; and the rolled plate B1 No. 117 is used to manufacture the copper alloy plate D1 No. 126. The filler metals D2 are 3.5-mm diameter welding rods having the compositions illustrated in Table 6, and the aforesaid copper alloy rods C are used as the filler metals D2. That is, the welding rod D2 No. 123 is the copper alloy rod C1 No. 119; the welding rod D2 No. 124 is the copper alloy rod C1 No. 120; the welding rod D2 No. 125 is the copper alloy rod C1 No. 121; and the welding rod D2 No. 126 is the copper alloy rod C1 No. 122.

Each of the melt-solidified substances Nos. 127 and 128 is obtained by butt-welding two sheets of copper alloy plate E1 of the same alloy composition. That is, the melt-solidified part (butted welded part) E is obtained by butting the edges of the two copper alloy plates E1; and then TIG-welding the edges without using the filler metal. The copper alloy plates E1 have the compositions illustrated in Table 6, and the above rolled plates B1 are used to manufacture the copper alloy plates E1. That is, the rolled plate B1 No. 113 is used to manufacture the copper alloy plate E1 No. 127; and the rolled plate B1 No. 116 is used to manufacture the copper alloy plate E1 No. 128.

Figure 4:
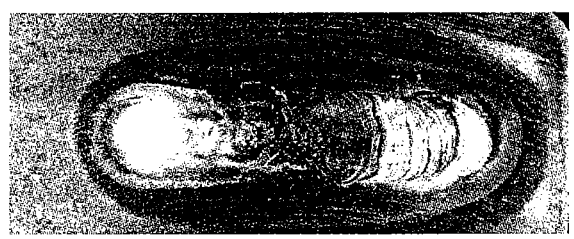
FIG. 4 is a plane view showing a melt-solidified substance No. 103 of the comparative example.

In addition, the melt-solidified parts A to G of the melt-solidified substances Nos. 1 to 67 and Nos. 101 to 128 obtained as above have the compositions illustrated in Tables 1 to 6. Furthermore, as a result of the observation of the melt-solidified parts A to G, it is verified that all the melt-solidified parts A, B, C, D, E, F and G of the melt-solidified substances Nos. 1 to 67 of the embodiment show the impressive appearance, that is, melt-solidification (welding, build-up welding, fusing) can be performed satisfactorily. FIG. 1 shows an example. FIG. 1 is a plane view of the melt-solidified substance No. 9 showing that a beautiful bead A is formed. On the contrary, all the melt-solidified parts A, B, C, D and E of the melt-solidified substances Nos. 101 to 128 of the comparative example show poor looking appearance. FIG. 4 shows an example. FIG. 4 is a plane view of the melt-solidified substance No. 103.

Furthermore, for the melt-solidified parts A to G of the melt-solidified substances and the copper alloys A1, B1, C1, D1, D2, E1, F1 and G1 used to form the above melt-solidified parts, the mean grain size (μm) is measured after the melt-solidification. That is, the melt-solidified parts A to G and the copper alloys A1, B1, C1, D1, D2, E1, F1 and G1 are cut to have a cross-section which is etched by nitric acid subsequently; and then the average diameter of the grains (mean grain size) in the microstructure developed on the etched surface is measured. The measurement is based on the comparative method for estimating average grain size of wrought copper and copper alloys pursuant to JIS H0501. After the cross-section is etched by nitric acid, the grains having the diameter of more than 0.5 mm are observed by naked eyes, and grains having the diameter of 0.5 mm or less are 7.5 times magnified for observation. In addition, grains having the diameter of less than about 0.1 mm are etched by a mixed liquid of hydrogen peroxide and ammonia water, and then 75 times magnified by an optical microscope for observation. Furthermore, the metallic structure on each cross-section and the area ratio (%) of β-phase included in the metallic structure are measured. The area ratio, corresponding to the content of each phase, is measured by image analysis, that is, by expressing the metallic structure, which is 200 times magnified by an optical microscope, in the binary system with an image processing software 'WinROOF' (manufactured by Tech-Jam Co., Ltd.). The area ratio is an average value of the area ratios measured in three different areas. Tables 1 to 6 illustrate the results.

Figure 2:
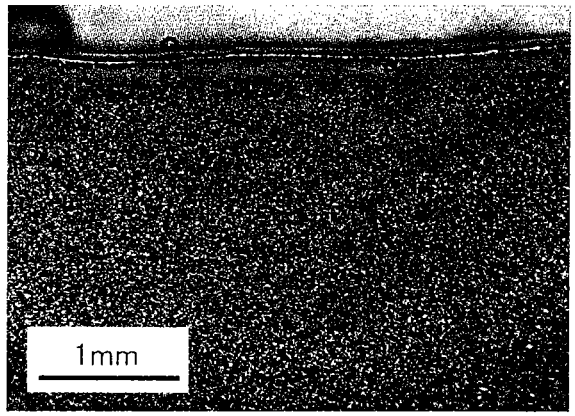
FIG. 2 is a photo of the etched surface (cut surface) of a melt-solidified part A of the melt-solidified substance No. 9 and shows a macrostructure.
Figure 3:
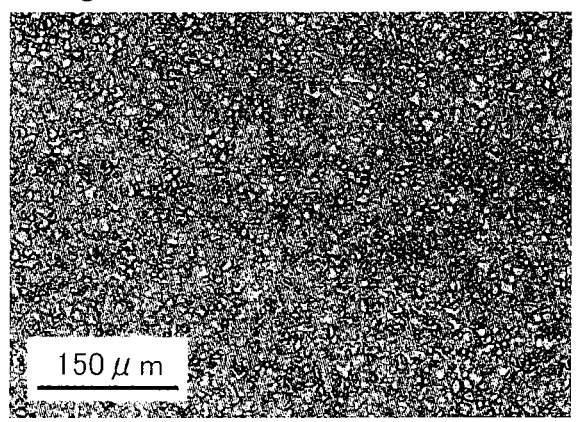
FIG. 3 is a photo of the etched surface (cut surface) of a melt-solidified part A of the melt-solidified substance No. 9 and shows a microstructure.
Figure 5:
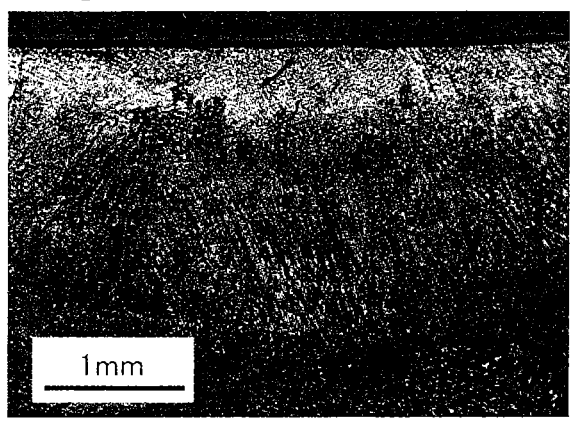
FIG. 5 is a photo of the etched surface (cut surface) of a melt-solidified part A of the melt-solidified substance No. 103 and shows a macrostructure.
Figure 6:
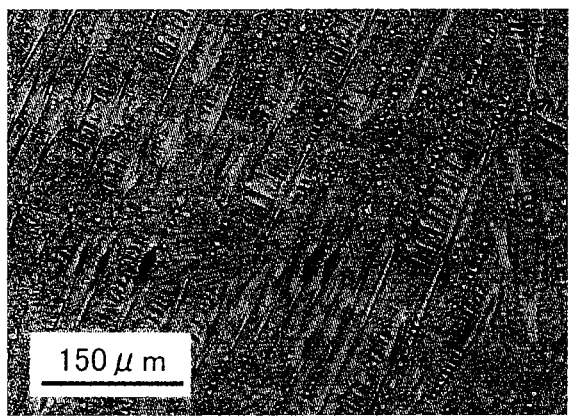
FIG. 6 is a photo of the etched surface (cut surface) of a melt-solidified part A of the melt-solidified substance No. 103 and shows a microstructure.

It is evident from the above results that, in the melt-solidified parts and the copper alloys of the embodiment, the grains are considerably refined. It can be further clearly understood by comparing FIGS. 2 and 3 to FIGS. 5 and 6. That is, FIG. 2 shows the macrostructure of the melt-solidified part A of the melt-solidified substance No. 9 according to the embodiment, and FIG. 3 shows the microstructure thereof. In addition, FIG. 5 shows the macrostructure of the melt-solidified part A of the melt-solidified substance No. 103 according to the comparative example, and FIG. 6 show the microstructure thereof. Meanwhile, as a result of the investigation of the crystal structure of the melt-solidified parts A, B, C, D, E, F and G of the melt-solidified substances Nos. 1 to 67 and the copper alloys A1, B1, C1, D1, D2, E1, F1 and G1 thereof (the plate D1 of the melt-solidified substance No. 61 is excluded) after the melt-solidification, it is verified that dendrite network is divided and the two-dimensional shapes of the grains or α-phase grains are circular, substantially circular, oval, cross-like, acicular or polygonal (see FIG. 3).

Tables 7 to 12 illustrate the primary crystals in the melt-solidified parts A to G during the melt-solidification and the primary crystals in the copper alloys for melt-solidification A1, B1, C1, D1, D2, E1, F1 and G1 during the melt-solidification (during casting). All primary crystals in the embodiment are α-phase.

Furthermore, Specimen No. 14 (6 mm-diameter round rod) defined in JIS Z 2201 are taken from the melt-solidified substances obtained as above and from the copper alloys A1, B1, D1, D2 and E1 used to manufacture the melt-solidified substances, and then tensile strength test is performed on the specimens by AMSLER universal testing machine so as to measure the tensile strength (N/mm$^2$) and elongation (%). Tables 7 to 12 illustrate the results. Meanwhile, the specimens are taken from the melt-solidified substances forming the melt-solidified parts A, B, D and E so that the specimens can have the central area of each melt-solidified parts A, B, D and E.

It is evident from the results of the tensile strength test that the melt-solidified parts of the melt-solidified substances of the embodiment and the copper alloys for melt-solidification of the embodiment used to manufacture the melt-solidified substances have more excellent mechanical properties such as tensile strength and elongation than those of the comparative examples.

Still furthermore, in order to verify the corrosion resistance of the melt-solidified parts A to G, the following dezincification corrosion test defined in 'ISO 6509' is carried out.

That is, in the dezincification corrosion test of 'ISO 6509', the specimens are molded with phenol resin so that the cross-sectional surfaces including the melt-solidified parts A to G are exposed; the surfaces are polished with Emery paper up to No. 1200; the surfaces are ultrasonic-cleaned in pure water and then dried. The obtained corrosion test specimens are soaked in an aqueous solution of 1.0% Cupric Chloride Dihydrate (CuCl$_2$.2H$_2$O) for 24 hours at the temperature of 75° C.; the specimens are removed from the aqueous solution; and then the maximum depth of dezincification corrosion, that is, the maximum dezincification corrosion depth (μm), is measured individually. Tables 7 to 12 illustrate the results.

It is verified from the results that the melt-solidified parts of the melt-solidified substances and the copper alloys for melt-solidification of the embodiment have more excellent corrosion resistance, and thus more satisfactory melt-solidified substances can be obtained, as compared with those of the comparative examples.

It is evident from the embodiment that the melt-solidified substances according to the invention are considerably practical since the grains can be refined as much as or more than the component materials A1 to G1 thereof in the melt-solidified parts A to G of the melt-solidified substances and the mechanical properties such as tensile strength or the like, the corrosion resistance or the like are excellent. Such melt-solidified substances can be obtained by using at least one of the copper alloys of the invention as a component material when the melt-solidified substance is made of more than one component material (for example, a material to be welded and a welding rod). It can be easily understood from the fact that, in the melt-solidified substance No. 61 (butt welded substance), the melt-solidified part D, in which the grains are refined (that is, condition (6) is satisfied), can be obtained by using the copper alloy of the invention as the welding rod D2 even though the copper alloy of the invention is not used as the material to be welded (copper alloy plate) D1. From the fact that, in the melt-solidified substances Nos. 111 to 117, even though the mean grain size of the component material B1 is 300 μm or less, the mean grain size of the melt-solidified part B exceeds 300 μm, thereby not satisfying condition (6), it can be understood easily that a copper alloy satisfying condition (26) needs to be used as at least one of the component materials in order to obtain the melt-solidified parts that satisfy condition (6). That is, even though the grains are refined by rolling in the rolled materials B1 of Nos. 111 to 117, the rolled materials B1 of Nos. 111 to 117 do not satisfy condition (26) when melt-solidification is complete (after casting) before the rolling. As a result, even though the grains are refined by the rolling, the grain refining effect is impaired by the melt-solidification (welding), therefore, it is impossible to obtain the melt-solidified part B satisfying condition (6).

Meanwhile, since the melt-solidification such as welding or the like can be considered as a kind of casting, in order to carry out the melt-solidification satisfactorily, the flowability of the molten liquid including solid phase in the melt-solidified part needs to be high at the final stage of solidification. In addition, even though the flowability of the molten liquid including solid phase mainly depends on the shape of the solid phase in a semi-solid metal state and the viscosity or composition of the liquid phase, the result of melt-solidification is considerably influenced by the shape of the solid phase. That is, if the solid phase begins to form dendrite network in the semi-solid metal state, it is difficult for the molten liquid including the solid phase to fill in every corner of a casting mold. Therefore, the melt-solidification ability becomes worse, and welding, build-up welding or thermal spraying becomes difficult to be performed satisfactorily. On the other hand, if the solid phase is granulated in the semi-solid metal state, the melt-solidification becomes excellent, as the solid phase is substantially spherical (the two-dimensional shape is circular). It becomes further excellent as the grain diameter becomes smaller. As a result, it is possible to obtain satisfactory melt-solidified substances such as welded substance or the like. Therefore, the melt-solidification ability can be evaluated by the shape of the solid phase in the semi-solid metal state, and the state of the melt-solidified substance can also be verified. In order to evaluate the melt-solidification ability, the following semi-solid metal casting test is carried out.

That is, the melt-solidified parts A and B are taken from the aforesaid melt-solidified substances as test sample materials and then put into a crucible; the sample melt-solidified parts A and B are heated so as to be in a semi-solid metal state (solid phase ratio: about 60%) and then held for 5 minutes; and then the sample parts A and B are rapidly cooled by water. The shape of the solid phase in the semi-solid metal state is investigated, and then the semi-solid metal castability, that is, the melt-solidification ability is evaluated. Tables 7, 9, 11 and 12 illustrate the results. In the tables, a material, in which dendrite network is not formed in the semi-solid metal state and the solid phase is granulated, is evaluated excellent in terms of the melt-solidification ability, thereby denoted as 'O', while a material, in which dendrite network is remarkably formed, is evaluated poor in terms of the melt-solidification ability, thereby denoted by 'x'. It is evident from the results that, the melt-solidification ability of all the comparative examples are evaluated as 'x', while all the embodiment are evaluated as 'O'. Therefore, it is verified that satisfactory melt-solidified substances can be obtained in case of the embodiment.

TABLE 1

| | | Melt-solidified substance | Composition (mass %) | | | | | | | | | | | | | |
|---|---|---|---|---|---|---|---|---|---|---|---|---|---|---|---|---|
| | | | Cu | Zr | P | Zn | Sn | Si | Al | Sb | Pb | F1, f1 | F2, f2 | F3, f3 | F4, f4 | F5, f5 |
| Embodiment | 1 | A1 | 99.8 | 0.048 | 0.09 | 0.0 | | | | | | 1.9 | — | — | — | — |
| | | A | 99.9 | 0.038 | 0.06 | 0.0 | | | | | | 1.6 | — | — | — | — |
| | 2 | A1 | 65.1 | 0.016 | 0.08 | 34.8 | | | | | | 5.0 | 64.9 | 34.8 | 2175 | 435 |
| | | A | 65.5 | 0.009 | 0.07 | 34.4 | | | | | | 7.8 | 65.3 | 34.4 | 3825 | 492 |
| | 3 | A1 | 73.6 | 0.025 | 0.05 | 26.3 | | | | | | 2.0 | 73.5 | 26.3 | 1053 | 527 |
| | | A | 74.2 | 0.017 | 0.04 | 25.7 | | | | | | 2.4 | 74.1 | 25.7 | 1514 | 644 |
| | 4 | A1 | 63.9 | 0.022 | 0.06 | 35.8 | | 0.2 | | | | 2.7 | 63.0 | 36.8 | 1674 | 614 |
| | | A | 64.3 | 0.016 | 0.05 | 35.4 | | 0.2 | | | | 3.1 | 63.5 | 36.4 | 2277 | 729 |
| | 5 | A1 | 75.9 | 0.0049 | 0.06 | 20.9 | | 3.1 | | | | 12.2 | 64.9 | 36.4 | 7436 | 607 |
| | | A | 76.3 | 0.0033 | 0.06 | 20.5 | | 3.1 | | | | 18.2 | 65.3 | 36.0 | 10920 | 601 |
| | 6 | A1 | 75.5 | 0.007 | 0.06 | 21.4 | | 3 | | | | 8.6 | 64.8 | 36.4 | 5205 | 607 |
| | | A | 76 | 0.0048 | 0.06 | 20.9 | | 3 | | | | 12.5 | 65.3 | 35.9 | 7487 | 599 |
| | 7 | A1 | 75.6 | 0.01 | 0.07 | 21.3 | | 3 | | | | 7.0 | 64.9 | 36.3 | 3632 | 519 |
| | | A | 75.9 | 0.008 | 0.07 | 21.0 | | 3 | | | | 8.8 | 65.2 | 36.0 | 4503 | 515 |
| | 8 | A1 | 75.7 | 0.0048 | 0.29 | 21.0 | | 3 | | | | 60.4 | 64.3 | 36.0 | 7501 | 124 |
| | | A | 76.2 | 0.0034 | 0.28 | 20.5 | | 3 | | | | 82.4 | 64.9 | 35.5 | 10446 | 127 |
| | 9 | A1 | 76 | 0.019 | 0.08 | 20.8 | | 3.1 | | | | 4.2 | 64.9 | 36.3 | 1911 | 454 |
| | | A | 76.4 | 0.012 | 0.08 | 20.4 | | 3.1 | | | | 6.7 | 65.3 | 35.9 | 2992 | 449 |
| | 10 | A1 | 76.9 | 0.009 | 0.07 | 19.6 | 0.3 | 3.1 | | | | 7.8 | 65.7 | 36.0 | 4002 | 515 |
| | | A | 77.3 | 0.006 | 0.07 | 19.2 | 0.3 | 3.1 | | | | 11.7 | 66.1 | 35.6 | 5937 | 509 |
| | 11 | A1 | 77.3 | 0.01 | 0.07 | 20.0 | | 2.6 | | | | 7.0 | 68.0 | 33.0 | 3302 | 472 |
| | | A | 77.8 | 0.006 | 0.06 | 19.5 | | 2.6 | | | | 10.0 | 68.5 | 32.5 | 5422 | 542 |
| | 12 | A1 | 75.7 | 0.024 | 0.07 | 21.1 | | 3.1 | | | | 2.9 | 64.6 | 36.6 | 1525 | 523 |
| | | A | 76 | 0.018 | 0.07 | 20.8 | | 3.1 | | | | 3.9 | 64.9 | 36.3 | 2017 | 519 |
| | 13 | A1 | 79.2 | 0.016 | 0.07 | 16.8 | | 3.9 | | | | 4.4 | 65.3 | 36.3 | 2270 | 519 |
| | | A | 79.5 | 0.011 | 0.07 | 16.5 | | 3.9 | | | | 6.4 | 65.6 | 36.0 | 3274 | 515 |
| | 14 | A1 | 84.1 | 0.029 | 0.06 | 13.3 | 2.5 | | | | | 2.1 | 82.7 | 20.8 | 718 | 347 |
| | | A | 84.5 | 0.023 | 0.05 | 12.9 | 2.5 | | | | | 2.2 | 83.1 | 20.4 | 888 | 409 |
| | 15 | A1 | 72.5 | 0.018 | 0.06 | 26.2 | 1.2 | | | | | 3.3 | 71.7 | 29.8 | 1657 | 497 |
| | | A | 72.5 | 0.013 | 0.06 | 26.2 | 1.2 | | | | | 4.6 | 71.7 | 29.8 | 2294 | 497 |
| | 16 | A1 | 67.2 | 0.025 | 0.08 | 31.7 | 0.9 | | 0.08 | | | 3.2 | 66.4 | 34.7 | 1386 | 433 |
| | | A | 67.8 | 0.019 | 0.08 | 31.1 | 0.9 | | 0.08 | | | 4.2 | 67.0 | 34.1 | 1793 | 426 |
| | 17 | A1 | 68.7 | 0.033 | 0.05 | 31.2 | | | | 0.04 | | 1.5 | 68.5 | 31.2 | 945 | 624 |
| | | A | 69.3 | 0.023 | 0.05 | 30.6 | | | | 0.04 | | 2.2 | 69.1 | 30.6 | 1330 | 612 |
| | 18 | A1 | 61.6 | 0.025 | 0.05 | 37.1 | | | | | 1.2 | 2.0 | 62.1 | 37.1 | 1485 | 743 |
| | | A | 62.2 | 0.018 | 0.04 | 36.5 | | | | | 1.2 | 2.2 | 62.7 | 36.5 | 2030 | 914 |

TABLE 2

| | | Melt-solidified substance | Composition (mass %) | | | | | | | | | | | | |
|---|---|---|---|---|---|---|---|---|---|---|---|---|---|---|---|
| | | | Cu | Zr | P | Zn | Sn | Si | Al | Mn | As | Sb | Mg | Pb | Bi | Se |
| Embodiment | 19 | A1 | 74.4 | 0.014 | 0.05 | 21.3 | | 3.4 | | 0.8 | | | | | | |
| | | A | 74.7 | 0.008 | 0.05 | 21.0 | | 3.4 | | 0.8 | | | | | | |
| | 20 | A1 | 62.5 | 0.024 | 0.08 | 33.9 | 0.9 | | | 2.6 | | | | | | |
| | | A | 62.9 | 0.015 | 0.08 | 33.5 | 0.9 | | | 2.6 | | | | | | |
| | 21 | A1 | 64.3 | 0.022 | 0.08 | 30.5 | | 1 | 1.1 | 3 | | | | | | |
| | | A | 64.7 | 0.015 | 0.08 | 30.1 | | 1 | 1.1 | 3 | | | | | | |
| | 22 | A1 | 68 | 0.02 | 0.05 | 31.3 | 0.6 | | | | 0.05 | | | | | |
| | | A | 68.5 | 0.012 | 0.04 | 30.8 | 0.6 | | | | 0.05 | | | | | |
| | 23 | A1 | 79.5 | 0.028 | 0.08 | 11.6 | 5.6 | | | | | | | | 2.8 | 0.4 |
| | | A | 80.2 | 0.019 | 0.07 | 10.9 | 5.6 | | | | | | | | 2.8 | 0.4 |
| | 24 | A1 | 63 | 0.012 | 0.07 | 34.4 | 1.2 | | 0.22 | | | | | 0.9 | | |
| | | A | 63.6 | 0.009 | 0.06 | 33.8 | 1.2 | | 0.22 | | | | | 0.9 | | |
| | 25 | A1 | 64 | 0.014 | 0.07 | 32.3 | 2.7 | | | | | | | | 0.9 | |
| | | A | 64.5 | 0.009 | 0.06 | 31.8 | 2.7 | | | | | | | | 0.9 | |
| | 26 | A1 | 76 | 0.007 | 0.06 | 20.8 | | 3.1 | | | | | 0.016 | 0.009 | | |
| | | A | 76.3 | 0.0045 | 0.05 | 20.5 | | 3.1 | | | | | 0.005 | 0.009 | | |
| | 27 | A1 | 81.9 | 0.037 | 0.07 | 15.2 | 2.6 | 0.2 | | | | | | | | |
| | | A | 82.5 | 0.029 | 0.06 | 14.6 | 2.6 | 0.2 | | | | | | | | |
| | 28 | A1 | 75.8 | 0.007 | 0.06 | 20.9 | | 3.2 | | | | | | | | |
| | | A | 76.2 | 0.005 | 0.06 | 20.5 | | 3.2 | | | | | | | | |
| | 29 | A1 | 63.4 | 0.023 | 0.06 | 35.6 | | | | | 0.05 | | | 0.9 | | |
| | | A | 63.8 | 0.016 | 0.06 | 35.2 | | | | | 0.05 | | | 0.9 | | |
| | 30 | A1 | 77.2 | 0.01 | 0.07 | 19.3 | | 3.3 | | | | 0.05 | 0.008 | 0.018 | | |
| | | A | 77.5 | 0.007 | 0.06 | 19.1 | | 3.3 | | | | 0.05 | 0.003 | 0.018 | | |
| | 31 | A1 | 73.6 | 0.02 | 0.12 | 19.3 | | 4.1 | | 2.8 | | | | 0.09 | | |
| | | A | 73.9 | 0.018 | 0.11 | 19.0 | | 4.1 | | 2.8 | | | | 0.09 | | |
| | 32 | A1 | 62.9 | 0.015 | 0.06 | 34.7 | 1 | | 0.12 | | 0.07 | | | 0.9 | | 0.2 |
| | | A | 63.3 | 0.011 | 0.06 | 34.3 | 1 | | 0.12 | | 0.07 | | | 0.9 | | 0.2 |
| | 33 | A1 | 80 | 0.029 | 0.1 | 8.4 | 5.9 | | | | | | 0.04 | 5.5 | | |
| | | A | 80.5 | 0.022 | 0.08 | 8.1 | 5.8 | | | | | | 0.04 | 5.5 | | |
| | 34 | A1 | 79.8 | 0.035 | 0.07 | 18.7 | 1.1 | | | 0.05 | | | | | | |
| | | A | 80.4 | 0.026 | 0.07 | 18.1 | 1.1 | | | 0.05 | | | | | | |
| | 35 | A1 | 91.7 | 0.03 | 0.08 | 0.0 | | 8.2 | | | | | | | | |
| | | A | 91.8 | 0.02 | 0.08 | 0.0 | | 8.1 | | | | | | | | |

| | | Melt-solidified substance | Composition (mass %) | | | | | | | | |
|---|---|---|---|---|---|---|---|---|---|---|---|
| | | | Te | Co | B | REM | F1, f1 | F2, f2 | F3, f3 | F4, f4 | F5, f5 |
| Embodiment | 19 | A1 | | | | | 3.6 | 63.2 | 38.3 | 2738 | 767 |
| | | A | | | | | 6.3 | 63.5 | 38.0 | 4755 | 761 |
| | 20 | A1 | | | | | 3.3 | 61.7 | 38.4 | 1600 | 480 |
| | | A | | | | | 5.3 | 62.1 | 38.0 | 2534 | 475 |
| | 21 | A1 | | | | | 3.6 | 61.6 | 38.8 | 1764 | 485 |
| | | A | | | | | 5.3 | 62.0 | 38.4 | 2560 | 480 |
| | 22 | A1 | | | | | 2.5 | 67.5 | 33.1 | 1654 | 662 |
| | | A | | | | | 3.3 | 68.1 | 32.6 | 2717 | 815 |
| | 23 | A1 | | | | | 2.9 | 78.1 | 28.4 | 1014 | 355 |
| | | A | | | | | 3.7 | 78.8 | 27.7 | 1458 | 396 |
| | 24 | A1 | 0.2 | | | | 5.8 | 62.3 | 38.7 | 3222 | 552 |
| | | A | 0.2 | | | | 6.7 | 63.0 | 38.1 | 4230 | 635 |
| | 25 | A1 | | | | | 5.0 | 62.9 | 40.4 | 2887 | 577 |
| | | A | | | | | 6.7 | 63.4 | 39.9 | 4437 | 666 |
| | 26 | A1 | | | | | 8.6 | 65.0 | 36.3 | 5187 | 605 |
| | | A | | | | | 11.1 | 65.3 | 36.0 | 8007 | 721 |
| | 27 | A1 | | 0.02 | | | 1.9 | 79.7 | 24.0 | 648 | 342 |
| | | A | | 0.02 | | | 2.1 | 80.3 | 23.4 | 807 | 390 |
| | 28 | A1 | | | 0.008 | | 8.6 | 64.4 | 36.9 | 5275 | 615 |
| | | A | | | 0.005 | | 12.0 | 64.8 | 36.5 | 7306 | 609 |
| | 29 | A1 | | | | | 2.6 | 63.6 | 35.6 | 1546 | 593 |
| | | A | | | | | 3.8 | 64.0 | 35.2 | 2198 | 586 |
| | 30 | A1 | | | | | 7.0 | 65.4 | 35.8 | 3584 | 512 |
| | | A | | | | | 8.6 | 65.8 | 35.6 | 5080 | 593 |
| | 31 | A1 | | | | | 6.0 | 61.7 | 39.8 | 1989 | 331 |
| | | A | | | | | 6.1 | 62.1 | 39.5 | 2193 | 359 |
| | 32 | A1 | | | | | 4.0 | 62.5 | 38.1 | 2540 | 635 |
| | | A | | | | | 5.5 | 62.9 | 37.7 | 3427 | 628 |
| | 33 | A1 | | | | | 3.4 | 79.5 | 26.1 | 901 | 261 |
| | | A | | | | | 3.6 | 80.1 | 25.5 | 1157 | 318 |
| | 34 | A1 | | | | 0.25 | 2.0 | 79.1 | 22.0 | 628 | 314 |
| | | A | | | | 0.25 | 2.7 | 79.7 | 21.4 | 823 | 306 |
| | 35 | A1 | | | | | 2.7 | 76.7 | 24.6 | 820 | 307 |
| | | A | | | | | 4.0 | 77.0 | 24.3 | 1215 | 304 |

TABLE 3

| | | Melt-solidified substance | Composition (mass %) | | | | | | | | | | |
|---|---|---|---|---|---|---|---|---|---|---|---|---|---|
| | | | Cu | Zr | P | Zn | Sn | Si | Al | Mn | Mg | Pb | Cr | Ti |
| Embodiment | 36 | A1 | 96.6 | 0.038 | 0.07 | 0.0 | | 3.3 | | | | | | |
| | | A | 96.8 | 0.03 | 0.07 | 0.0 | | 3.1 | | | | | | |
| | 37 | A1 | 92.1 | 0.033 | 0.08 | 0.0 | | 1.7 | 6 | | | | | |
| | | A | 92.3 | 0.025 | 0.08 | 0.0 | | 1.6 | 6 | | | | | |
| | 38 | A1 | 89.5 | 0.028 | 0.07 | 0.0 | 10.4 | | | | | | | |
| | | A | 89.8 | 0.019 | 0.06 | 0.0 | 10.1 | | | | | | | |
| | 39 | A1 | 91 | 0.033 | 0.07 | 0.0 | | | 8.2 | 0.6 | 0.02 | | | |
| | | A | 91.2 | 0.028 | 0.07 | 0.0 | | | 8.2 | 0.49 | 0.01 | | | |
| | 40 | A1 | 85.8 | 0.029 | 0.1 | 0.0 | 8.5 | | | | | 5.5 | | |
| | | A | 86.2 | 0.023 | 0.07 | 0.0 | 8.2 | | | | | 5.5 | | |
| | 41 | A1 | 96.1 | 0.036 | 0.13 | 0.0 | | 3.3 | | 0.4 | | | | |
| | | A | 96.3 | 0.027 | 0.12 | 0.0 | | 3.2 | | 0.32 | | | | |
| | 42 | A1 | 96.1 | 0.032 | 0.14 | 0.0 | | 3.7 | | | | | 0.02 | |
| | | A | 96.3 | 0.025 | 0.13 | 0.0 | | 3.5 | | | | | 0.02 | |
| | 43 | A1 | 90.5 | 0.029 | 0.08 | 0.0 | 9.3 | | | | | | | 0.03 |
| | | A | 90.8 | 0.02 | 0.06 | 0.0 | 9.1 | | | | | | | 0.02 |
| | 44 | B1 | 65.1 | 0.016 | 0.08 | 34.8 | | | | | | | | |
| | | B | 65.6 | 0.01 | 0.07 | 34.3 | | | | | | | | |
| | 45 | B1 | 75.5 | 0.007 | 0.06 | 21.4 | | 3 | | | | | | |
| | | B | 76 | 0.0049 | 0.06 | 20.9 | | 3 | | | | | | |
| | 46 | B1 | 75.6 | 0.01 | 0.07 | 21.3 | | 3 | | | | | | |
| | | B | 76 | 0.008 | 0.07 | 20.9 | | 3 | | | | | | |
| | 47 | B1 | 72.8 | 0.013 | 0.07 | 25.9 | 1.2 | | | | | | | |
| | | B | 73.3 | 0.009 | 0.06 | 25.4 | 1.2 | | | | | | | |
| | 48 | B1 | 67.2 | 0.025 | 0.08 | 31.7 | 0.9 | | 0.08 | | | | | |
| | | B | 68 | 0.015 | 0.07 | 30.9 | 0.9 | | 0.07 | | | | | |
| | 49 | B1 | 77.5 | 0.013 | 0.05 | 20.6 | | | 1.8 | | | | | |
| | | B | 77.8 | 0.009 | 0.05 | 20.3 | | | 1.8 | | | | | |
| | 50 | C1 | 65.1 | 0.016 | 0.08 | 34.8 | | | | | | | | |
| | | C | 66 | 0.008 | 0.07 | 33.9 | | | | | | | | |
| | 51 | C1 | 63.9 | 0.022 | 0.06 | 35.8 | | 0.2 | | | | | | |
| | | C | 64.5 | 0.013 | 0.05 | 35.2 | | 0.2 | | | | | | |
| | 52 | C1 | 75.5 | 0.007 | 0.06 | 21.4 | | 3 | | | | | | |
| | | C | 76.4 | 0.0043 | 0.06 | 20.5 | | 3 | | | | | | |

| | Melt-solidified substance | Composition (mass %) | | | | | |
|---|---|---|---|---|---|---|---|
| | | C | F1, f1 | F2, f2 | F3, f3 | F4, f4 | F5, f5 |
| Embodiment 36 | A1 | | 1.8 | 84.8 | 16.5 | 434 | 236 |
| | A | | 2.3 | 85.7 | 15.5 | 517 | 221 |
| 37 | A1 | | 2.4 | 75.1 | 26.5 | 803 | 331 |
| | A | | 3.2 | 75.7 | 26.0 | 1040 | 325 |
| 38 | A1 | | 2.5 | 84.1 | 31.2 | 1114 | 446 |
| | A | | 3.2 | 84.6 | 30.3 | 1596 | 505 |
| 39 | A1 | | 2.1 | 76.6 | 24.6 | 745 | 351 |
| | A | | 2.5 | 76.7 | 24.6 | 879 | 351 |
| 40 | A1 | | 3.4 | 84.0 | 25.5 | 879 | 255 |
| | A | | 3.0 | 84.6 | 24.6 | 1070 | 352 |
| 41 | A1 | | 3.6 | 84.6 | 16.5 | 459 | 127 |
| | A | | 4.4 | 85.1 | 16.0 | 594 | 134 |
| 42 | A1 | 0.0002 | 4.4 | 82.7 | 18.5 | 578 | 132 |
| | A | 0.0002 | 5.2 | 83.7 | 17.5 | 701 | 135 |
| 43 | A1 | | 2.8 | 85.6 | 27.9 | 962 | 349 |
| | A | | 3.0 | 86.1 | 27.3 | 1365 | 455 |
| 44 | B1 | | 5.0 | 64.9 | 34.8 | 2175 | 435 |
| | B | | 7.0 | 65.4 | 34.3 | 3432 | 490 |
| 45 | B1 | | 8.6 | 64.8 | 36.4 | 5205 | 607 |
| | B | | 12.2 | 65.3 | 35.9 | 7334 | 599 |
| 46 | B1 | | 7.0 | 64.9 | 36.3 | 3632 | 519 |
| | B | | 8.8 | 65.3 | 35.9 | 4490 | 513 |
| 47 | B1 | | 5.4 | 72.0 | 29.5 | 2271 | 422 |
| | B | | 6.7 | 72.5 | 29.0 | 3226 | 484 |
| 48 | B1 | | 3.2 | 66.4 | 34.7 | 1386 | 433 |
| | B | | 4.7 | 67.2 | 33.9 | 2257 | 484 |
| 49 | B1 | | 3.8 | 74.1 | 26.0 | 2003 | 521 |
| | B | | 5.6 | 74.4 | 25.7 | 2860 | 515 |
| 50 | C1 | | 5.0 | 64.9 | 34.8 | 2175 | 435 |
| | C | | 8.8 | 65.3 | 33.9 | 4240 | 485 |
| 51 | C1 | | 2.7 | 63.0 | 36.8 | 1674 | 614 |
| | C | | 3.8 | 63.7 | 36.2 | 2787 | 725 |
| 52 | C1 | | 8.6 | 64.8 | 36.4 | 5205 | 607 |
| | C | | 14.0 | 65.7 | 35.5 | 8264 | 592 |

TABLE 4

| | | Melt-solidified substance | Composition (mass %) | | | | | | | | | | |
|---|---|---|---|---|---|---|---|---|---|---|---|---|---|
| | | | Cu | Zr | P | Zn | Sn | Si | Al | F1, f1 | F2, f2 | F3, f3 | F4, f4 | F5, f5 |
| Embodiment | 53 | C1 | 75.6 | 0.01 | 0.07 | 21.3 | | 3 | | 7.0 | 64.9 | 36.3 | 3632 | 519 |
| | | C | 76.3 | 0.007 | 0.07 | 20.6 | | 3 | | 10.0 | 65.6 | 35.6 | 5089 | 509 |
| | 54 | C1 | 75.7 | 0.024 | 0.07 | 21.1 | | 3.1 | | 2.9 | 64.6 | 36.6 | 1525 | 523 |
| | | C | 76.4 | 0.015 | 0.07 | 20.4 | | 3.1 | | 4.7 | 65.3 | 35.9 | 2394 | 513 |
| | 55 | C1 | 72.8 | 0.013 | 0.07 | 25.9 | 1.2 | | | 5.4 | 72.0 | 29.5 | 2271 | 422 |
| | | C | 73.5 | 0.008 | 0.06 | 25.2 | 1.2 | | | 7.5 | 72.7 | 28.8 | 3604 | 481 |
| | 56 | C1 | 77.5 | 0.013 | 0.05 | 20.6 | | | 1.8 | 3.8 | 74.1 | 26.0 | 2003 | 521 |
| | | C | 78 | 0.008 | 0.05 | 20.1 | | | 1.8 | 6.3 | 74.6 | 25.5 | 3193 | 511 |
| | 57 | D1 | 65.1 | 0.016 | 0.08 | 34.8 | | | | 5.0 | 64.9 | 34.8 | 2175 | 435 |
| | | D2 | 65.1 | 0.016 | 0.08 | 34.8 | | | | 5.0 | 64.9 | 34.8 | 2175 | 435 |
| | | D | 65.8 | 0.01 | 0.07 | 34.1 | | | | 7.0 | 65.6 | 34.1 | 3412 | 487 |
| | 58 | D1 | 65.1 | 0.016 | 0.08 | 34.8 | | | | 5.0 | 64.9 | 34.8 | 2175 | 435 |
| | | D2 | 63.9 | 0.022 | 0.06 | 35.8 | | 0.2 | | 2.7 | 63.0 | 36.8 | 1674 | 614 |
| | | D | 64.7 | 0.014 | 0.05 | 35.1 | | 0.15 | | 3.6 | 64.0 | 35.8 | 2560 | 717 |
| | 59 | D1 | 72.8 | 0.013 | 0.07 | 25.9 | 1.2 | | | 5.4 | 72.0 | 29.5 | 2271 | 422 |
| | | D2 | 72.8 | 0.013 | 0.07 | 25.9 | 1.2 | | | 5.4 | 72.0 | 29.5 | 2271 | 422 |
| | | D | 73.8 | 0.007 | 0.06 | 24.9 | 1.2 | | | 8.6 | 73.0 | 28.5 | 4076 | 476 |
| | 60 | D1 | 77.5 | 0.013 | 0.05 | 20.6 | | | 1.8 | 3.8 | 74.1 | 26.0 | 2003 | 521 |
| | | D2 | 77.5 | 0.013 | 0.05 | 20.6 | | | 1.8 | 3.8 | 74.1 | 26.0 | 2003 | 521 |
| | | D | 78 | 0.009 | 0.05 | 20.1 | | | 1.8 | 5.6 | 74.6 | 25.5 | 2838 | 511 |
| | 61 | D1 | 76 | 0.0004 | 0.05 | 20.8 | | 3.1 | | 125.0 | 65.0 | 36.3 | 90874 | 727 |
| | | D2 | 75.7 | 0.024 | 0.07 | 21.1 | | 3.1 | | 2.9 | 64.6 | 36.6 | 1525 | 523 |
| | | D | 76.5 | 0.009 | 0.06 | 20.4 | | 3 | | 6.7 | 65.8 | 35.4 | 3937 | 591 |
| | 62 | E1 | 75.6 | 0.01 | 0.07 | 21.3 | | 3 | | 7.0 | 64.9 | 36.3 | 3632 | 519 |
| | | E | 76.2 | 0.006 | 0.07 | 20.7 | | 3 | | 11.7 | 65.5 | 35.7 | 5954 | 510 |
| | 63 | E1 | 67.2 | 0.025 | 0.08 | 31.7 | 0.9 | | 0.08 | 3.2 | 66.4 | 34.7 | 1386 | 433 |
| | | E | 67.8 | 0.017 | 0.08 | 31.1 | 0.9 | | 0.08 | 4.7 | 67.0 | 34.1 | 2004 | 426 |
| | 64 | F1 | 70.2 | 0.028 | 0.08 | 29.7 | | | | 2.9 | 70.0 | 29.7 | 1060 | 371 |
| | | F | 71.2 | 0.015 | 0.07 | 28.7 | | | | 4.7 | 71.0 | 28.7 | 1914 | 410 |
| | 65 | F1 | 75.5 | 0.017 | 0.07 | 21.4 | | 3 | | 4.1 | 64.8 | 36.4 | 2142 | 520 |
| | | F | 76.5 | 0.008 | 0.06 | 20.4 | | 3 | | 7.5 | 65.8 | 35.4 | 4429 | 591 |
| | 66 | G1 | 76.8 | 0.009 | 0.06 | 19.8 | | 3.3 | | 6.7 | 65.1 | 36.3 | 4037 | 606 |
| | | G | 77.3 | 0.007 | 0.05 | 19.3 | | 3.3 | | 7.1 | 65.6 | 35.8 | 5120 | 717 |
| | 67 | G1 | 72.2 | 0.016 | 0.07 | 26.8 | 0.9 | | | 4.4 | 71.5 | 29.5 | 1845 | 422 |
| | | G | 72.8 | 0.01 | 0.06 | 26.2 | 0.9 | | | 6.0 | 72.2 | 28.9 | 2893 | 482 |

TABLE 5

| | | Melt-solidified substance | Composition (mass %) | | | | | | | | | | | | | Impurity | | F1, f1 | F2, f2 | F3, f3 | F4, f4 | F5, f5 |
|---|---|---|---|---|---|---|---|---|---|---|---|---|---|---|---|---|---|---|---|---|---|---|
| | | | Cu | Zr | P | Zn | Sn | Si | Al | Mn | As | Pb | Bi | Se | Te | Fe | Ni | | | | | |
| Comparative example | 101 | A1 | 61 | 0.029 | 0.1 | 38.9 | | | | | | | | | | | | 3.4 | 60.7 | 38.9 | 1340 | 389 |
| | | A | 61.4 | 0.02 | 0.09 | 38.5 | | | | | | | | | | | | 4.5 | 61.1 | 38.5 | 1925 | 428 |
| | 102 | A1 | 65.3 | 0.023 | 0 | 34.7 | | | | | | | | | | | | 0 | 65.3 | 34.7 | 1508 | — |
| | | A | 65.8 | 0.015 | 0 | 34.2 | | | | | | | | | | | | 0 | 65.8 | 34.2 | 2279 | — |
| | 103 | A1 | 76 | 0.0004 | 0.05 | 20.8 | | 3.1 | | | | | | | | | | 125.0 | 65.0 | 36.3 | 90874 | 727 |
| | | A | 76.5 | 0 | 0.05 | 20.4 | | 3.1 | | | | | | | | | | — | 65.5 | 35.9 | — | 717 |
| | 104 | A1 | 76.1 | 0.095 | 0.017 | 20.7 | | 3.1 | | | | | | | | | | 0.2 | 65.2 | 36.2 | 381 | 2129 |
| | | A | 76.5 | 0.09 | 0.015 | 20.3 | | 3.1 | | | | | | | | | | 0.2 | 65.6 | 35.8 | 398 | 2386 |
| | 105 | A1 | 70.5 | 0.017 | 0.07 | 26.3 | | 3.1 | | | | | | | | | | 4.1 | 59.4 | 41.8 | 2460 | 597 |
| | | A | 70.8 | 0.012 | 0.07 | 26.0 | | 3.1 | | | | | | | | | | 5.8 | 59.7 | 41.5 | 3460 | 593 |
| | 106 | A1 | 67 | 0.008 | 0.38 | 31.7 | 0.9 | | | | | | | | | | | 47.5 | 65.4 | 34.4 | 4302 | 91 |
| | | A | 67.5 | 0.004 | 0.36 | 31.2 | 0.9 | | | | | | | | | | | 90.0 | 66.0 | 33.9 | 8484 | 94 |
| | 107 | A1 | 60.1 | 0.027 | 0.06 | 38.8 | 1 | | | | | | | | | | | 2.2 | 59.4 | 41.8 | 1549 | 697 |
| | | A | 60.5 | 0.019 | 0.05 | 38.4 | 1 | | | | | | | | | | | 2.6 | 59.9 | 41.4 | 2181 | 829 |
| | 108 | A1 | 64.5 | 0.02 | 0.007 | 30.5 | | 1 | 1.1 | 2.9 | | | | | | | | 0.4 | 61.9 | 38.8 | 1939 | 5539 |
| | | A | 65 | 0.015 | 0.005 | 30.0 | | 1 | 1.1 | 2.9 | | | | | | | | 0.3 | 62.4 | 38.3 | 2552 | 7656 |
| | 109 | A1 | 75.5 | 0.024 | 0.07 | 21.1 | | 3 | | | | | | | | 0.32 | | 2.9 | 64.8 | 36.1 | 1504 | 516 |
| | | A | 76.1 | 0.016 | 0.07 | 20.5 | | 3 | | | | | | | | 0.32 | | 4.4 | 65.4 | 35.5 | 2218 | 507 |
| | 110 | A1 | 65 | 0.025 | 0.07 | 33.7 | 1 | | | | | | | | | 0.21 | 0.21 | 2.8 | 64.3 | 36.7 | 1468 | 524 |
| | | A | 65.5 | 0.019 | 0.07 | 33.2 | 1 | | | | | | | | | 0.21 | 0.21 | 3.7 | 64.8 | 36.2 | 1905 | 517 |
| | 111 | B1 | 59.6 | 0.024 | 0.09 | 40.3 | | | | | | | | | | | | 3.8 | 59.3 | 40.3 | 1679 | 448 |
| | | B | 60.2 | 0.016 | 0.09 | 39.7 | | | | | | | | | | | | 5.6 | 59.9 | 39.7 | 2481 | 441 |

TABLE 5-continued

| Melt-solidified substance | Composition (mass %) | | | | | | | | | | | | | | | F1, f1 | F2, f2 | F3, f3 | F4, f4 | F5, f5 |
|---|---|---|---|---|---|---|---|---|---|---|---|---|---|---|---|---|---|---|---|---|
| | Cu | Zr | P | Zn | Sn | Si | Al | Mn | As | Pb | Bi | Se | Te | Impurity Fe | Ni | | | | | |
| 112 B1 | 65.3 | 0.023 | 0 | 34.7 | | | | | | | | | | | | 0 | 65.3 | 34.7 | 1508 | — |
| B | 65.7 | 0.016 | 0 | 34.3 | | | | | | | | | | | | 0 | 65.7 | 34.3 | 2143 | — |
| 113 B1 | 75.5 | 0.02 | 0 | 21.5 | 3 | | | | | | | | | | | 0 | 65.0 | 36.5 | 1824 | — |
| B | 75.9 | 0.016 | 0 | 21.1 | 3 | | | | | | | | | | | 0 | 65.4 | 36.1 | 2255 | — |
| 114 B1 | 76 | 0.0004 | 0.05 | 20.8 | | 3.1 | | | | | | | | | | 125.0 | 65.0 | 36.3 | 90874 | 727 |
| B | 76.6 | 0 | 0.05 | 20.3 | | 3.1 | | | | | | | | | | — | 65.6 | 35.8 | — | 715 |

TABLE 6

| | Melt-solidified substance | Composition (mass %) | | | | | | | F1, f1 | F2, f2 | F3, f3 | F4, f4 | F5, f5 |
|---|---|---|---|---|---|---|---|---|---|---|---|---|---|
| | | Cu | Zr | P | Zn | Sn | Si | Al | | | | | |
| Comparative example | 115 B1 | 70.5 | 0.017 | 0.07 | 26.3 | | 3.1 | | 4.1 | 59.4 | 41.8 | 2460 | 597 |
| | B | 71 | 0.013 | 0.07 | 25.8 | | 3.1 | | 5.4 | 59.9 | 41.3 | 3178 | 590 |
| | 116 B1 | 66.6 | 0.018 | 0 | 32.5 | 0.9 | | | 0 | 66.2 | 35.2 | 1955 | — |
| | B | 67 | 0.014 | 0 | 31.8 | 1.2 | | | 0 | 66.4 | 35.4 | 2528 | — |
| | 117 B1 | 78 | 0.0004 | 0.06 | 20.0 | | | 1.9 | 150.0 | 74.4 | 25.7 | 64349 | 429 |
| | B | 78.2 | 0 | 0.06 | 19.8 | | | 1.9 | — | 74.6 | 25.5 | — | 426 |
| | 118 C1 | 59.6 | 0.024 | 0.09 | 40.3 | | | | 3.8 | 59.3 | 40.3 | 1679 | 448 |
| | C | 60.1 | 0.015 | 0.08 | 39.8 | | | | 5.3 | 59.9 | 39.8 | 2654 | 498 |
| | 119 C1 | 65.3 | 0.023 | 0 | 34.7 | | | | 0 | 65.3 | 34.7 | 1508 | — |
| | C | 66 | 0.014 | 0 | 34.0 | | | | 0 | 66.0 | 34.0 | 2428 | — |
| | 120 C1 | 76 | 0.0004 | 0.05 | 20.8 | | 3.1 | | 125.0 | 65.0 | 36.3 | 90874 | 727 |
| | C | 76.8 | 0 | 0.05 | 20.1 | | 3.1 | | — | 65.8 | 35.6 | — | 711 |
| | 121 C1 | 66.6 | 0.018 | 0 | 32.5 | 0.9 | | | 0 | 66.2 | 35.2 | 1955 | — |
| | C | 67.2 | 0.011 | 0 | 31.6 | 1.2 | | | 0 | 66.6 | 35.2 | 3199 | — |
| | 122 C1 | 78 | 0.0004 | 0.06 | 20.0 | | | 1.9 | 150.0 | 74.4 | 25.7 | 64349 | 429 |
| | C | 78.5 | 0 | 0.06 | 19.5 | | | 1.9 | — | 74.9 | 25.2 | — | 421 |
| | 123 D1 | 65.3 | 0.023 | 0 | 34.7 | | | | 0 | 65.3 | 34.7 | 1508 | — |
| | D2 | 65.3 | 0.023 | 0 | 34.7 | | | | 0 | 65.3 | 34.7 | 1508 | — |
| | D | 66 | 0.015 | 0 | 34.0 | | | | 0 | 66.0 | 34.0 | 2266 | — |
| | 124 D1 | 76 | 0.0004 | 0.05 | 20.8 | | 3.1 | | 125.0 | 65.0 | 36.3 | 90874 | 727 |
| | D2 | 76 | 0.0004 | 0.05 | 20.8 | | 3.1 | | 125.0 | 65.0 | 36.3 | 90874 | 727 |
| | D | 76.5 | 0 | 0.05 | 20.4 | | 3.1 | | — | 65.5 | 35.9 | — | 717 |
| | 125 D1 | 66.6 | 0.018 | 0 | 32.5 | 0.9 | | | 0 | 66.2 | 35.2 | 1955 | — |
| | D2 | 66.6 | 0.018 | 0 | 32.5 | 0.9 | | | 0 | 66.2 | 35.2 | 1955 | — |
| | D | 67.3 | 0.012 | 0 | 31.5 | 1.2 | | | 0 | 66.7 | 35.1 | 2924 | — |
| | 126 D1 | 78 | 0.0004 | 0.06 | 20.0 | | | 1.9 | 150.0 | 74.4 | 25.7 | 64349 | 429 |
| | D2 | 78 | 0.0004 | 0.06 | 20.0 | | | 1.9 | 150.0 | 74.4 | 25.7 | 64349 | 429 |
| | D | 78.5 | 0 | 0.06 | 19.5 | | | 1.9 | — | 74.9 | 25.2 | — | 421 |
| | 127 E1 | 75.5 | 0.02 | 0 | 21.5 | 3 | | | 0 | 65.0 | 36.5 | 1824 | — |
| | E | 76 | 0.013 | 0 | 21.0 | 3 | | | 0 | 65.5 | 36.0 | 2768 | — |
| | 128 E1 | 66.6 | 0.018 | 0 | 32.5 | 0.9 | | | 0 | 66.2 | 35.2 | 1955 | — |
| | E | 67.3 | 0.011 | 0 | 31.8 | 0.9 | | | 0 | 66.9 | 34.5 | 3135 | — |

TABLE 7

| | Melt-solidified substance | Primary crystal | Metallic structure | Area ratio of β-phase (%) | Mean gram size (μm) | Maximum corrosion depth (μm) | Tensile strength (N/mm$^2$) | Elongation (%) | Melt solidification ability (semi-solid metal castability) |
|---|---|---|---|---|---|---|---|---|---|
| Embodiment | 1 A1 | α | α | 0 | 250 | | | | |
| | A | α | α | 0 | 200 | | | | |
| | 2 A1 | α | α + β | 0.5 | 65 | | | | |
| | A | α | α + β | 0.5 | 30 | 30 | 325 | 38 | ○ |
| | 3 A1 | α | α | 0 | 80 | | | | |
| | A | α | α | 0 | 55 | 20 | | | |
| | 4 A1 | α | α + β | 1 | 60 | | | | |
| | A | α | α + β | 1 | 30 | 40 | 321 | 37 | |
| | 5 A1 | α | α + κ + γ | 0 | 30 | | | | |

TABLE 7-continued

| | Melt-solidified substance | Primary crystal | Metallic structure | Area ratio of β-phase (%) | Mean gram size (μm) | Maximum corrosion depth (μm) | Tensile strength (N/mm²) | Elongation (%) | Melt solidification ability (semi-solid metal castability) |
|---|---|---|---|---|---|---|---|---|---|
| | A | α | α + κ + γ | 0 | | 15 | 20 | | |
| 6 | A1 | α | α + κ + γ | 0 | 25 | | | | |
| | A | α | α + κ + γ | 0 | | 10 | 10 or less | 526 | 44 | ○ |
| 7 | A1 | α | α + κ + γ | 0 | 20 | | | | |
| | A | α | α + κ + γ | 0 | | 10 | 10 or less | 536 | 45 | ○ |
| 8 | A1 | α | α + κ + γ | 0 | 200 | | | | |
| | A | α | α + κ + γ | 0 | | 120 | 40 | 455 | 21 | |
| 9 | A1 | α | α + κ + γ | 0 | 25 | | | | |
| | A | α | α + κ + γ | 0 | | 10 | 10 or less | 534 | 42 | ○ |
| 10 | A1 | α | α + κ + γ | 0 | 20 | | | | |
| | A | α | α + κ + γ | 0 | | 10 | 10 or less | 522 | 36 | |
| 11 | A1 | α | α + κ | 0 | 80 | | | | |
| | A | α | α + κ | | 0 | 40 | 30 | | |
| 12 | A1 | α | α + κ + γ | 0 | 35 | | | | |
| | A | α | α + κ + γ | 0 | | 15 | 10 or less | 522 | 40 | |
| 13 | A1 | α | α + κ | 0 | 65 | | | | |
| | A | α | α + κ | | 0 | 35 | 20 | 519 | 35 | |
| 14 | A1 | α | α | 0 | 90 | | | | |
| | A | α | α | | 0 | 55 | 10 or less | | | |
| 15 | A1 | α | α + γ | 0 | 35 | | | | |
| | A | α | α + γ | | 0 | 20 | 10 or less | 342 | 33 | |
| 16 | A1 | α | α + γ + β | 0.5 | 35 | | | | |
| | A | α | α + γ + β | | 0.5 | 20 | 10 | | | |
| 17 | A1 | α | α | 0 | 50 | | | | |
| | A | α | α | | 0 | 30 | 20 | | | |
| 18 | A1 | α | α + β | 1.5 | 70 | | | | |
| | A | α | α + β | | 2 | 45 | 80 | | | |

TABLE 8

| | | Melt-solidified substance | Primary crystal | Metallic structure | Area ratio of β-phase (%) | Mean gram size (μm) | Maximum corrosion depth (μm) | Tensile strength (N/mm²) | Elongation (%) | Melt solidification ability (semi-solid metal castability) |
|---|---|---|---|---|---|---|---|---|---|---|
| Embodiment | 19 | A1 | α | α + κ + γ | 0 | 40 | | | | |
| | | A | α | α + κ + γ | | 0 | 25 | 20 | | | |
| | 20 | A1 | α | α + β | 2 | 80 | | | | |
| | | A | α | α + β | | 2 | 45 | 80 | | | |
| | 21 | A1 | α | α + β | 2 | 70 | | | | |
| | | A | α | α + β | | 2 | 45 | 70 | 426 | 30 | |
| | 22 | A1 | α | α | 0 | 60 | | | | |
| | | A | α | α | | 0 | 45 | 30 | | | |
| | 23 | A1 | α | α + δ | 0 | 55 | | | | |
| | | A | α | α + δ | | 0 | 30 | 10 or less | | | |
| | 24 | A1 | α | α + γ + β | 1 | 60 | | | | |
| | | A | α | α + γ + β | | 1.5 | 40 | 50 | | | |
| | 25 | A1 | α | α + γ + β | 0.5 | 55 | | | | |
| | | A | α | α + γ + β | | 0.5 | 35 | 20 | | | |
| | 26 | A1 | α | α + κ + γ | 0 | 30 | | | | |
| | | A | α | α + κ + γ | | 0 | 10 | 20 | | | |
| | 27 | A1 | α | α | 0 | 75 | | | | |
| | | A | α | α | | 0 | 55 | 10 or less | | | |
| | 28 | A1 | α | α + κ + γ | 0 | 30 | | | | |
| | | A | α | α + κ + γ | | 0 | 15 | 10 or less | | | |
| | 29 | A1 | α | α + β | 0.5 | 55 | | | | |
| | | A | α | α + β | | 0.5 | 30 | 40 | | | |
| | 30 | A1 | α | α + κ + γ | 0 | 30 | | | | |
| | | A | α | α + κ + γ | | 0 | 10 | 20 | | | |
| | 31 | A1 | α | α + κ + γ + β | 1 | 65 | | | | |
| | | A | α | α + κ + γ + β | | 1 | 40 | 50 | | | |
| | 32 | A1 | α | α + γ + β | 1 | 65 | | | | |
| | | A | α | α + γ + β | | 1.5 | 40 | 80 | | | |
| | 33 | A1 | α | α + δ | 0 | 55 | | | | |
| | | A | α | α + δ | | 0 | 40 | — | | | |
| | 34 | A1 | α | α | 0 | 80 | | | | |
| | | A | α | α | | 0 | 60 | — | | | |
| | 35 | A1 | α | α | 0 | 85 | | | | |
| | | A | α | α | | 0 | 55 | — | | | |

TABLE 9

| | | Melt-solidified substance | Primary crystal | Metallic structure | Area ratio of β-phase (%) | | Mean gram size (μm) | Maximum corrosion depth (μm) | Tensile strength (N/mm²) | Elongation (%) | Meltability (semi-solid metal castability) |
|---|---|---|---|---|---|---|---|---|---|---|---|
| Embodiment | 36 | A1 | α | α | 0 | | 120 | | | | |
| | | A | α | α | | 0 | | 90 | | | |
| | 37 | A1 | α | α | 0 | | 75 | | | | |
| | | A | α | α | | 0 | | 50 | | | |
| | 38 | A1 | α | α + δ | 0 | | 25 | | | | |
| | | A | α | α + δ | | 0 | | 15 | | | ○ |
| | 39 | A1 | α | α + β | 0.3 | | 80 | | | | |
| | | A | α | α + β | | 0.5 | | 55 | | | |
| | 40 | A1 | α | α + δ | 0 | | 40 | | | | |
| | | A | α | α + δ | | 0 | | 25 | | | |
| | 41 | A1 | α | α | 0 | | 120 | | | | |
| | | A | α | α | | 0 | | 110 | | | |
| | 42 | A1 | α | α | 0 | | 120 | | | | |
| | | A | α | α | | 0 | | 110 | | | |
| | 43 | A1 | α | α + δ | 0 | | 35 | | | | |
| | | A | α | α + δ | | 0 | | 20 | | | |
| | 44 | B1 | α | α + β | 0.3 | | 45 | | | | |
| | | B | α | α + β | | 0.5 | | 25 | 30 | 336 | 42 | |
| | 45 | B1 | α | α + κ + γ | 0 | | 20 | | | | |
| | | B | α | α + κ + γ | | 0 | | 10 | 10 or less | 532 | 45 | |
| | 46 | B1 | α | α + κ + γ | 0 | | 15 | | | | |
| | | B | α | α + κ + γ | | 0 | | 10 | 10 or less | | | |
| | 47 | B1 | α | α + γ | 0 | | 35 | | | | |
| | | B | α | α + γ | | 0 | | 25 | 20 | 340 | 32 | |
| | 48 | B1 | α | α + γ | 0 | | 30 | | | | |
| | | B | α | α + γ | | 0 | | 20 | 10 or less | 342 | 32 | ○ |
| | 49 | B1 | α | α | 0 | | 35 | | | | |
| | | B | α | α | | 0 | | 25 | 20 | 384 | 32 | ○ |
| | 50 | C1 | α | α | 0 | | 35 | | | | |
| | | C | α | α + β | | 0.2 | | 25 | 40 | | | |
| | 51 | C1 | α | α + β | 0.3 | | 30 | | | | |
| | | C | α | α + β | | 0.5 | | 30 | 30 | | | |
| | 52 | C1 | α | α + κ + γ | 0 | | 15 | | | | |
| | | C | α | α + κ + γ | | 0 | | 10 | 10 or less | | | |

TABLE 10

| | | Melt-solidified substance | Primary crystal | Metallic structure | Area ratio of β-phase (%) | | Mean gram size (μm) | Maximum corrosion depth (μm) | Tensile strength (N/mm²) | Elongation (%) | Melt solidification ability (semi-solid metal castability) |
|---|---|---|---|---|---|---|---|---|---|---|---|
| Embodiment | 53 | C1 | α | α + κ + γ | 0 | | 15 | | | | |
| | | C | α | α + κ + γ | | 0 | | 10 | 10 or less | | | |
| | 54 | C1 | α | α + κ + γ | 0 | | 20 | | | | |
| | | C | α | α + κ + γ | | 0 | | 15 | | | |
| | 55 | C1 | α | α + γ | 0 | | 25 | | | | |
| | | C | α | α + γ | | 0 | | 25 | 20 | | | |
| | 56 | C1 | α | α | 0 | | 15 | | | | |
| | | C | α | α | | 0 | | 20 | 20 | | | |
| | 57 | D1 | α | α + β | 0.5 | | 65 | | | | |
| | | D2 | α | α | 0 | | 35 | | | | |
| | | D | α | α + β | | 0.1 | | 30 | 40 | 320 | 32 | |
| | 58 | D1 | α | α + β | 0.3 | | 45 | | | | |
| | | D2 | α | α + β | 0.3 | | 30 | | | | |
| | | D | α | α + β | | 0.5 | | 25 | 50 | 332 | 34 | |
| | 59 | D1 | α | α + γ | 0 | | 35 | | | | |
| | | D2 | α | α + γ | 0 | | 25 | | | | |
| | | D | α | α + γ | | 0 | | 25 | 30 | 342 | 33 | |
| | 60 | D1 | α | α | 0 | | 35 | | | | |
| | | D2 | α | α | 0 | | 15 | | | | |
| | | D | α | α | | 0 | | 30 | 30 | 375 | 32 | |
| | 61 | D1 | α | α + κ + γ | 0 | | 80 | | | | |
| | | D2 | α | α + κ + γ | 0 | | 10 | | | | |
| | | D | α | α + κ + γ | | 0 | | 15 | 20 | 512 | 38 | |
| | 62 | E1 | α | α + κ + γ | 0 | | 15 | | | | |
| | | E | α | α + κ + γ | | 0 | | 20 | 20 | 501 | 34 | |
| | 63 | E1 | α | α + γ | 0 | | 30 | | | | |
| | | E | α | α + γ | | 0 | | 30 | 30 | 322 | 30 | |
| | 64 | F1 | α | α | 0 | | 70 | | | | |

TABLE 10-continued

| | Melt-solidified substance | Primary crystal | Metallic structure | Area ratio of β-phase (%) | Mean gram size (μm) | Maximum corrosion depth (μm) | Tensile strength (N/mm²) | Elongation (%) | Melt solidification ability (semi-solid metal castability) |
|---|---|---|---|---|---|---|---|---|---|
| | F | α | α | | 0 | 55 | 30 | | |
| 65 | F1 | α | α + κ + γ | 0 | 25 | | | | |
| | F | α | α + κ + γ | | 0 | 25 | 20 | | |
| 66 | G1 | α | α + κ + γ | 0 | 30 | | | | |
| | G | α | α + κ + γ | | 0 | 20 | 20 | | |
| 67 | G1 | α | α + γ | 0 | 55 | | | | |
| | G | α | α + γ | | 0 | 40 | 20 | | |

TABLE 11

| | | Melt-solidified substance | Primary crystal | Metallic structure | Area ratio of β-phase (%) | Mean gram size (μm) | Maximum corrosion depth (μm) | Tensile strength (N/mm²) | Elongation (%) | Melt solidification ability (semi-solid metal castability) |
|---|---|---|---|---|---|---|---|---|---|---|
| Comparative example | 101 | A1 | β | α + β | 6 | 450 | | | | |
| | | A | β | α + β | | 7 | 350 | 350 | | |
| | 102 | A1 | α | α + β | 0.3 | 600 | | | | |
| | | A | α | α + β | | 0.3 | 500 | 500 | 290 | 26 |
| | 103 | A1 | α | α + κ + γ | 0 | 1000 | | | | |
| | | A | α | α + κ + γ | | 0 | 600 | 70 | 445 | 28 | x |
| | 104 | A1 | α | α + κ + γ | 0 | 350 | | | | |
| | | A | α | α + κ + γ | | 0 | 350 | 70 | | |
| | 105 | A1 | β | α + β + γ | 25 | 600 | | | | |
| | | A | β | α + β + γ | | 25 | 400 | 350 | 434 | 18 |
| | 106 | A1 | α | α + γ + β | 0.5 | 600 | | | | |
| | | A | α | α + γ + β | | 0.5 | 350 | 70 | | |
| | 107 | A1 | β | α + β | 18 | 800 | | | | |
| | | A | β | α + β | | 20 | 500 | 450 | | |
| | 108 | A1 | α | α + β | 1.5 | 500 | | | | |
| | | A | α | α + β | | 2 | 350 | 550 | 350 | 16 |
| | 109 | A1 | α | α + κ + γ | 0 | 550 | | | | |
| | | A | α | α + κ + γ | | 0 | 350 | 100 | | |
| | 110 | A1 | α | α + γ + β | 0.3 | 600 | | | | |
| | | A | α | α + γ + β | | 1 | 350 | 310 | | |
| | 111 | B1 | β | α + β | 18 | 60 | | | | |
| | | B | β | α + β | | 20 | 400 | 800 | 302 | 22 |
| | 112 | B1 | α | α + β | 0.1 | 80 | | | | |
| | | B | α | α + β | | 0.3 | 350 | 550 | 294 | 28 | x |
| | 113 | B1 | α | α + κ + γ | 0 | 90 | | | | |
| | | B | α | α + κ + γ | | 0 | 350 | 180 | 453 | 29 |
| | 114 | B1 | α | α + κ + γ | 0 | 90 | | | | |
| | | B | α | α + κ + γ | | 0 | 500 | 60 | 452 | 30 |

45

TABLE 12

| | | Melt-solidified substance | Primary crystal | Metallic structure | Area ratio of β-phase (%) | Mean gram size (μm) | Maximum corrosion depth (μm) | Tensile strength (N/mm²) | Elongation (%) | Melt solidification ability (semi-solid metal castability) |
|---|---|---|---|---|---|---|---|---|---|---|
| Comparative example | 115 | B1 | β | α + β + γ | 20 | 80 | | | | |
| | | B | β | α + β + γ | | 25 | 350 | 300 | 442 | 20 | x |
| | 116 | B1 | α | α + γ | 0 | 80 | | | | |
| | | B | α | α + γ | | 0 | 400 | 210 | 302 | 20 | x |
| | 117 | B1 | α | α | 0 | 80 | | | | |
| | | B | α | α | | 0 | 600 | 80 | 326 | 18 |
| | 118 | C1 | β | α + β | 12 | 40 | | | | |
| | | C | β | α + β | | 20 | 350 | 800 | | |
| | 119 | C1 | α | α | 0 | 35 | | | | |
| | | C | α | α + β | | 0.2 | 600 | 650 | | |
| | 120 | C1 | α | α + κ + γ | 0 | 35 | | | | |
| | | C | α | α + κ + γ | | 0 | 500 | 60 | | |
| | 121 | C1 | α | α + γ | 0 | 30 | | | | |
| | | C | α | α + γ | | 0 | 350 | 180 | | |
| | 122 | C1 | α | α | 0 | 25 | | | | |

TABLE 12-continued

| Melt-solidified substance | Primary crystal | Metallic structure | Area ratio of β-phase (%) | Mean grain size (μm) | Maximum corrosion depth (μm) | Tensile strength (N/mm²) | Elongation (%) | Melt solidification ability (semi-solid metal castability) |
|---|---|---|---|---|---|---|---|---|
| C | α | α | 0 | | 600 | 90 | | |
| 123 D1 | α | α + β | 0.1 | 80 | | | | |
| D2 | α | α | 0 | 35 | | | | |
| D | α | α + β | 0.5 | | 600 | 600 | 275 | 15 |
| 124 D1 | α | α + κ + γ | 0 | 90 | | | | |
| D2 | α | α + κ + γ | 0 | 35 | | | | |
| D | α | α + κ + γ | 0 | | 600 | 120 | 438 | 22 |
| 125 D1 | α | α + γ | 0 | 80 | | | | |
| D2 | α | α + γ | 0 | 30 | | | | |
| D | α | α + γ | 0 | | 450 | 300 | 289 | 19 |
| 126 D1 | α | α | 0 | 80 | | | | |
| D2 | α | α | 0 | 25 | | | | |
| D | α | α | 0 | | 500 | 140 | 312 | 16 |
| 127 E1 | α | α + κ + γ | 0 | 90 | | | | |
| E | α | α + κ + γ | 0 | | 350 | 240 | 406 | 18 |
| 128 E1 | α | α + γ | 0 | 80 | | | | |
| E | α | α + γ | 0 | | 400 | 320 | 265 | 16 |

INDUSTRIAL APPLICABILITY

Since the strength, wear resistance, corrosion resistance and stability of the melt-solidified part such as welded part or the like can be improved considerably by refining the grains in the melt-solidified part and eliminating the defects thereby, the melt-solidified substances and the copper alloys for melt-solidification according to the invention can be used preferably as, for example, the following weld products, lining products, build-up welded products, thermal sprayed products or the parts or constructional materials thereof:

(a) Weld Products or the Parts or Component Material Thereof.

Equipment parts for shipping•chemical industry, condensate pipe for heat exchanger, cladding tube for undersea cable, electrode plate, gas pipe, caustic soda container, clad, water desalination equipment, oil cooler, distiller, water supply heater, water heater, water supply pipe, elbow, boiler, boiler water pipe, branching welding pipe, seawater pipe, seam-welded copper alloy pipe for heat exchanger, welded copper alloy pipe with grooved inside surface (including threaded inside surface), copper alloy clad steel pipe, resistance welding electrode, welding rod, welding wire, filler metal.

(b) Lining Products, Build-Up Welded Products, Thermal Sprayed Products or the Parts or Constructional Material Thereof.

Sliding parts for hydraulic pump, sliding parts for motor, cylinder block, piston shoe, bush, bush sleeve, thrust metal, repairing material for ship driving equipment, gear teeth, pump impeller, bearing, shaft, build-up welded part to prevent scoring in press mold, build-up welded steel for chemical plant and ship parts, rolling piston, parts for footing•basic pile joining.

The invention claimed is:

1. A melt-solidified substance, including a base material, and a melt-solidified part formed on the base material by welding, thermal spraying or fusing, wherein the melt-solidified part has an alloy composition comprising:

Zr, 0.0005 to 0.05 mass %;

P, 0.01 to 0.35 mass %; and

Cu, a remainder in mass %, the alloy composition satisfying a relationship F1=[P]/[Zr]=0.3 to 200, wherein content of each element in F1 is expressed as mass %, and the alloy composition having a crystal structure, in which mean grain size is 300 μm or less in a macrostructure after melt-solidification.

2. The melt-solidified substance according to claim 1, wherein the alloy composition of the melt-solidified parts further comprises Zn, 0.01 to 38 mass %.

3. The melt-solidified substance according to claim 2, wherein the alloy composition of the melt-solidified parts further satisfies a relationship F2=[Cu]−3[P]−3.5[Si]−0.5[Sn]−1.8[Al]−0.5([Sb]+[As]+[Mg])+[Mn]+0.5([Pb]+[Bi]+[Se]+[Te])=60 to 97 wherein the content of each element included in relationship F2 is expressed as mass %, and for each element not included in relationship F2, [a]=0.

4. The melt-solidified substance according to claim 2, wherein the alloy composition of the melt-solidified parts further satisfies a relationship F3=[Zn]+3[Sn]+5[Si]+3[Al]=10 to 45 wherein the content of each element included in relationship F3 is expressed as mass %, and for each element not included in relationship F3, [a]=0.

5. The melt-solidified substance according to claim 2, wherein the alloy composition of the melt-solidified parts further satisfies relationships F4=([Zn]+3[ Sn]+5[ Si]+3[Al])/[Zr]=300 to 35000 and F5=([Zn]+3[ Sn]+5[ Si]+3[Al])/[P]=60 to 3000, wherein content of each element included in relationship F4 and F5 is expressed as mass %, and for each element not included in relationship F4 and F5, [a]=0.

6. A copper alloy comprising the melt-solidified substance according to claim 2, wherein the copper alloy includes the melt-solidified parts wherein a peritectic reaction occurs during melt-solidification in the melt-solidified parts.

7. The melt-solidified substance according to claim 2, wherein the melt-solidified parts have a crystal structure in which a dendrite network is divided and a two-dimensional shape of the grains or of α-phase grains is circular, substantially circular, oval, cross-like, acicular, or polygonal.

8. The melt-solidified substance according claim 2, wherein 0.0005 to 0.039 mass % of Zr, that is not in the form of an oxide or a sulfide or an oxide and a sulfide, is included in the melt-solidified part under a condition that satisfies [P]/[Zr]=0.5 to 150 wherein content of each element in the condition is expressed as mass %.

9. The melt-solidified substance according to claim 2, wherein, when Fe, or Ni, or Fe and Ni, are inevitably included in the melt-solidified parts as impurities, the content of Fe or Ni does not exceed 0.3 mass % when either Fe or Ni is included as impurities, and the content of Fe and Ni does not exceed 0.4 mass % when both Fe and Ni are included as impurities.

10. The melt-solidified substance according to claim 2, wherein the melt-solidified parts are welded areas of a pipe that are melt-solidified by welding; and
wherein the welding pipe is manufactured by bending a copper alloy plate base material to be welded so that both ends of the copper alloy plate material to be welded are butted so as to form a cylinder and then both ends are welded together.

11. The melt-solidified substance according to claim 2, wherein the melt-solidified substance is a welded structure comprising more than one copper alloy weld material and weld zones of each material are weld deposits.

12. The melt-solidified substance according to claim 2, wherein the melt-solidified part is a thermal sprayed structure that is a copper alloy layer sprayed on a surface of a mother material by using a copper alloy spraying material.

13. The melt-solidified substance according to claim 2, wherein the melt-solidified substance forms an article selected from the group consisting of:
a condensate pipe in a heat exchanger, a gas pipe, a water heater, a water supply pipe, a boiler water pipe, a branching welding pipe, a seawater pipe, a seam-welded copper alloy pipe for a heat exchanger, a welded copper alloy pipe with grooved inside surface that includes a threaded inside surface, a copper alloy clad steel pipe.

14. The melt-solidified substance according to claim 2, wherein the melt-solidified parts have an alloy composition further containing one or more elements selected from Sb, 0.02 to 0.15 mass %; and As, 0.02 to 0.15 mass %; and Mg, 0.001 to 0.2 mass %; and Mn, 0.01 to 4 mass %.

15. The melt-solidified substance according to claim 14, wherein the alloy composition of the melt-solidified parts further satisfies a relationship F2=[Cu]−3[P]−3.5[Si]−0.5[Sn]−1.8[Al]−0.5([Sb]+[As]+[Mg])+[Mn]+0.5([Pb]+[Bi]+[Se]+[Te])=60 to 97 wherein the content of each element included in relationship F2 is expressed as mass %, and for each element not included in relationship F2, [a]=0.

16. The melt-solidified substance according to claim 14, wherein the alloy composition of the melt-solidified parts further satisfies a relationship F3=[Zn]+3[Sn]+5[Si]+3[Al]=10 to 45 wherein the content of each element included in relationship F3 is expressed as mass %, and for each element not included in relationship F3, [a]=0.

17. The melt-solidified substance according claim 14, wherein 0.0005 to 0.039 mass % of Zr, that is not in the form of an oxide or a sulfide or an oxide and a sulfide, is included in the melt-solidified part under a condition that satisfies [P]/[Zr]=0.5 to 150 wherein content of each element in the condition is expressed as mass %.

18. The melt-solidified substance according to claim 14, wherein the melt-solidified parts are welded areas of a pipe that are melt-solidified by welding; and
wherein the welding pipe is manufactured by bending a copper alloy plate base material to be welded so that both ends of the copper alloy plate material to be welded are butted so as to form a cylinder and then both ends are welded together.

19. The melt-solidified substance according to claim 14, wherein the melt-solidified substance is a welded structure comprising more than one copper alloy weld material and weld zones of each material are weld deposits.

20. The melt-solidified substance according to claim 14, wherein the melt-solidified part is a thermal sprayed structure that is a copper alloy layer sprayed on a surface of a mother material by using a copper alloy spraying material.

21. The melt-solidified substance according to claim 14, wherein the melt-solidified part is a build-up welded structure that is a copper alloy layer build-up welded on a surface of a mother material by using a copper alloy filler metal.

22. The melt-solidified substance according to claim 14, wherein the melt-solidified substance forms an article selected from the group consisting of:
a condensate pipe in a heat exchanger, a gas pipe, a water heater, a water supply pipe, a boiler water pipe, a branching welding pipe, a seawater pipe, a seam-welded copper alloy pipe for a heat exchanger, a welded copper alloy pipe with grooved inside surface that includes a threaded inside surface, a copper alloy clad steel pipe.

23. The melt-solidified substance according to claim 2, wherein the alloy composition of the melt-solidified parts further comprises one or more elements selected from Sn, 0.01 to 15 mass %; and Si, 0.01 to 5 mass %; and Al, 0.01 to 9 mass %.

24. The melt-solidified substance according to claim 23, wherein the alloy composition of the melt-solidified parts further satisfies a relationship F2=[Cu]−3[P]−3.5[Si]−0.5[Sn]−1.8[Al]−0.5([Sb]+[As]+[Mg])+[Mn]+0.5([Pb]+[Bi]+[Se]+[Te])=60 to 97 wherein the content of each element included in relationship F2 is expressed as mass %, and for each element not included in relationship F2, [a]=0.

25. The melt-solidified substance according to claim 23, wherein the alloy composition of the melt-solidified parts further satisfies a relationship F3=[Zn]+3[Sn]+5[Si]+3[Al]=10 to 45 wherein the content of each element included in relationship F3 is expressed as mass %, and for each element not included in relationship F3, [a]=0.

26. The melt-solidified substance according to claim 23, wherein the alloy composition of the melt-solidified parts further satisfies relationships F4=([Zn]+3[Sn]+5[Si]+3[Al])/[Zr]=300 to 35000 and F5=([Zn]+3[Sn]+5[Si]+3[Al])/[P]=60 to 3000, wherein content of each element included in relationship F4 and F5 is expressed as mass %, and for each element not included in relationship F4 and F5, [a]=0.

27. A copper alloy comprising the melt-solidified substance according to claim 23, wherein the copper alloy includes the melt-solidified parts wherein a peritectic reaction occurs during melt-solidification in the melt-solidified parts.

28. The melt-solidified substance according to claim 23, wherein the melt-solidified parts have a crystal structure in which a dendrite network is divided and a two-dimensional shape of the grains or of α-phase grains is circular, substantially circular, oval, cross-like, acicular, or polygonal.

29. The melt-solidified substance according claim 23, wherein 0.0005 to 0.039 mass % of Zr, that is not in the form of an oxide or a sulfide or an oxide and a sulfide, is included in the melt-solidified part under a condition that satisfies [P]/[Zr]=0.5 to 150 wherein content of each element in the condition is expressed as mass %.

30. The melt-solidified substance according to claim 23, wherein, when Fe, or Ni, or Fe and Ni, are inevitably included in the melt-solidified parts as impurities, the content of Fe or Ni does not exceed 0.3 mass % when either Fe or Ni is included as impurities, and the content of Fe and Ni does not exceed 0.4 mass % when both Fe and Ni are included as impurities.

31. The melt-solidified substance according to claim 23, wherein the melt-solidified parts are welded areas of a pipe that are melt-solidified by welding; and wherein the welding pipe is manufactured by bending a copper alloy plate base material to be welded so that both ends of the copper alloy plate material to be welded are butted so as to form a cylinder and then both ends are welded together.

32. The melt-solidified substance according to claim 23, wherein the melt-solidified substance is a welded structure comprising more than one copper alloy weld material and weld zones of each material are weld deposits.

33. The melt-solidified substance according to claim 23, wherein the melt-solidified part is a thermal sprayed structure that is a copper alloy layer sprayed on a surface of a mother material by using a copper alloy spraying material.

34. The melt-solidified substance according to claim 23, wherein the melt-solidified part is a build-up welded structure that is a copper alloy layer build-up welded on a surface of a mother material by using a copper alloy filler metal.

35. The melt-solidified substance according to claim 23, wherein the melt-solidified substance forms an article selected from the group consisting of:
a condensate pipe in a heat exchanger, a gas pipe, a water supply pipe, a boiler water pipe, a branching welding pipe, a seawater pipe, a seam-welded copper alloy pipe for a heat exchanger, a welded copper alloy pipe with grooved inside surface that includes a threaded inside surface, a copper alloy clad steel pipe.

36. The melt-solidified substance according to claim 23, wherein the alloy composition of the melt-solidified parts further comprises one or more elements selected from Sb, 0.02 to 0.15 mass %; and As, 0.02 to 0.15 mass %; and Mg, 0.001 to 0.2 mass %; and Mn, 0.01 to 4 mass %.

37. The melt-solidified substance according to claim 36, wherein the melt-solidified parts have an alloy composition further containing one or more elements selected from Pb, 0.005 to 15 mass %; and Bi, 0.005 to 15 mass %; and Se, 0.01 to 2 mass %; and Te, 0.03 to 1.5 mass %.

38. The melt-solidified substance according to claim 37, wherein the alloy composition of the melt-solidified parts further satisfies a relationship F2=[Cu]−3[P]−3.5[Si]−0.5[Sn]−1.8[Al]−0.5([Sb]+[As]+[Mg])+[Mn]+0.5([Pb]+[Bi]+[Se]+[Te])=60 to 97 wherein the content of each element included in relationship F2 is expressed as mass %, and for each element not included in relationship F2, [a]=0.

39. The melt-solidified substance according to claim 37, wherein the alloy composition of the melt-solidified parts further satisfies a relationship F3=[Zn]+3[Sn]+5[Si]+3[Al]=10 to 45 wherein the content of each element included in relationship F3 is expressed as mass %, and for each element not included in relationship F3, [a]=0.

40. The melt-solidified substance according to claim 36, wherein the alloy composition of the melt-solidified parts further satisfies relationships F4=([Zn]+3[Sn]+5[Si]+3[Al])/[Zr]=300 to 35000 and F5=([Zn]+3[Sn]+5[Si]+3[Al])/[P]=60 to 3000, wherein content of each element included in relationship F4 and F5 is expressed as mass %, and for each element not included in relationship F4 and F5, [a]=0.

41. The melt-solidified substance according to claim 37, wherein the melt-solidified parts have a crystal structure in which a dendrite network is divided and a two-dimensional shape of the grains or of α-phase grains is circular, substantially circular, oval, cross-like, acicular, or polygonal.

42. The melt-solidified substance according claim 37, wherein 0.0005 to 0.039 mass % of Zr, that is not in the form of an oxide or a sulfide or an oxide and a sulfide, is included in the melt-solidified part under a condition that satisfies [P]/[Zr]=0.5 to 150 wherein content of each element in the condition is expressed as mass %.

43. The melt-solidified substance according to claim 37, wherein, when Fe, or Ni, or Fe and Ni, are inevitably included in the melt-solidified parts as impurities, the content of Fe or Ni does not exceed 0.3 mass % when either Fe or Ni is included as impurities, and the content of Fe and Ni does not exceed 0.4 mass % when both Fe and Ni are included as impurities.

44. The melt-solidified substance according to claim 37, wherein the melt-solidified parts are welded areas of a pipe that are melt-solidified by welding; and
wherein the welding pipe is manufactured by bending a copper alloy plate base material to be welded so that both ends of the copper alloy plate material to be welded are butted so as to form a cylinder and then both ends are welded together.

45. The melt-solidified substance according to claim 37, wherein the melt-solidified substance is a welded structure comprising more than one copper alloy weld material and weld zones of each material are weld deposits.

46. The melt-solidified substance according to claim 37, wherein the melt-solidified part is a thermal sprayed structure that is a copper alloy layer sprayed on a surface of a mother material by using a copper alloy spraying material.

47. The melt-solidified substance according to claim 37, wherein the melt-solidified substance forms an article selected from the group consisting of:
a condensate pipe in a heat exchanger, a gas pipe, a water heater, a water supply pipe, a boiler water pipe, a branching welding pipe, a seawater pipe, a seam-welded copper alloy pipe for a heat exchanger, a welded copper alloy pipe with grooved inside surface that includes a threaded inside surface, a copper alloy clad steel pipe.

48. The melt-solidified substance according to claim 36, wherein the alloy composition of the melt-solidified parts further satisfies a relationship F2=[Cu]−3[P]−3.5[Si]−0.5[Sn]−1.8[Al]−0.5([Sb]+[As]+[Mg])+[Mn]+0.5([Pb]+[Bi]+[Se]+[Te])=60 to 97 wherein the content of each element included in relationship F2 is expressed as mass %, and for each element not included in relationship F2, [a]=0.

49. The melt-solidified substance according to claim 36, wherein the alloy composition of the melt-solidified parts further satisfies a relationship F3=[Zn]+3[Sn]+5[Si]+3[Al]=10 to 45 wherein the content of each element included in relationship F3 is expressed as mass %, and for each element not included in relationship F3, [a]=0.

50. The melt-solidified substance according to claim 37, wherein the alloy composition of the melt-solidified parts further satisfies relationships F4=([Zn]+3[Sn]+5[Si]+3[Al])/[Zr]=300 to 35000 and F5=([Zn]+3[Sn]+5[Si]+3[Al])/[P]=60 to 3000, wherein content of each element included in relationship F4 and F5 is expressed as mass %, and for each element not included in relationship F4 and F5, [a]=0.

51. A copper alloy comprising the melt-solidified substance according to claim 36, wherein the copper alloy includes the melt-solidified parts wherein a peritectic reaction occurs during melt-solidification in the melt-solidified parts.

52. The melt-solidified substance according to claim 36, wherein the melt-solidified parts have a crystal structure in which a dendrite network is divided and a two-dimensional shape of the grains of the α-phase grains is circular, substantially circular, oval, cross-like, acicular, or polygonal.

53. The melt-solidified substance according claim 36, wherein 0.0005 to 0.039 mass % of Zr, that is not in the form of an oxide or a sulfide or an oxide and a sulfide, is included in the melt-solidified part under a condition that satisfies [P]/[Zr]=0.5 to 150 wherein content of each element in the condition is expressed as mass %.

54. The melt-solidified substance according to claim 36, wherein, when Fe, or Ni, or Fe and Ni, are inevitably included in the melt-solidified parts as impurities, the content of Fe or Ni does not exceed 0.3 mass % when either Fe or Ni is included as impurities, and the content of Fe and Ni does not exceed 0.4 mass % when both Fe and Ni are included as impurities.

55. The melt-solidified substance according to claim 36, wherein the melt-solidified parts are welded areas of a pipe that are melt-solidified by welding; and
wherein the welding pipe is manufactured by bending a copper alloy plate base material to be welded so that both ends of the copper alloy plate material to be welded are butted so as to form a cylinder and then both ends are welded together.

56. The melt-solidified substance according to claim 36, wherein the melt-solidified substance is a welded structure comprising more than one copper alloy weld material and weld zones of each material are weld deposits.

57. The melt-solidified substance according to claim 36, wherein the melt-solidified part is a thermal sprayed structure that is a copper alloy layer sprayed on a surface of a mother material by using a copper alloy spraying material.

58. The melt-solidified substance according to claim 36, wherein the melt-solidified part is a build-up welded structure that is a copper alloy layer build-up welded on a surface of a mother material by using a copper alloy filler metal.

59. The melt-solidified substance according to claim 36, wherein the melt-solidified substance forms an article selected from the group consisting of:
a condensate pipe in a heat exchanger, a gas pipe, a water supply pipe, a boiler water pipe, a branching welding pipe, a seawater pipe, a seam-welded copper alloy pipe for a heat exchanger, a welded copper alloy pipe with grooved inside surface that includes a threaded inside surface, a copper alloy clad steel pipe.

60. The melt-solidified substance according to claim 23, wherein the alloy composition of the melt-solidified parts further comprises one or more elements selected from Pb, 0.005 to 15 mass %; and Bi, 0.005 to 15 mass %; and Se, 0.01 to 2 mass %; and Te, 0.03 to 1.5 mass %.

61. The melt-solidified substance according to claim 60, wherein the alloy composition of the melt-solidified parts further satisfies a relationship F2=[Cu]−3[P]−3.5[Si]−0.5[Sn]−1.8[Al]−0.5([Sb]+[As]+[Mg])+[Mn]+0.5([Pb]+[Bi]+[Se]+[Te])=60 to 97 wherein the content of each element included in relationship F2 is expressed as mass %, and for each element not included in relationship F2, [a]=0.

62. The melt-solidified substance according to claim 60, wherein the alloy composition of the melt-solidified parts further satisfies a relationship F3=[Zn]+3[Sn]+5[Si]+3[Al]=10 to 45 wherein the content of each element included in relationship F3 is expressed as mass %, and for each element not included in relationship F3, [a]=0.

63. The melt-solidified substance according claim 60, wherein 0.0005 to 0.039 mass % of Zr, that is not in the form of an oxide or a sulfide or an oxide and a sulfide, is included in the melt-solidified part under a condition that satisfies [P]/[Zr]=0.5 to 150 wherein content of each element in the condition is expressed as mass %.

64. The melt-solidified substance according to claim 60, wherein the melt-solidified substance is a welded structure comprising more than one copper alloy weld material and weld zones of each material are weld deposits.

65. The melt-solidified substance according to claim 60, wherein the melt-solidified substance forms an article selected from the group consisting of:
a condensate pipe in a heat exchanger, a gas pipe, a water supply pipe, a boiler water pipe, a branching welding pipe, a seawater pipe, a seam-welded copper alloy pipe for a heat exchanger, a welded copper alloy pipe with grooved inside surface that includes a threaded inside surface, a copper alloy clad steel pipe.

66. The melt-solidified substance according to claim 23, wherein the alloy composition of the melt-solidified parts further comprises one or more elements selected from Co, 0.005 to 0.3 mass %; and Cr, 0.005 to 0.3 mass %; and C, 0.00005 to 0.02 mass %; and Ti, 0.005 to 0.3 mass %; and B, 0.0002 to 0.05 mass %; and a rare earth element, 0.01 to 0.5 mass %.

67. The melt-solidified substance according to claim 66, wherein the alloy composition of the melt-solidified parts further satisfies a relationship F2=[Cu]−3[P]−3.5[Si]−0.5[Sn]−1.8[Al]−0.5([Sb]+[As]+[Mg])+[Mn]+0.5([Pb]+[Bi]+[Se]+[Te])=60 to 97 wherein the content of each element included in relationship F2 is expressed as mass %, and for each element not included in relationship F2, [a]=0.

68. The melt-solidified substance according to claim 66, wherein the alloy composition of the melt-solidified parts further satisfies a relationship F3=[Zn]+3[Sn]+5[Si]+3[Al]=10 to 45 wherein the content of each element included in relationship F3 is expressed as mass %, and for each element not included in relationship F3, [a]=0.

69. The melt-solidified substance according claim 66, wherein 0.0005 to 0.039 mass % of Zr, that is not in the form of an oxide or a sulfide or an oxide and a sulfide, is included in the melt-solidified part under a condition that satisfies [P]/[Zr]=0.5 to 150 wherein content of each element in the condition is expressed as mass %.

70. The melt-solidified substance according to claim 1, wherein the melt-solidified parts have a crystal structure in which a dendrite network is divided and a two-dimensional shape of the grains or of α-phase grains is circular, substantially circular, oval, cross-like, acicular, or polygonal.

71. The melt-solidified substance according claim 1, wherein 0.0005 to 0.039 mass % of Zr, that is not in the form of an oxide or a sulfide or an oxide and a sulfide, is included in the melt-solidified part under a condition that satisfies [P]/[Zr]=0.5 to 150 wherein content of each element in the condition is expressed as mass %.

72. The melt-solidified substance according to claim 1, wherein, when Fe, or Ni, or Fe and Ni, are inevitably included in the melt-solidified parts as impurities, the content of Fe or Ni does not exceed 0.3 mass % when either Fe or Ni is included as impurities, and the content of Fe and Ni does not exceed 0.4 mass % when both Fe and Ni are included as impurities.

73. The melt-solidified substance according to claim 1, wherein the melt-solidified parts are welded areas of a pipe that, are melt-solidified by welding; and
wherein the welding pipe is manufactured by bending a copper alloy plate material to be welded so that both ends of the copper alloy plate material to be welded are butted so as to form a cylinder and then both ends are welded together.

74. The melt-solidified substance according to claim 1, wherein the melt-solidified substance is a welded structure comprising more than one copper alloy weld material and weld zones of each material are weld deposits.

75. The melt-solidified substance according to claim 74, wherein portions to be welded are adhered to one another by welding using a copper alloy filler metal.

76. The melt-solidified substance according to claim 1, wherein the melt-solidified part is a thermal sprayed structure that is a copper alloy layer sprayed on a surface of a mother material by using a copper alloy spraying material.

77. The melt-solidified substance according to claim 1, wherein the melt-solidified part is a build-up welded structure that is a copper alloy layer build-up welded on a surface of a mother material by using a copper alloy filler metal.

78. The melt-solidified substance according to claim 1, wherein the melt-solidified substance forms an article selected from the group consisting of:
a condensate pipe in a heat exchanger, a gas pipe, a water supply pipe, a boiler water pipe, a branching welding pipe, a seawater pipe, a seam-welded copper alloy pipe for a heat exchanger, a welded copper alloy pipe with grooved inside surface that includes a threaded inside surface, a copper alloy clad steel pipe.

79. The melt-solidified substance according to claim 1, wherein the melt-solidified parts have an alloy composition further containing one or more elements selected from Sn, 0.01 to 15 mass %; and Si, 0.01 to 5 mass %; and Al, 0.01 to 9 mass %.

80. The melt-solidified substance according to claim 79, wherein the melt-solidified parts have an alloy composition further containing one or more elements selected from Pb, 0.005 to 15 mass %; and Bi, 0.005 to 15 mass %; and Se, 0.01 to 2 mass %; and Te, 0.03 to 1.5 mass %.

81. The melt-solidified substance according to claim 80, wherein the alloy composition of the melt-solidified parts further satisfies a relationship $F2=[Cu]-3[P]-3.5[Si]-0.5[Sn]-1.8[Al]-0.5([Sb]+[As]+[Mg])+[Mn]+0.5([Pb]+[Bi]+[Se]+[Te])=60$ to $97$ wherein the content of each element included in relationship F2 is expressed as mass %, and for each element not included in relationship F2, $[a]=0$.

82. The melt-solidified substance according to claim 80, wherein the alloy composition of the melt-solidified parts further satisfies a relationship $F3=[Zn]+3[Sn]+5[Si]+3[Al]=10$ to $45$ wherein the content of each element included in relationship F3 is expressed as mass %, and for each element not included in relationship F3, $[a]=0$.

83. The melt-solidified substance according to claim 80, wherein 0.0005 to 0.039 mass % of Zr, that is not in the form of an oxide or a sulfide or an oxide and a sulfide, is included in the melt-solidified part under a condition that satisfies $[P]/[Zr]=0.5$ to $150$ wherein content of each element in the condition is expressed as mass %.

84. The melt-solidified substance according to claim 80, wherein the melt-solidified substance is a welded structure comprising more than one copper alloy weld material and weld zones of each material are weld deposits.

85. The melt-solidified substance according to claim 80, wherein the melt-solidified substance forms an article selected from the group consisting of:
a condensate pipe in a heat exchanger, a gas pipe, a water supply pipe, a boiler water pipe, a branching welding pipe, a seawater pipe, a seam-welded copper alloy pipe for a heat exchanger, a welded copper alloy pipe with grooved inside surface that includes a threaded inside surface, a copper alloy clad steel pipe.

86. The melt-solidified substance according to claim 79, wherein the melt-solidified parts have an alloy composition further containing one or more elements selected from Co, 0.005 to 0.3 mass %; and Cr, 0.005 to 0.3 mass %; and C, 0.00005 to 0.02 mass %; and Ti, 0.005 to 0.3 mass %; and B, 0.0002 to 0.05 mass %; and a rare earth element, 0.01 to 0.5 mass %.

87. The melt-solidified substance according to claim 86, wherein the alloy composition of the melt-solidified parts further satisfies a relationship $F2=[Cu]-3[P]-3.5[Si]-0.5[Sn]-1.8[Al]-0.5([Sb]+[As]+[Mg])+[Mn]+0.5([Pb]+[Bi]+[Se]+[Te])=60$ to $97$ wherein the content of each element included in relationship F2 is expressed as mass %, and for each element not included in relationship F2, $[a]=0$.

88. The melt-solidified substance according to claim 86, wherein the alloy composition of the melt-solidified parts further satisfies a relationship $F3=[Zn]+3[Sn]+5[Si]+3[Al]=10$ to $45$ wherein the content of each element included in relationship F3 is expressed as mass %, and for each element not included in relationship F3, $[a]=0$.

89. The melt-solidified substance according claim 86, wherein 0.0005 to 0.039 mass % of Zr, that is not in the form of an oxide or a sulfide or an oxide and a sulfide, is included in the melt-solidified part under a condition that satisfies $[P]/[Zr]=0.5$ to $150$ wherein content of each element in the condition is expressed as mass %.

90. The melt-solidified substance according to claim 86, wherein the melt-solidified substance is a welded structure comprising more than one copper alloy weld material and weld zones of each material are weld deposits.

91. The melt-solidified substance according to claim 79, wherein the alloy composition of the melt-solidified parts further satisfies a relationship $F2=[Cu]-3[P]-3.5[Si]-0.5[Sn]-1.8[Al]-0.5([Sb]+[As]+[Mg])+[Mn]+0.5([Pb]+[Bi]+[Se]+[Te])=60$ to $97$ wherein the content of each element included in relationship F2 is expressed as mass %, and for each element not included in relationship F2, $[a]=0$.

92. The melt-solidified substance according to claim 79, wherein the alloy composition of the melt-solidified parts further satisfies a relationship $F3=[Zn]+3[Sn]+5[Si]+3[Al]=10$ to $45$ wherein the content of each element included in relationship F3 is expressed as mass %, and for each element not included in relationship F3, $[a]=0$.

93. The melt-solidified substance according to claim 79, wherein the alloy composition of the melt-solidified parts further satisfies relationships $F4=([Zn]+3[Sn]+5[Si]+3[Al])/[Zr]=300$ to $35000$ and $F5=([Zn]+3[Sn]+5[Si]+3[Al])/[P]=60$ to $3000$, wherein content of each element included in relationship F4 and F5 is expressed as mass %, and for each element not included in relationship F4 and F5, $[a]=0$.

94. A copper alloy comprising the melt-solidified substance according to claim 79, wherein the copper alloy includes the melt-solidified parts wherein a peritectic reaction occurs during melt-solidification in the melt-solidified parts.

95. The melt-solidified substance according to claim 79, wherein the melt-solidified parts have a crystal structure in which a dendrite network is divided and a two-dimensional shape of the grains of the α-phase grains is circular, substantially circular, oval, cross-like, acicular, or polygonal.

96. The melt-solidified substance according claim 79, wherein 0.0005 to 0.039 mass % of Zr, that is not in the form of an oxide or a sulfide or an oxide and a sulfide, is included in the melt-solidified part under a condition that satisfies $[P]/[Zr]=0.5$ to $150$ wherein content of each element in the condition is expressed as mass %.

97. The melt-solidified substance according to claim 79, wherein, when Fe, or Ni, or Fe and Ni, are inevitably included in the melt-solidified parts as impurities, the content of Fe or Ni does not exceed 0.3 mass % when either Fe or Ni is included as impurities, and the content of Fe and Ni does not exceed 0.4 mass % when both Fe and Ni are included as impurities.

98. The melt-solidified substance according to claim 79, wherein the melt-solidified parts are welded areas of a pipe that are melt-solidified by welding; and
   wherein the welding pipe is manufactured by bending a copper alloy plate base material to be welded so that both ends of the copper alloy plate material to be welded are butted so as to form a cylinder and then both ends are welded together.

99. The melt-solidified substance according to claim 79, wherein the melt-solidified substance is a welded structure comprising more than one copper alloy weld material and weld zones of each material are weld deposits.

100. The melt-solidified substance according to claim 79, wherein the melt-solidified part is a thermal sprayed structure that is a copper alloy layer sprayed on a surface of a mother material by using a copper alloy spraying material.

101. The melt-solidified substance according to claim 79, wherein the melt-solidified part is a build-up welded structure that is a copper alloy layer build-up welded on a surface of a mother material by using a copper alloy filler metal.

102. The melt-solidified substance according to claim 79, wherein the melt-solidified substance forms an article selected from the group consisting of:
   a condensate pipe in a heat exchanger, a gas pipe, a water supply pipe, a boiler water pipe, a branching welding pipe, a seawater pipe, a seam-welded copper alloy pipe for a heat exchanger, a welded copper alloy pipe with grooved inside surface that includes a threaded inside surface, a copper alloy clad steel pipe.

103. The melt-solidified substance according to claim 1, wherein the melt-solidified substance forms a welded structure, a fused structure, or a thermally sprayed layer structure.

104. The melt-solidified substance according to claim 1, wherein the melt-solidified substance forms an article selected from the group consisting of a branching welding pipe, a seawater pipe, a seam-welded copper alloy pipe for a heat exchanger.

105. A melt-solidified substance including a base material and a melt-solidified part formed on the base material by welding,
   wherein the melt-solidified parts have an alloy composition comprising:
   Zr, 0.0005 to 0.05 mass %;
   P, 0.01 to 0.35 mass %; and
   Cu, a remainder in mass %, and are satisfying a relationship F1=[P]/[Zr]=0.3 to 200, wherein content of each element in F1 is expressed as mass %, and the alloy composition has a crystal structure, in which mean grain size is 300 μm or less in a macrostructure after melt-solidification, and wherein the melt-solidified substance is a welded structure comprising more than one copper alloy weld material and weld zones of each copper alloy weld material are weld deposits, and wherein the melt-solidified parts have a crystal structure in which a dendrite network is divided and a two-dimensional shape of the grains or of α-phase grains is circular, substantially circular, oval, cross-like, acicular, or polygonal.

106. A melt-solidified substance including a base material and a melt-solidified part formed on the base material by welding, thermal spraying or fusing, wherein the melt-solidified parts have an alloy composition comprising:
   Zr, 0.0005 to 0.05 mass %;
   P, 0.01 to 0.35 mass %;
   Zn, 0.01 to 38 mass %;
   one or more elements selected from the group consisting of Sn, 0.01 to 15 mass %, Si, 0.01 to 5 mass %, and Al, 0.01 to 9 mass %; and
   Cu, a remainder in mass %, and are satisfying a relationship F1=[P]/[Zr]=0.3 to 200, F2=[Cu]−3[P]−3.5[Si]−0.5[Sn]−1.8[Al]−0.5([Sb]+[As]+[Mg])+[Mn]+0.5([Pb]+[Bi]+[Se]+[Te])=60 to 97, F3=[Zn]+3[Sn]+5[Si]+3[Al]=10 to 45, F4=([Zn]+3[Sn]+5[Si]+3[Al])/[Zr]=300 to 35000, and F5=([Zn]+3[Sn]+5[Si]+3[Al])/[P]=60 to 3000, wherein content of each element in F1 to F5 is expressed as mass %, and the alloy composition has a metal structure comprising alpha phase and at least one of the following additional phases selected from the group consisting of beta phase of less than 10% in area ratio, kappa phase, gamma phase and delta phase, in which mean grain size is 300 μm or less in a macrostructure after melt-solidification.

107. The melt-solidified substance according to claim 106, wherein the alloy composition of the melt-solidified parts further comprises one or more elements selected from the group consisting of Sb, 0.02 to 0.15 mass %; As, 0.02 to 0.15 mass %; Mg, 0.001 to 0.2 mass %; and Mn, 0.01 to 4 mass %.

108. The melt-solidified substance according to claim 106, wherein the alloy composition of the melt-solidified parts further comprises one or more elements selected from the group consisting of Pb, 0.005 to 15 mass %; Bi, 0.005 to 15 mass %; Se, 0.01 to 2 mass %; and Te, 0.03 to 1.5 mass %.

109. The melt-solidified substance according to claim 108, wherein the alloy composition of the melt-solidified parts further comprises one or more elements selected from the group consisting of Sb, 0.02 to 0.15 mass %; As, 0.02 to 0.15 mass %; Mg, 0.001 to 0.2 mass %; and Mn, 0.01 to 4 mass %.

110. A welded structure comprising at least two copper materials joined together by a weld, wherein the weld comprises a melt-solidified substance including melt-solidified parts, wherein the melt-solidified parts have an alloy composition comprising:
   Zr, 0.0005 to 0.05 mass %;
   P, 0.01 to 0.35 mass %; and
   Cu, a remainder in mass %, and are satisfying a relationship F1=[P]/[Zr]=0.3 to 200 wherein content of each element in F1 is expressed as mass %, and the alloy composition has a crystal structure, in which mean grain size is 300 μm or less in a macrostructure after melt-solidification.

111. A thermal sprayed structure comprising at least one sprayed copper alloy layer disposed on a base material, wherein the at least one sprayed copper layer comprises a melt-solidified substance including melt-solidified parts, wherein the melt-solidified parts have an alloy composition comprising:
   Zr, 0.0005 to 0.05 mass %;
   P, 0.01 to 0.35 mass %; and
   Cu, a remainder in mass %, and are satisfying a relationship F1=[P]/[Zr]=0.3 to 200 wherein content of each element in F1 is expressed as mass %, and the alloy composition has a crystal structure, in which mean grain size is 300 μm or less in a macrostructure after melt-solidification.

112. A built-up welded structure comprising a copper alloy filler material disposed on a surface of a base material and welded to the surface by a built-up weld, wherein the built-up weld comprises a melt-solidified substance including melt-solidified parts, wherein the melt-solidified parts have an alloy composition comprising:
   Zr, 0.0005 to 0.05 mass %;
   P, 0.01 to 0.35 mass %; and
   Cu, a remainder in mass %, and are satisfying a relationship F1=[P]/[Zr]=0.3 to 200 wherein content of each element in F1 is expressed as mass %, and the alloy composition has a crystal structure, in which mean grain size is 300 μm or less in a macrostructure after melt-solidification.

113. A melt-solidified substance including a base material and a melt-solidified part formed on the base material by welding, thermal spraying or fusing,
- wherein the melt-solidified parts have an alloy composition comprising:
- Zr, 0.0005 to 0.05 mass %;
- P, 0.01 to 0.35 mass %;
- one or more elements selected from Sn, 0.01 to 15 mass %; and Si, 0.01 to 5 mass %; and Al, 0.01 to 9 mass %; Sb, 0.02 to 0.15 mass %; and As, 0.02 to 0.15 mass %; and Mg, 0.001 to 0.2 mass %; Mn, 0.01 to 4 mass %; Pb, 0.005 to 15 mass %; and Bi, 0.005 to 15 mass %; and Se, 0.01 to 2 mass %; Zn, 0.01 to 38 mass %; and Te, 0.03 to 1.5 mass %;
- Cu, a remainder in mass %, and are satisfying a relationship $F1=[P]/[Zr]=1$ to 40 wherein content of each element in F1 is expressed as mass %, and the alloy composition has a crystal structure, in which mean grain size is 50 μm or less in a macrostructure after melt-solidification;
- wherein the alloy composition of the melt-solidified parts further satisfies a relationship $F2=[Cu]-3[P]-3.5[\ Si]-0.5[Sn]-1.8[Al]-0.5([Sb]+[As]+[Mg])+[Mn]+0.5([Pb]+[Bi]+[Se]+[Te])=60$ to 97;
- wherein the alloy composition of the melt-solidified parts further satisfies a relationship $F3=[Zn]+3[\ Sn]+5[Si]+3[Al]=10$ to 45;
- wherein the alloy composition of the melt-solidified parts further satisfies relationships $F4=([Zn]+3[Sn]+5[Si]+3[Al])/[Zr]=300$ to 35000 and $F5=([Zn]+3[Sn]+5[Si]+3[Al])/[P]=60$ to 3000; and
- wherein the content of each element included in the relationships F2, F3, F4 and F5 is expressed as mass %, and for each element not included in relationship F2, F3, F4 and F5, $[a]=0$.

114. The melt-solidified substance according to claim 113, wherein $F1=1.4$ to 25.

115. The melt-solidified substance according to claim 113, wherein $F1=1.6$ to 14.

* * * * *